(12) United States Patent
Volvovski et al.

(10) Patent No.: US 10,303,548 B2
(45) Date of Patent: *May 28, 2019

(54) TIME-SENSITIVE DATA STORAGE OPERATIONS IN A DISPERSED STORAGE NETWORK

(71) Applicant: International Business Machines Corporation, Armonk, NY (US)

(72) Inventors: Ilya Volvovski, Chicago, IL (US); Ravi Khadiwala, Bartlett, IL (US); Greg Dhuse, Chicago, IL (US); Jason K. Resch, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/920,843

(22) Filed: Mar. 14, 2018

(65) Prior Publication Data

US 2018/0210790 A1   Jul. 26, 2018

Related U.S. Application Data

(63) Continuation of application No. 15/428,390, filed on Feb. 9, 2017, now Pat. No. 9,921,907, which is a
(Continued)

(51) Int. Cl.
*G06F 17/30* (2006.01)
*G06F 11/10* (2006.01)
(Continued)

(52) U.S. Cl.
CPC .......... *G06F 11/1076* (2013.01); *G06F 3/064* (2013.01); *G06F 3/067* (2013.01);
(Continued)

(58) Field of Classification Search
USPC .......................................................... 707/827
See application file for complete search history.

(56) References Cited

U.S. PATENT DOCUMENTS

| 4,092,732 A | 5/1978 | Ouchi |
| 5,454,101 A | 9/1995 | Mackay et al. |

(Continued)

OTHER PUBLICATIONS

Chung; An Automatic Data Segmentation Method for 3D Measured Data Points; National Taiwan University; pp. 1-8; 1998.
(Continued)

*Primary Examiner* — Anhtai V Tran
(74) *Attorney, Agent, or Firm* — Garlick & Markison; Timothy W. Markison; Harry S. Tyson, Jr.

(57) ABSTRACT

A method begins by a dispersed storage (DS) processing module transmitting a set of write commands for storing a set of encoded data slices in storage units of a dispersed storage network (DSN) and determining whether at least a first threshold number of write responses have been received within a response time period. When the at least the first threshold number of the write responses have been received within the response time period, the method continues with the DS processing module determining whether a total number of responses have been received within another response time period. When the total number of responses have not been received within the other response time period, the method continues with the DS processing module issuing a sub-set of write commit commands corresponding to a response number of encoded data slices for which a response was received.

20 Claims, 62 Drawing Sheets

Related U.S. Application Data continuation of application No. 14/306,335, filed on Jun. 17, 2014, now Pat. No. 9,652,470.

(60) Provisional application No. 61/841,625, filed on Jul. 1, 2013.

(51) Int. Cl.
```
G06F 16/182      (2019.01)
G06F 16/23       (2019.01)
H04L 29/08       (2006.01)
G06F 3/06        (2006.01)
```
(52) U.S. Cl.
CPC .......... *G06F 3/0619* (2013.01); *G06F 3/0659* (2013.01); *G06F 11/10* (2013.01); *G06F 16/182* (2019.01); *G06F 16/2379* (2019.01); *H04L 67/1097* (2013.01)

(56) References Cited

U.S. PATENT DOCUMENTS

| | | | |
|---|---|---|---|
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 9,002,805 B1* | 4/2015 | Barber .............. | G06F 17/30303 707/692 |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula | |
| 2005/0132070 A1 | 6/2005 | Redlich et al. | |
| 2005/0144382 A1 | 6/2005 | Schmisseur | |
| 2005/0229069 A1 | 10/2005 | Hassner et al. | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters et al. | |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |
| 2011/0289122 A1* | 11/2011 | Grube .............. | G06F 11/2094 707/812 |
| 2012/0054581 A1* | 3/2012 | Grube .............. | G06F 3/0619 714/769 |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator; IETF Network Working Group; RFC 4516; Jun. 2006; pp. 1-15.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Technical Specification Road Map; IETF Network Working Group; RFC 4510; Jun. 2006; pp. 1-8.

(56) References Cited

OTHER PUBLICATIONS

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

\* cited by examiner distributed computing system 10

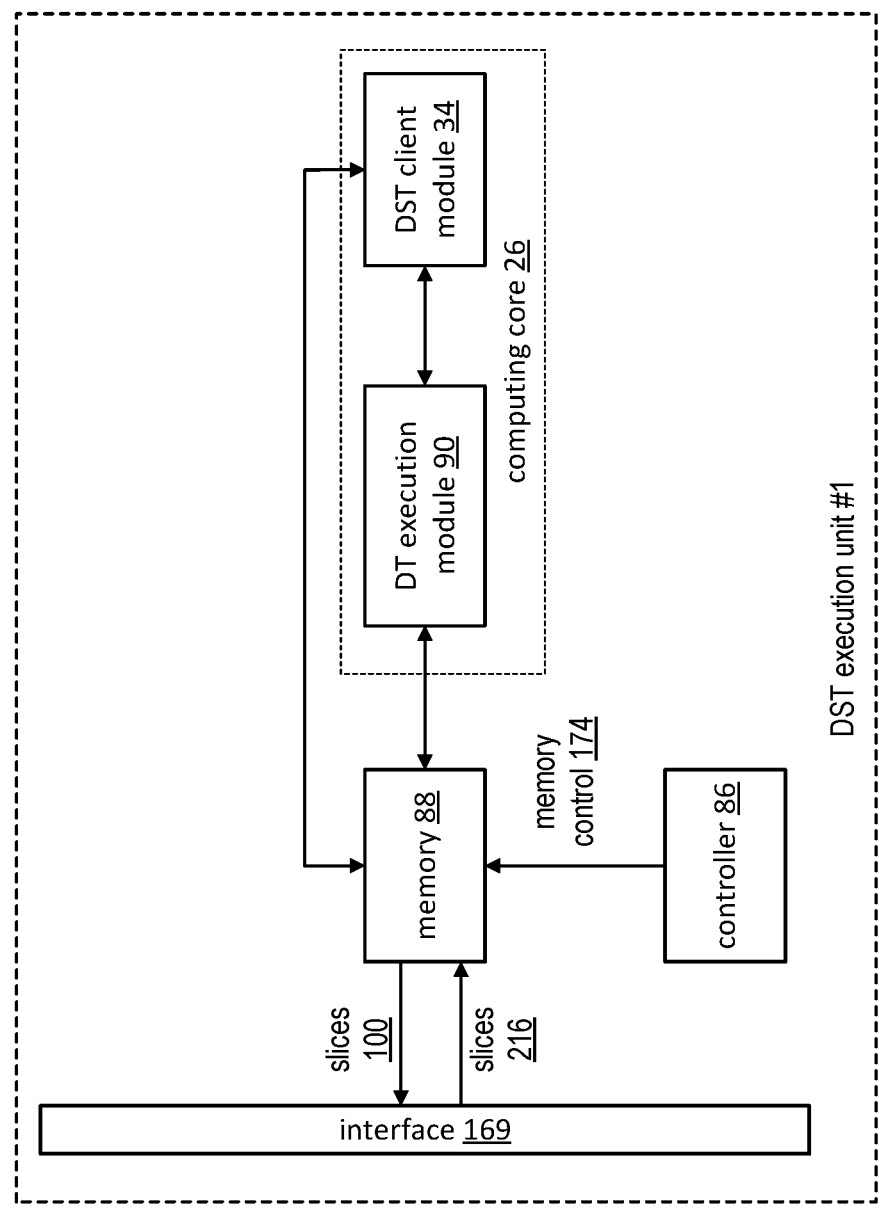
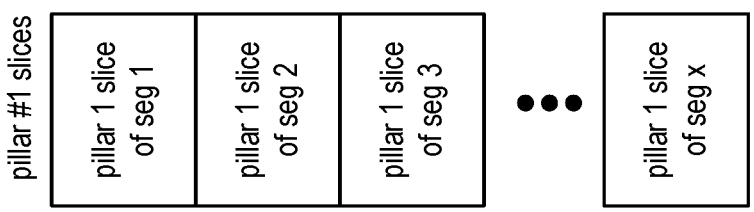
FIG. 24

DST allocation info 242 | data partition info 320: data ID; No. of partitions; Addr. info for each partition; intermediate result info 324: format conversion indication task execution info 322

| task 326 | task ordering 328 | data partition 330 | set of DT EX mods 332 | Name 334 | interm. result processing 336 | scratch pad storage 338 | intermediate result storage 340 |
|---|---|---|---|---|---|---|---|
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4 2_5 - 2_z | 1_1, 2_1, 3_1, 4_1, & 5_1 1_2, 2_2, 3_2, 4_2, & 5_2 | R1-3 | DST unit 2 | DST unit 2 | DST units 2-6 |
| 1_4 | after 1_3 | R1-3_1 - R1-3_4 R1-3_5 - R1-3_z | 1_1, 2_1, 3_1, 4_1, & 5_1 1_2, 2_2, 6_1, 7_1, & 7_2 | R1_4 | DST unit 3 | DST unit 3 | DST units 3-7 |
| 1_5 | after 1_4 | R1-4_1 - R1-4_z & 2_1 - 2_z | 1_1, 2_1, 3_1, 4_1, & 5_1 | R1-5 | DST unit 1 | DST unit 1 | DST units 1-5 |
| 1_6 | after 1_1 & 1_5 | R1-1_1 - R1-1_z & R1-5_1 - R1-5_z | 1_2, 2_2, 3_2, 4_2, & 5_2 | R1-6 | DST unit 2 | DST unit 2 | DST units 2-6 |
| 1_7 | after 1_2 & 1_5 | R1-2_1 - R1-2_z & R1-5_1 - R1-5_z | 1_2, 2_2, 3_2, 4_2, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | | | |
| 3_2 | after 3_1 | R1-3_1 - R1-3_z | 1_2, 2_2, 3_2, 4_2, & 5_2 | R3-2 | DST unit 5 | DST unit 5 | DST units 5, 6, 1-3 |

FIG. 32

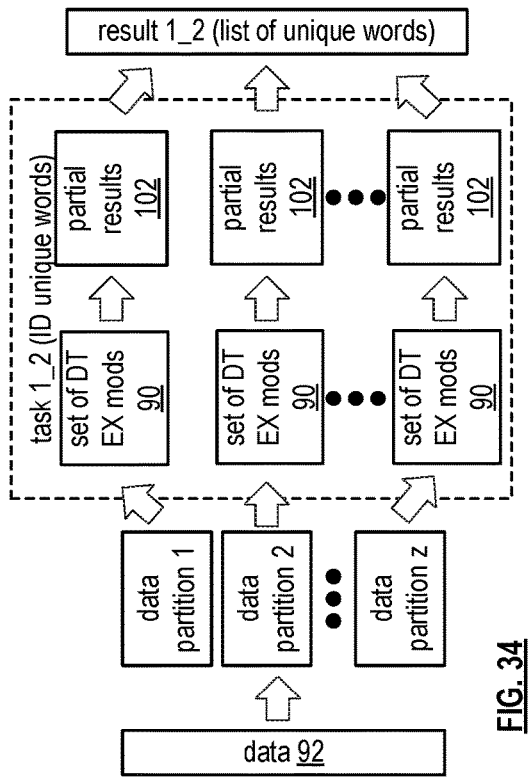
FIG. 34
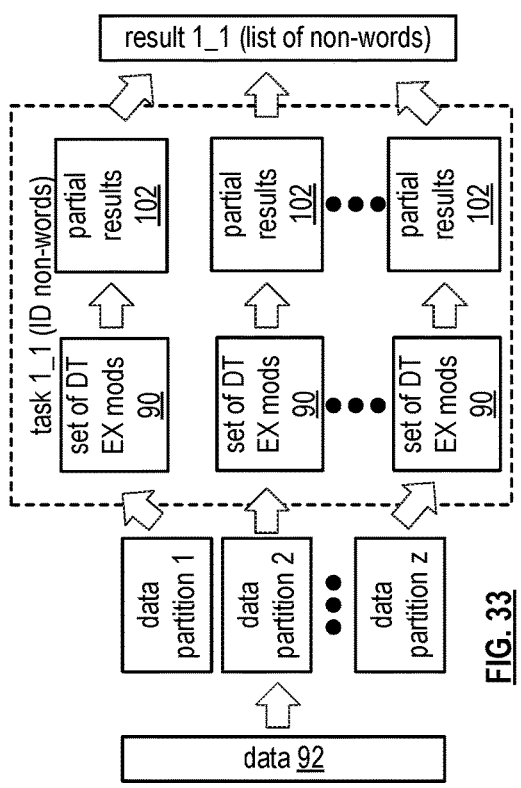
FIG. 33
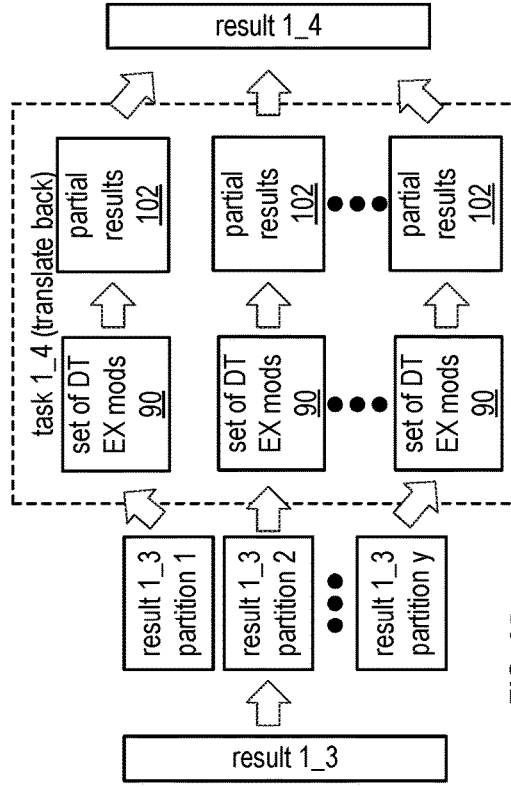
FIG. 35
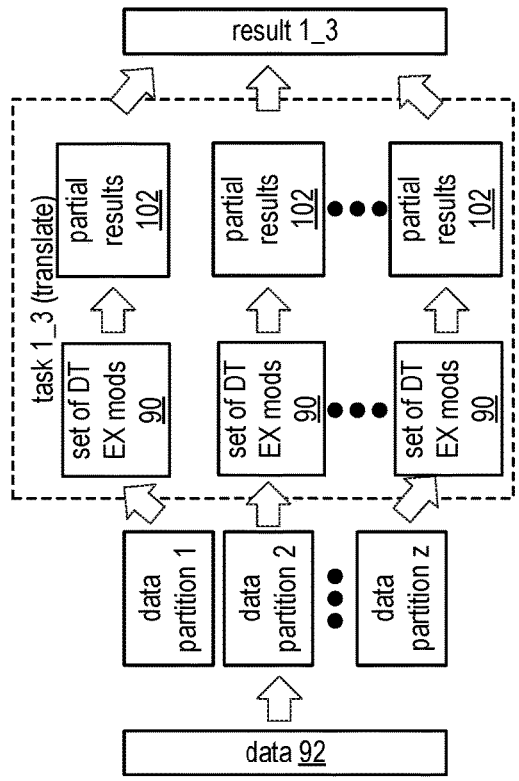

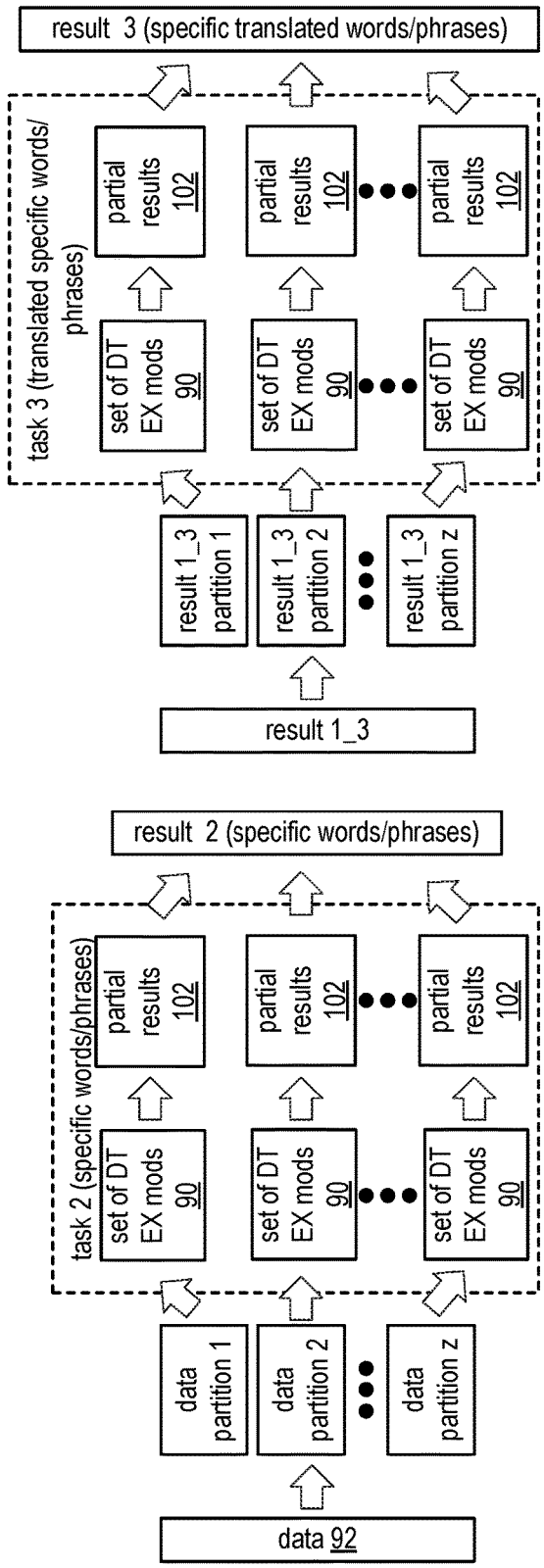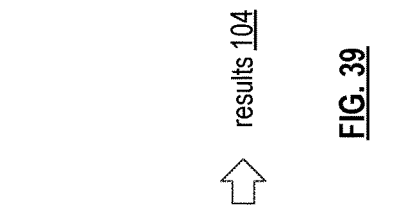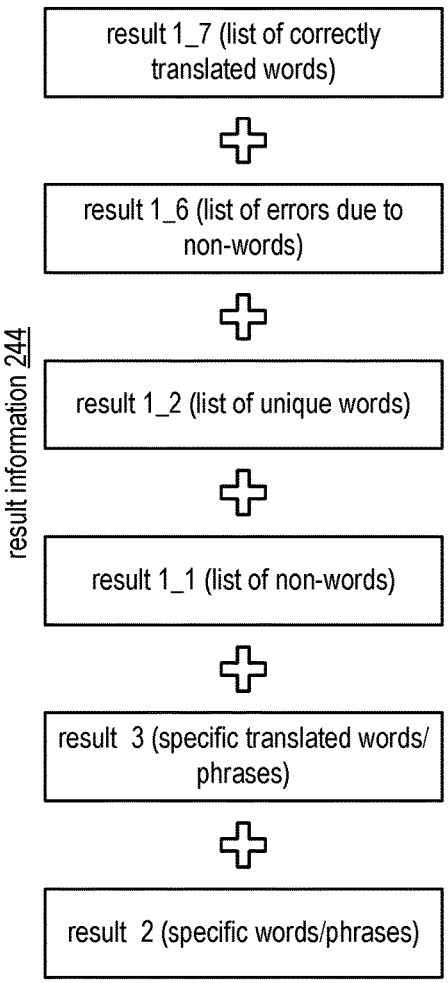

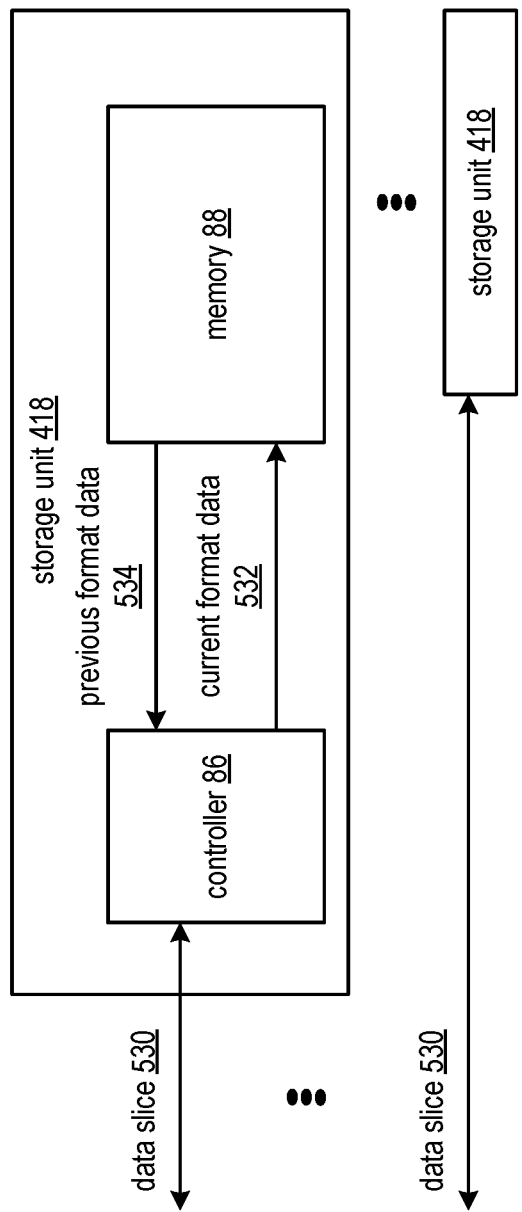

TIME-SENSITIVE DATA STORAGE OPERATIONS IN A DISPERSED STORAGE NETWORK

CROSS REFERENCE TO RELATED PATENTS

The present U.S. Utility patent application claims priority pursuant to 35 U.S.C. § 120 as a continuation of U.S. Utility application Ser. No. 15/428,390, entitled "TIME-SENSITIVE DATA STORAGE OPERATIONS IN A DISPERSED STORAGE NETWORK", filed Feb. 9, 2017, which claims priority pursuant to 35 U.S.C. § 120 as a continuation of U.S. Utility application Ser. No. 14/306,335, entitled "STORING DATA IN A DISPERSED STORAGE NETWORK", filed Jun. 17, 2014, issued as U.S. Pat. No. 9,652,470 on May 16, 2017, which claims priority pursuant to 35 U.S.C. § 119(e) to U.S. Provisional Application No. 61/841,625, entitled "PRIORITIZING TASKS IN A DISPERSED STORAGE NETWORK", filed Jul. 1, 2013, each of which are hereby incorporated herein by reference in their entirety and made part of the present U.S. Utility patent application for all purposes.

BACKGROUND OF THE INVENTION

Technical Field of the Invention

This invention relates generally to computer networks and more particularly to time-sensitive dispersed storage of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 24 is a schematic block diagram of an example of a storage operation of a DST execution unit in accordance with the present invention;

Figure 25:
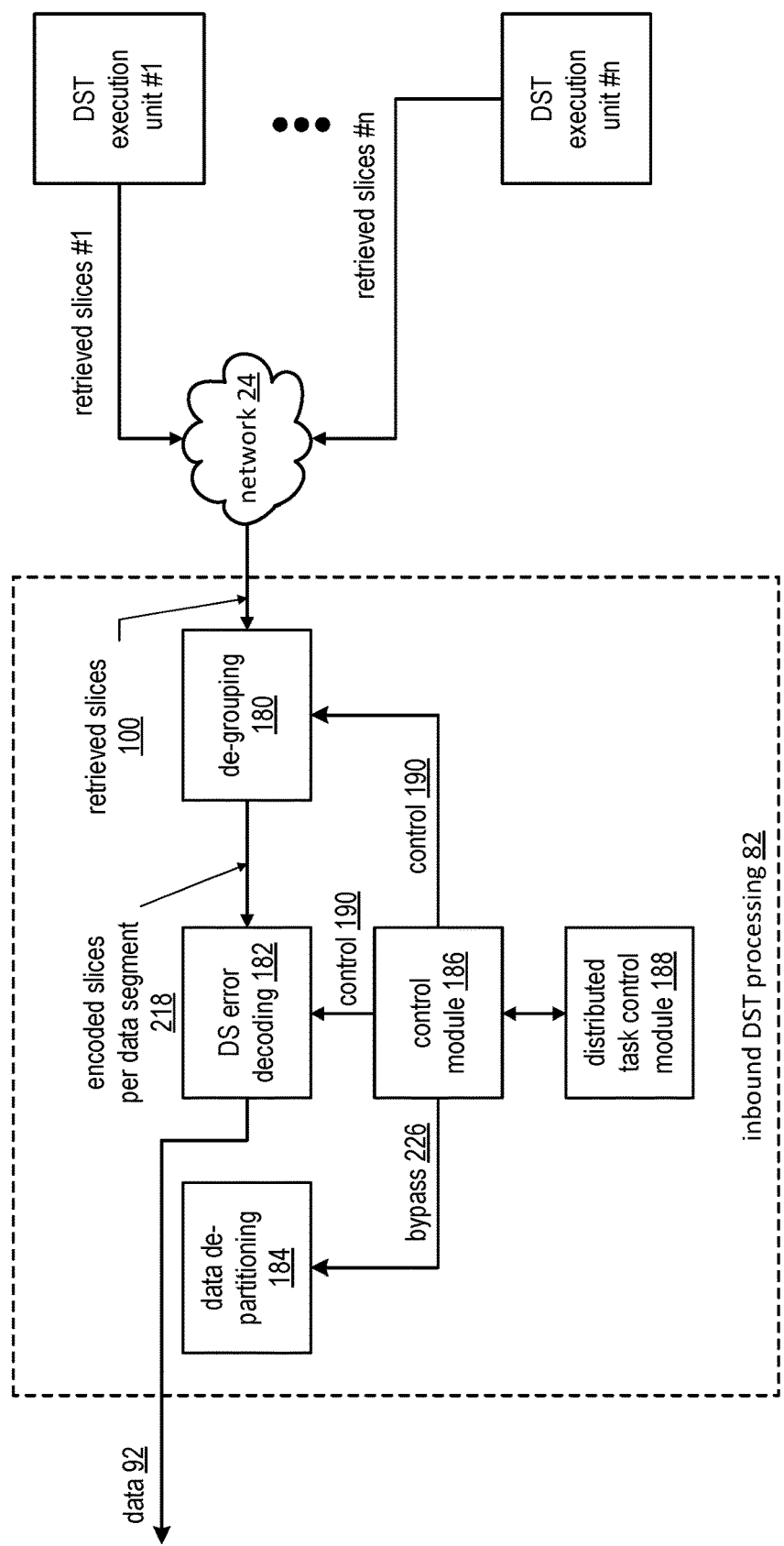
FIG. 25 is a schematic block diagram of an example of operation of inbound distributed storage and/or task (DST)
Figure 26:
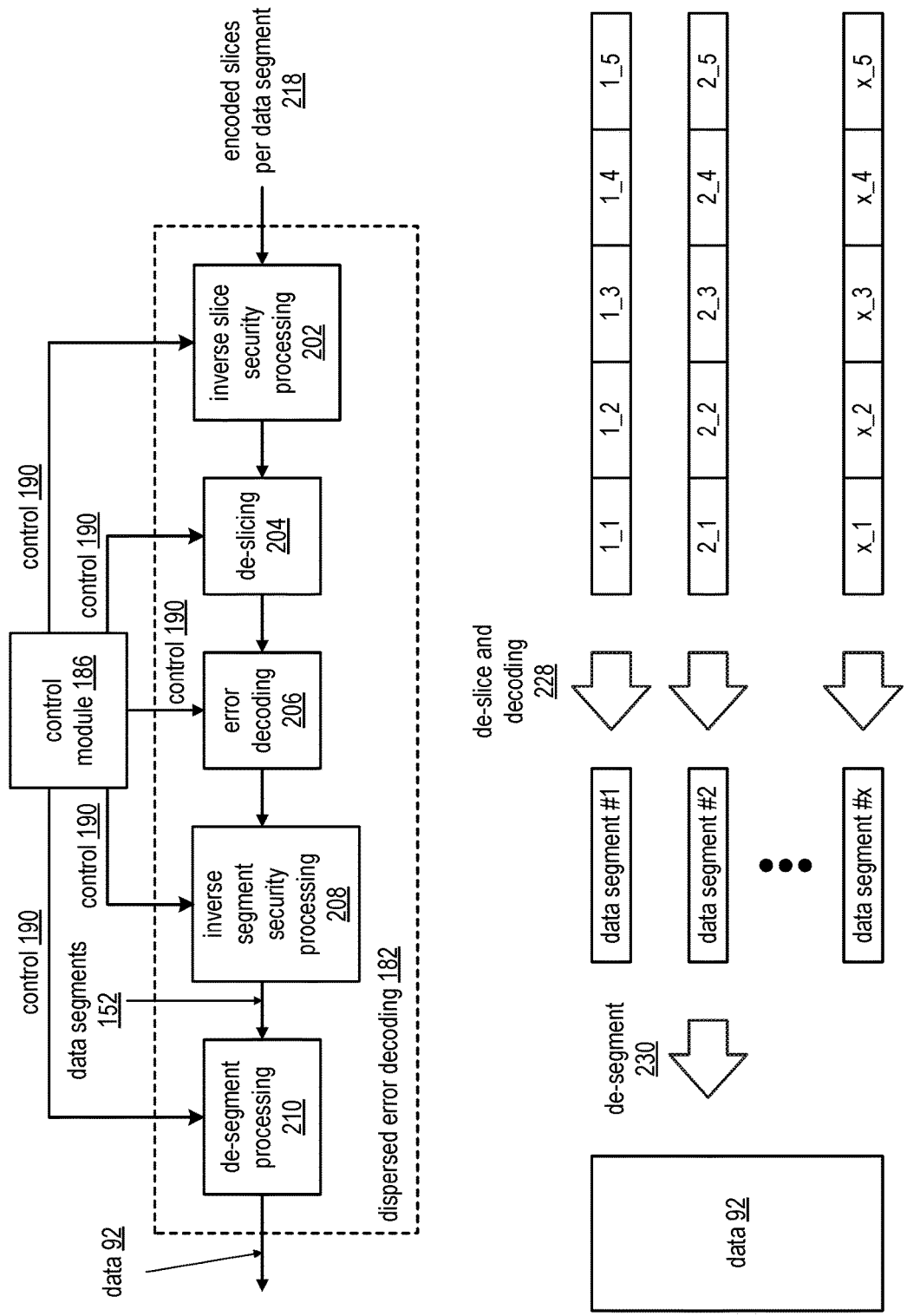
Figure 27:
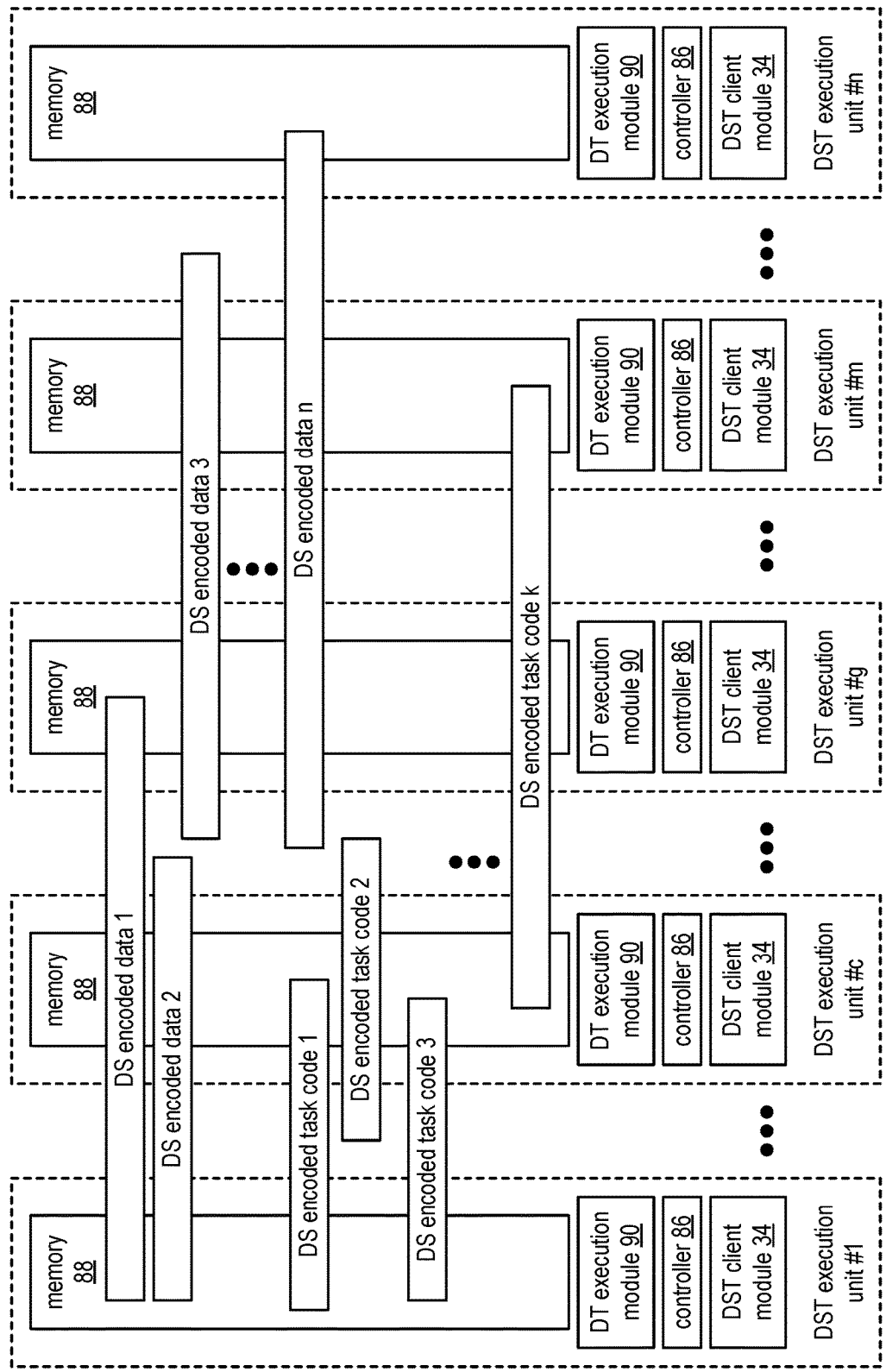
Figure 28:
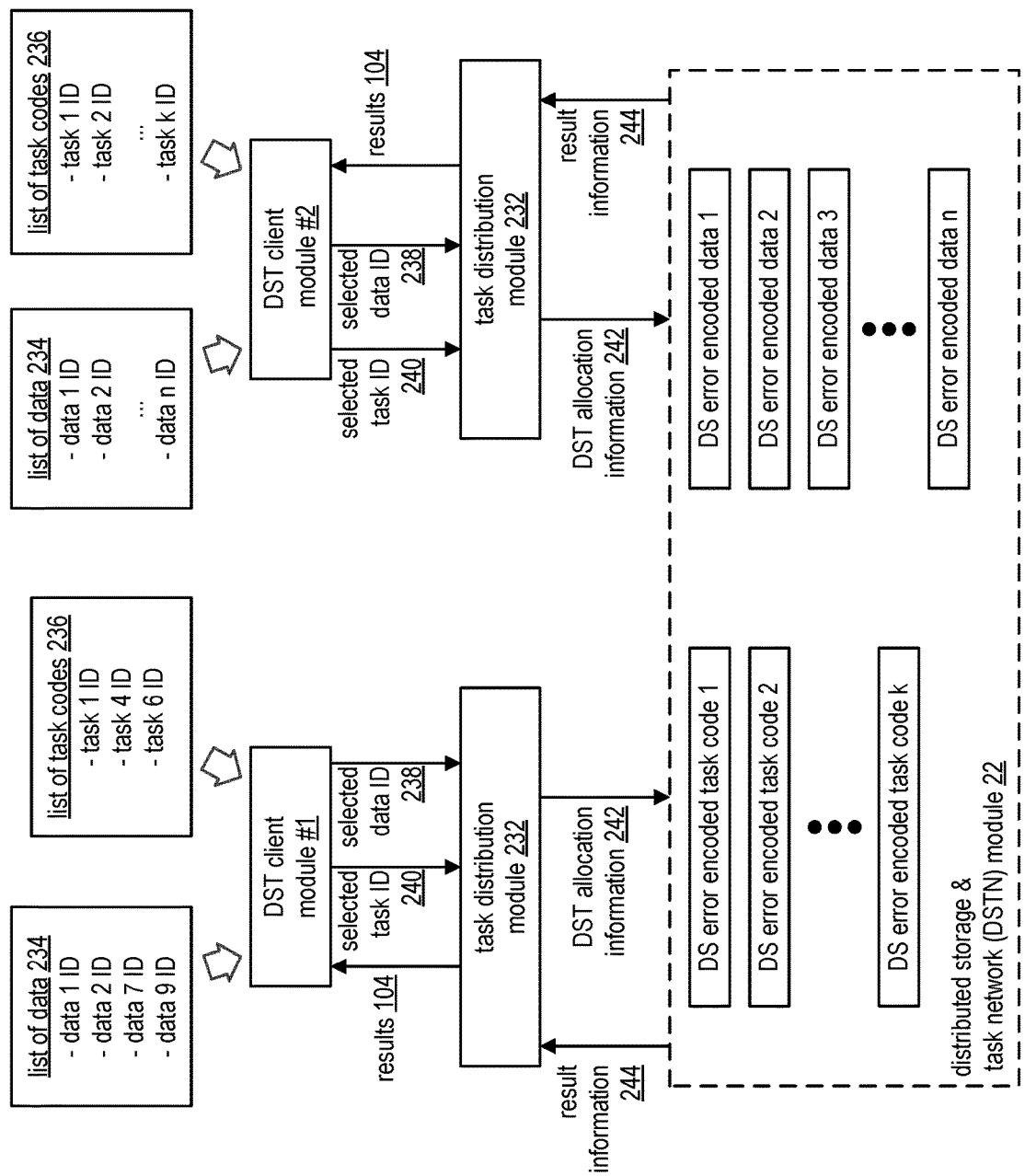
Figure 29:
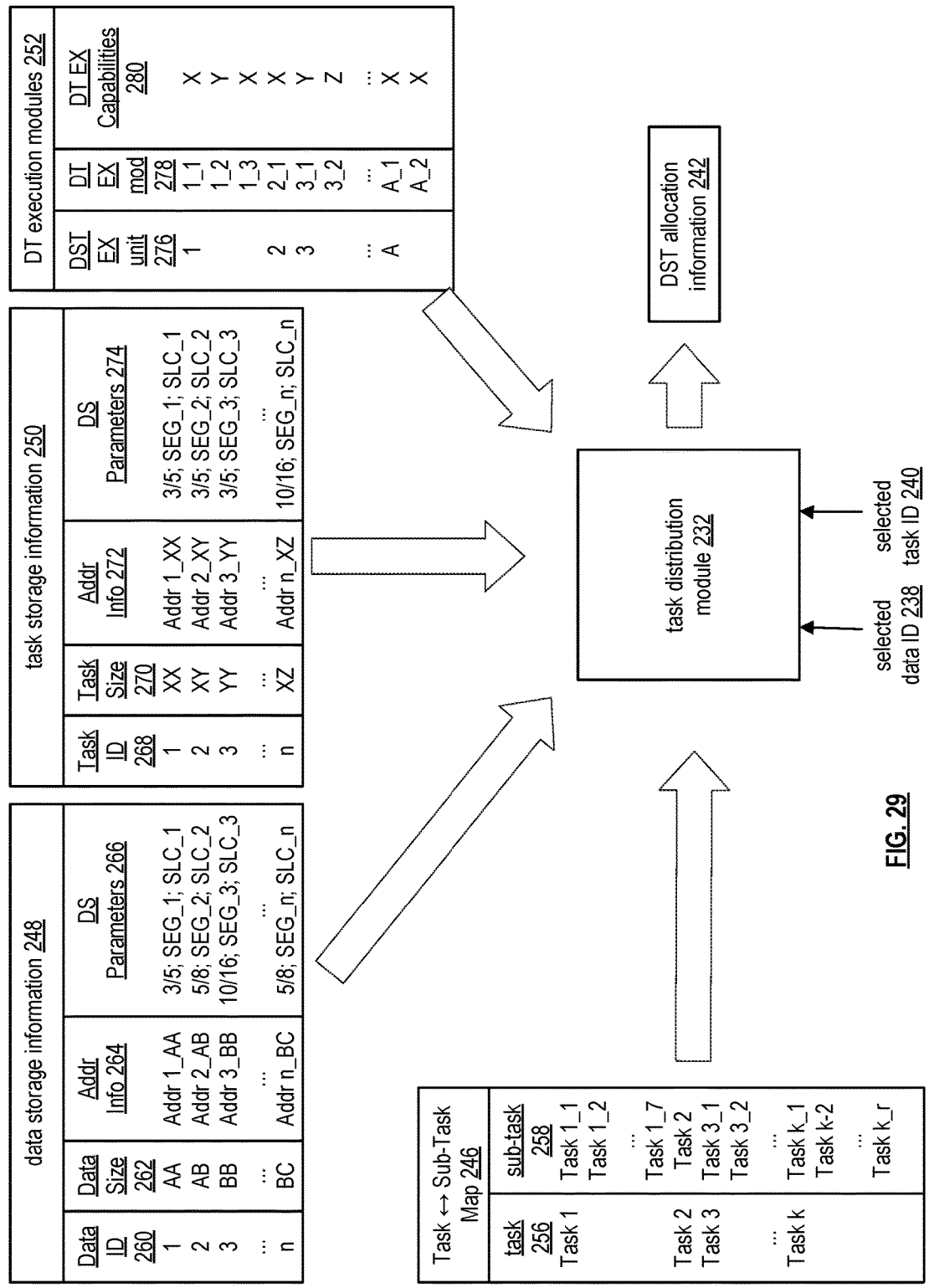
Figure 30:
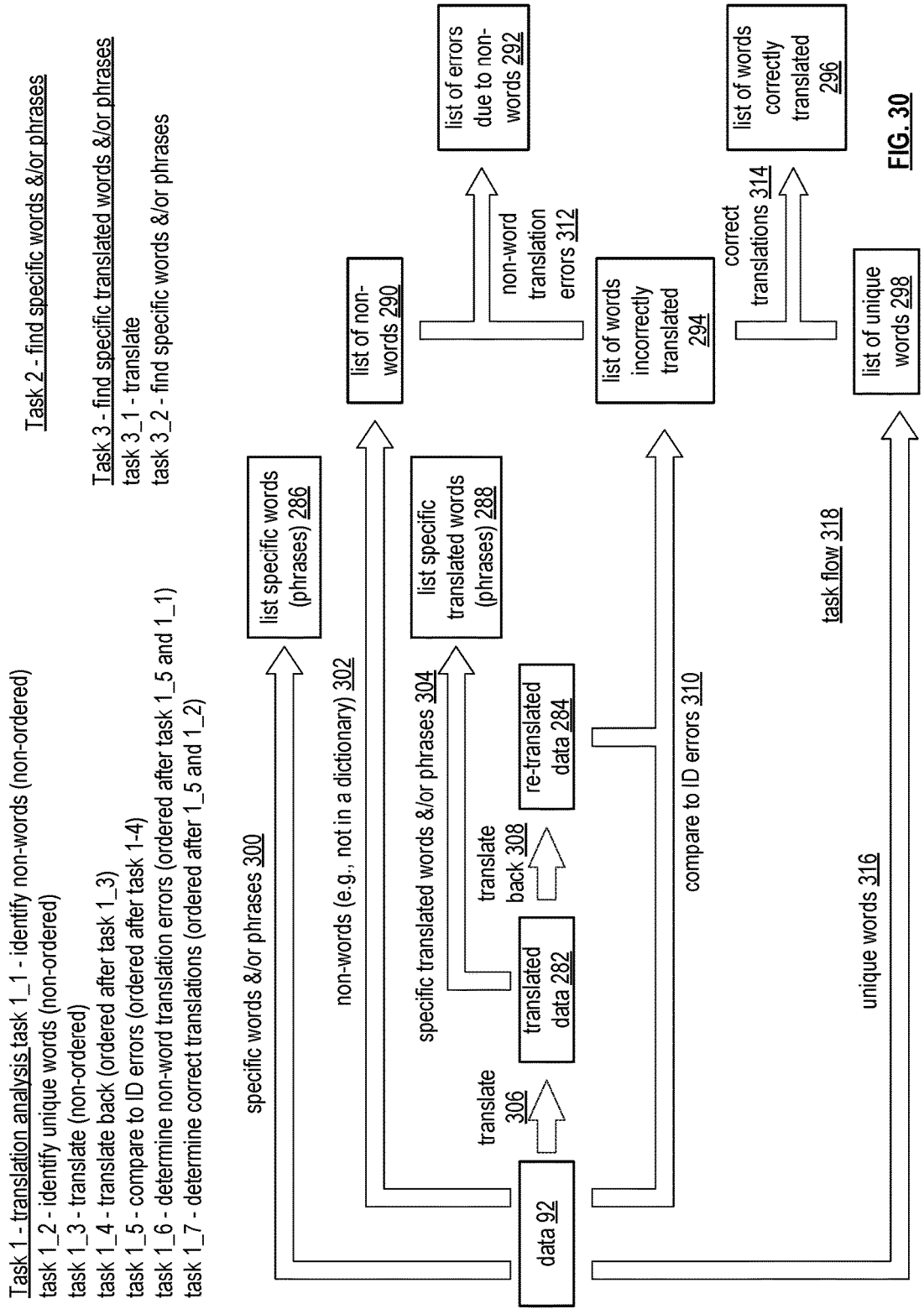
Figure 31:
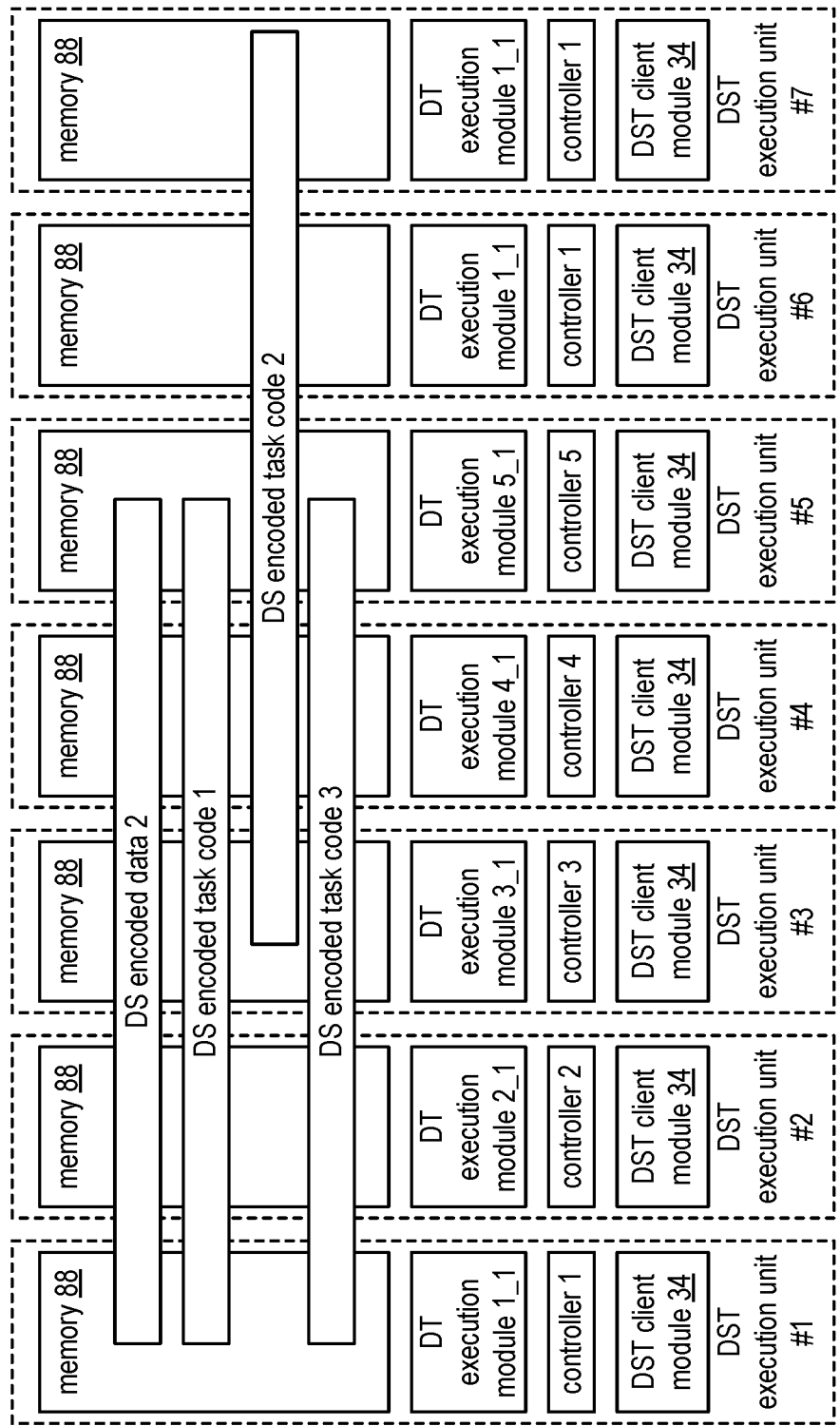
Figure 40A:
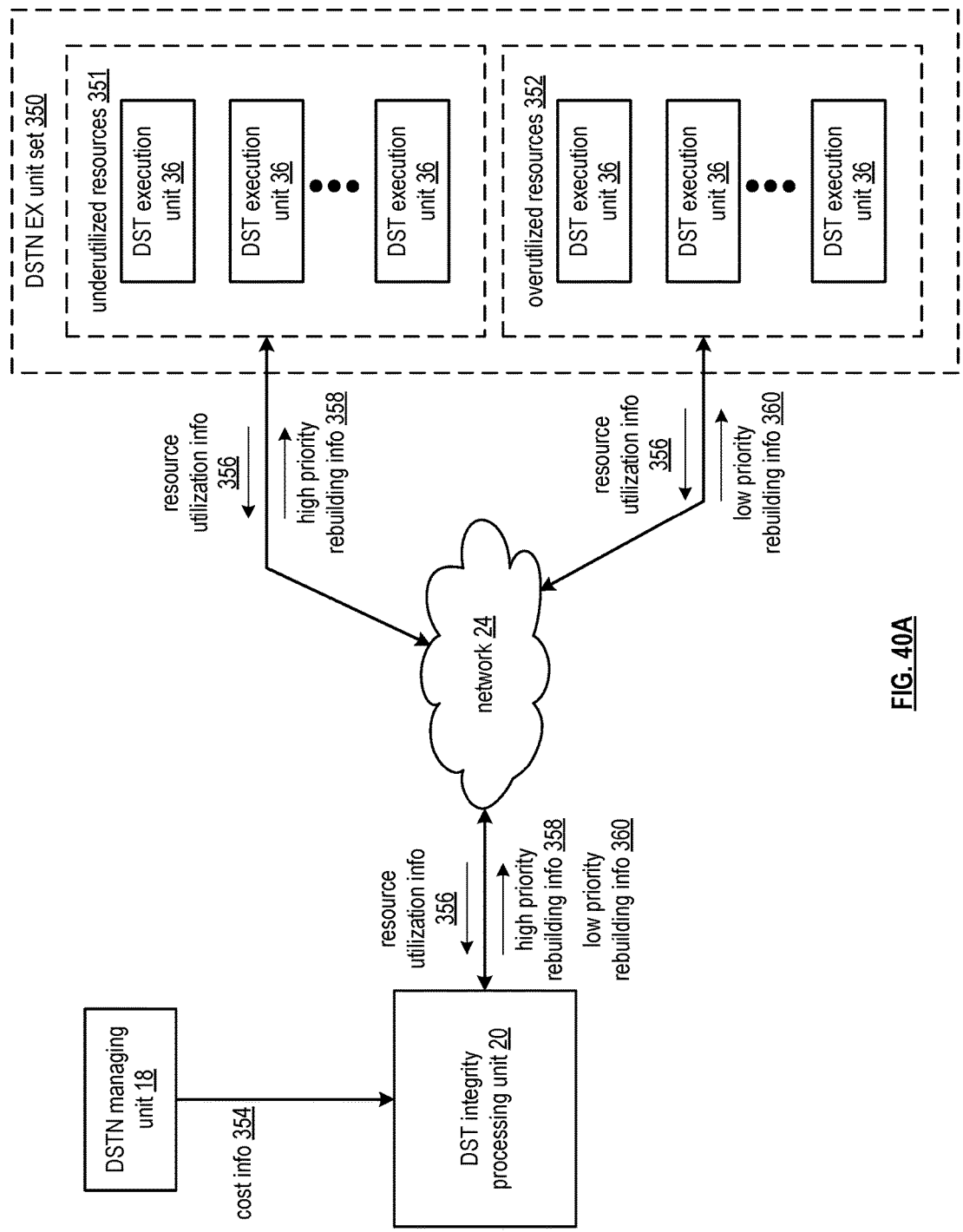
Figure 40B:
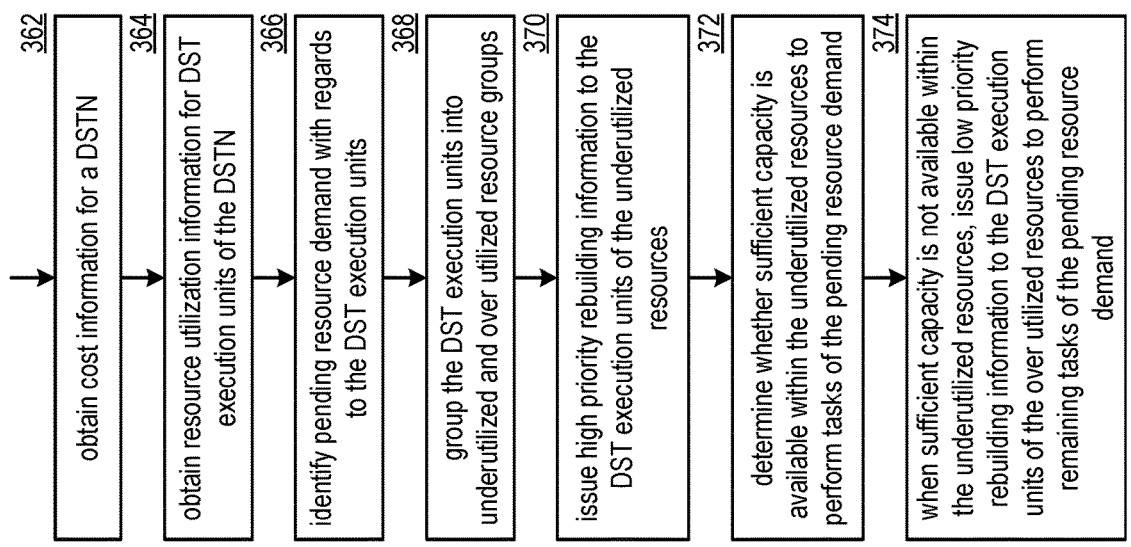
Figure 41A:
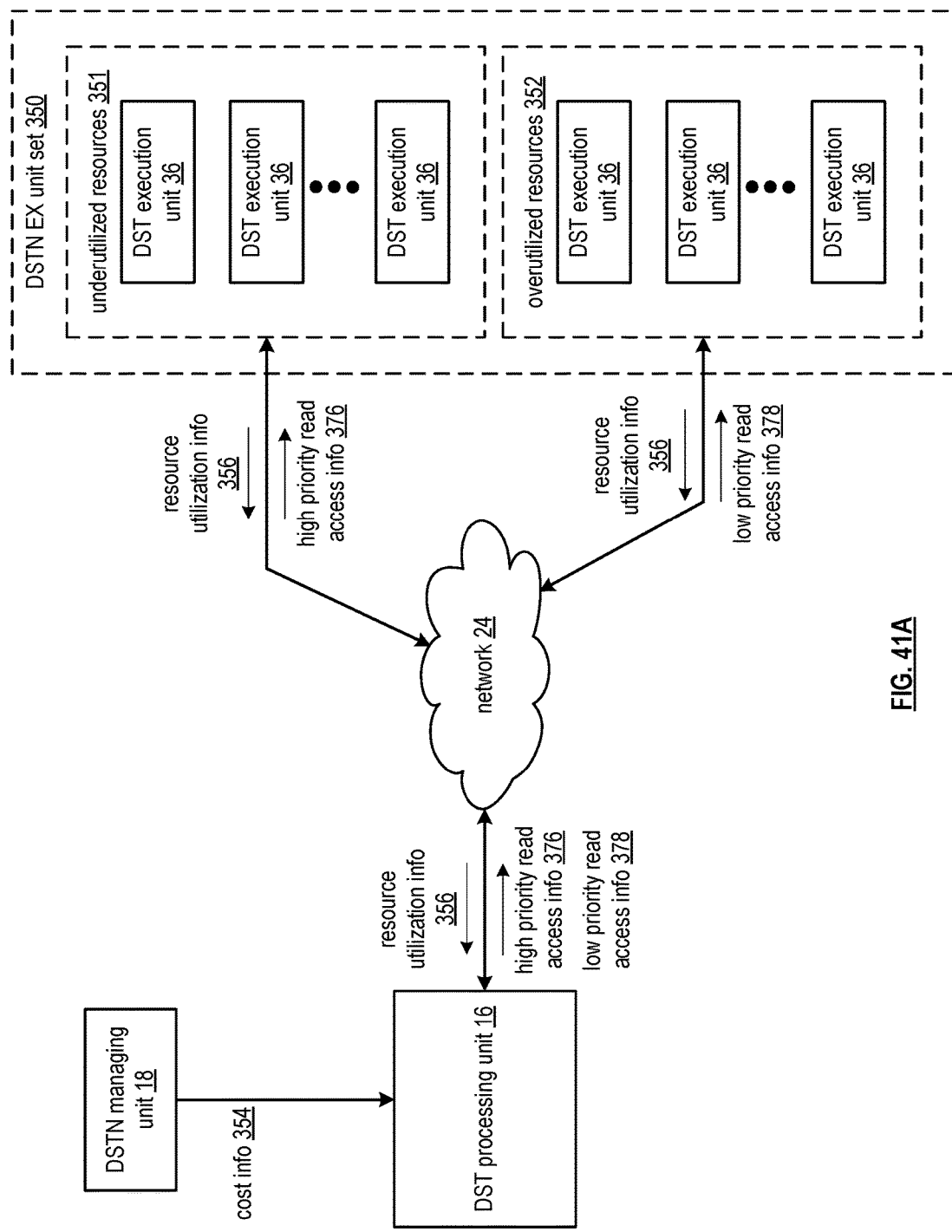
Figure 41B:
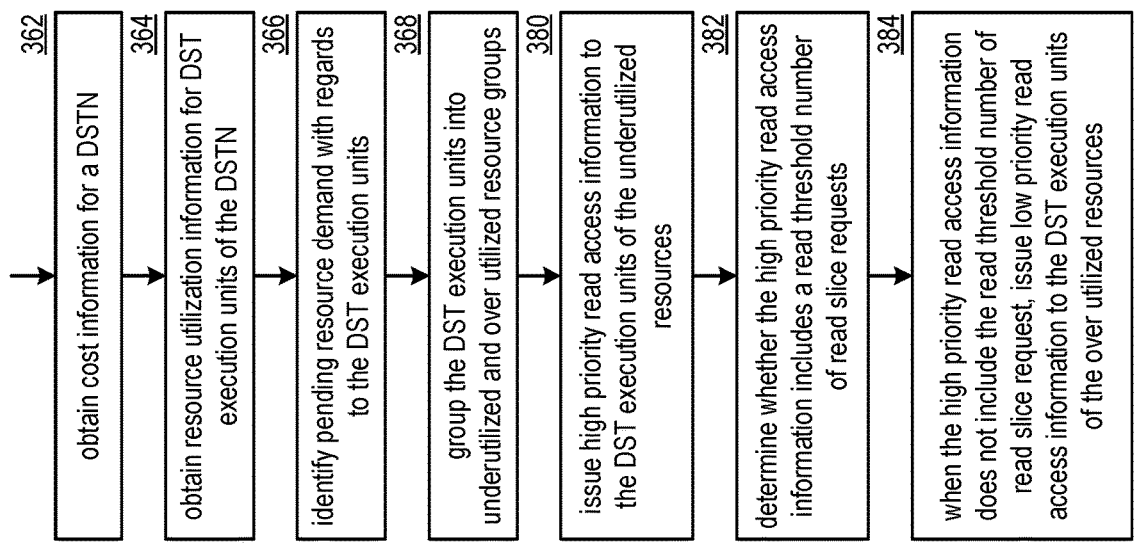
Figure 42A:
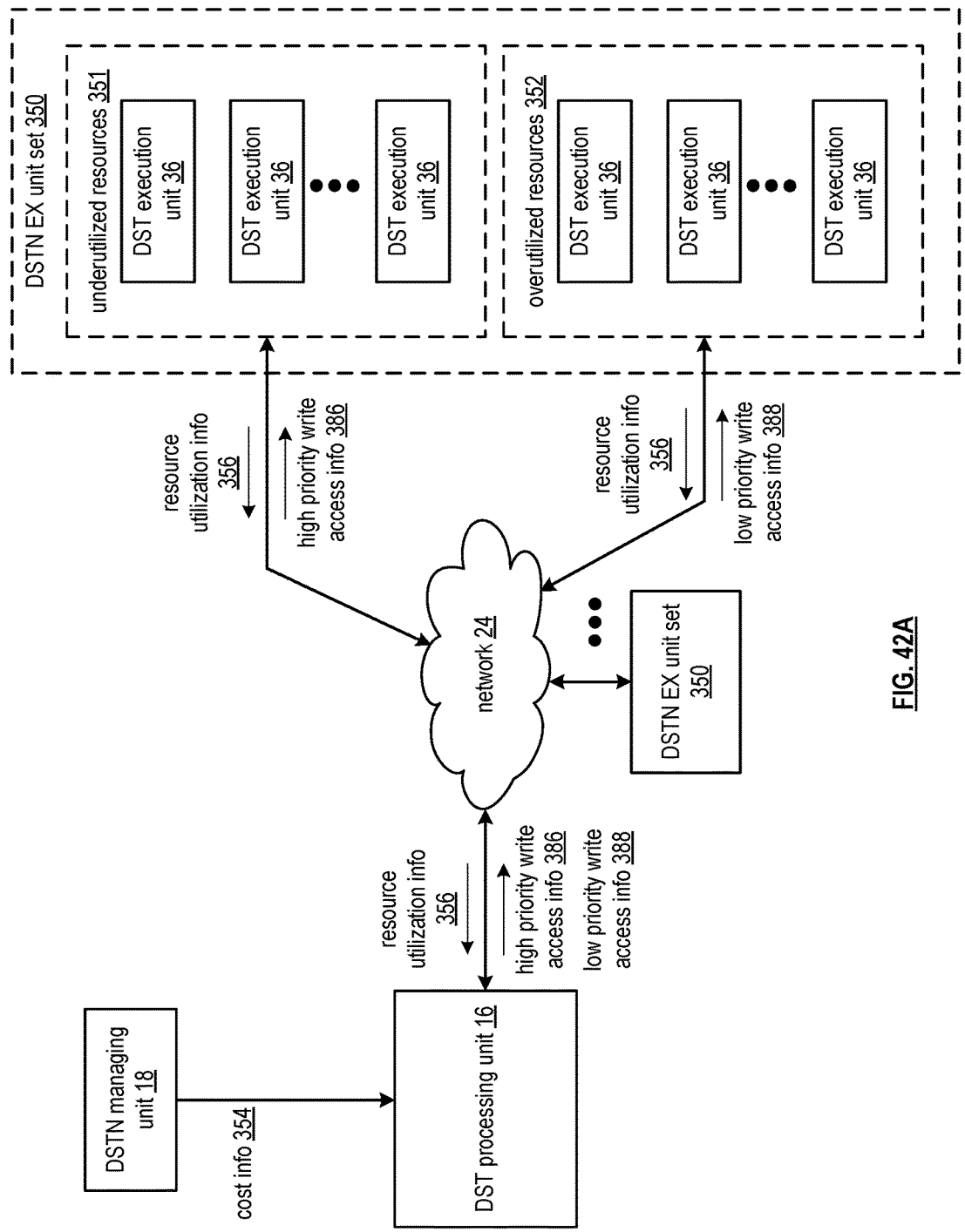
Figure 42B:
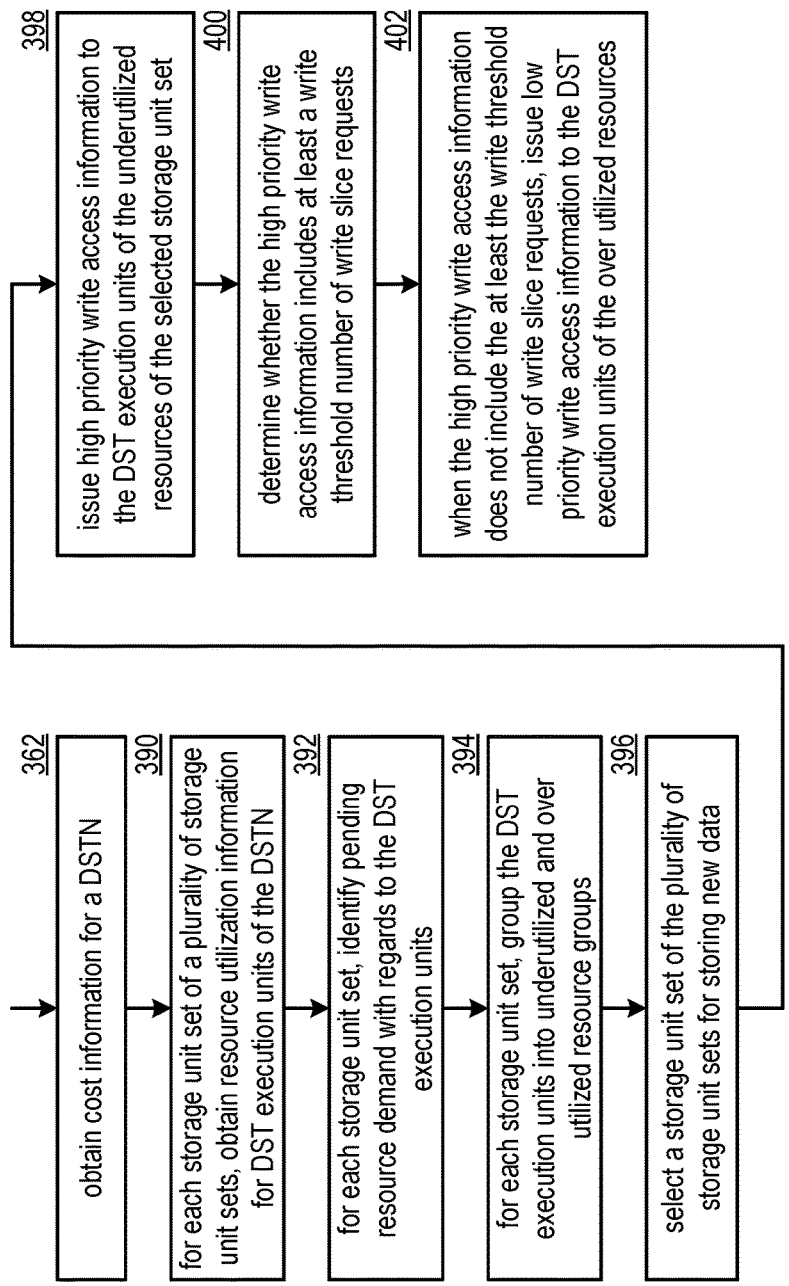
Figure 43A:
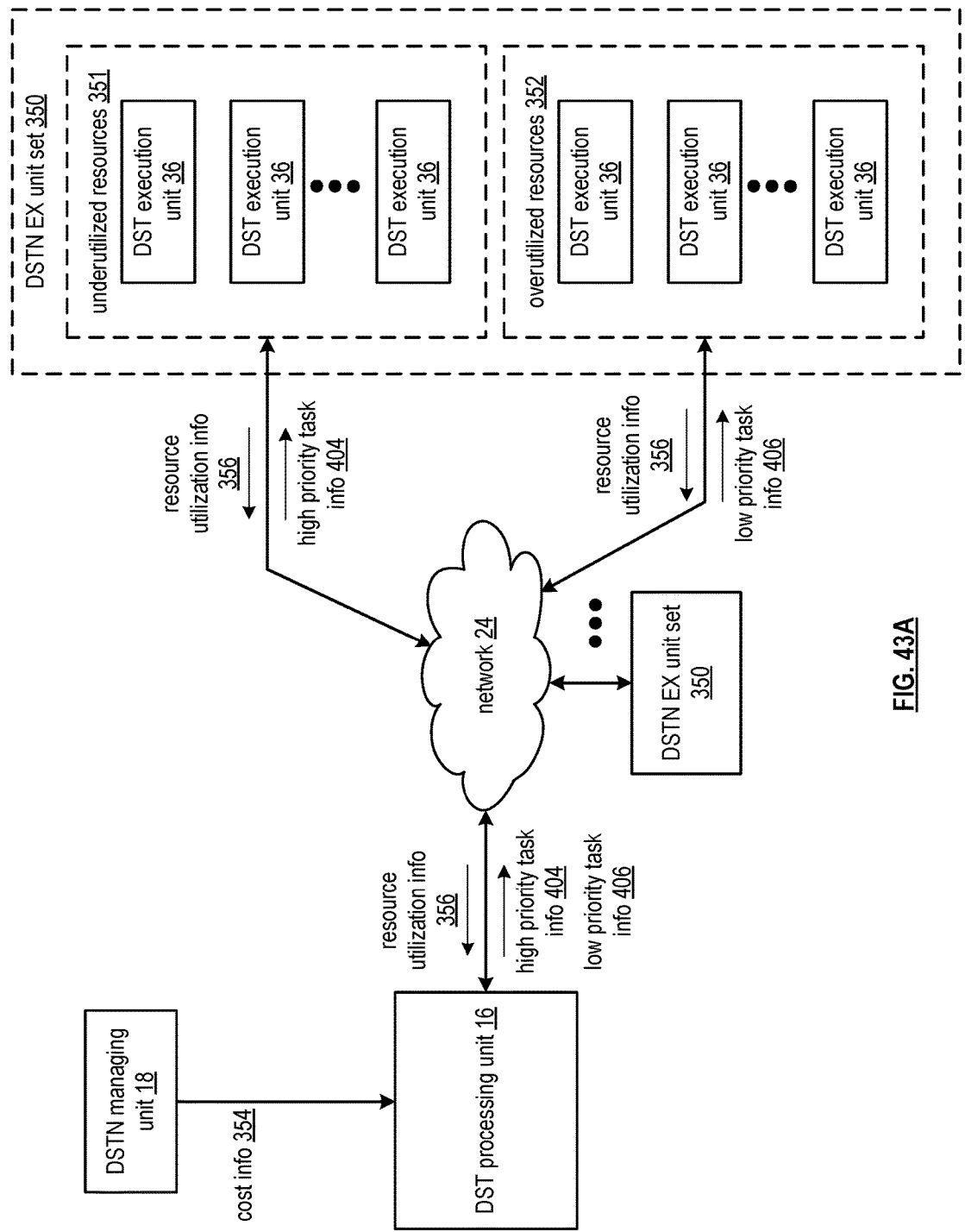
Figure 43B:
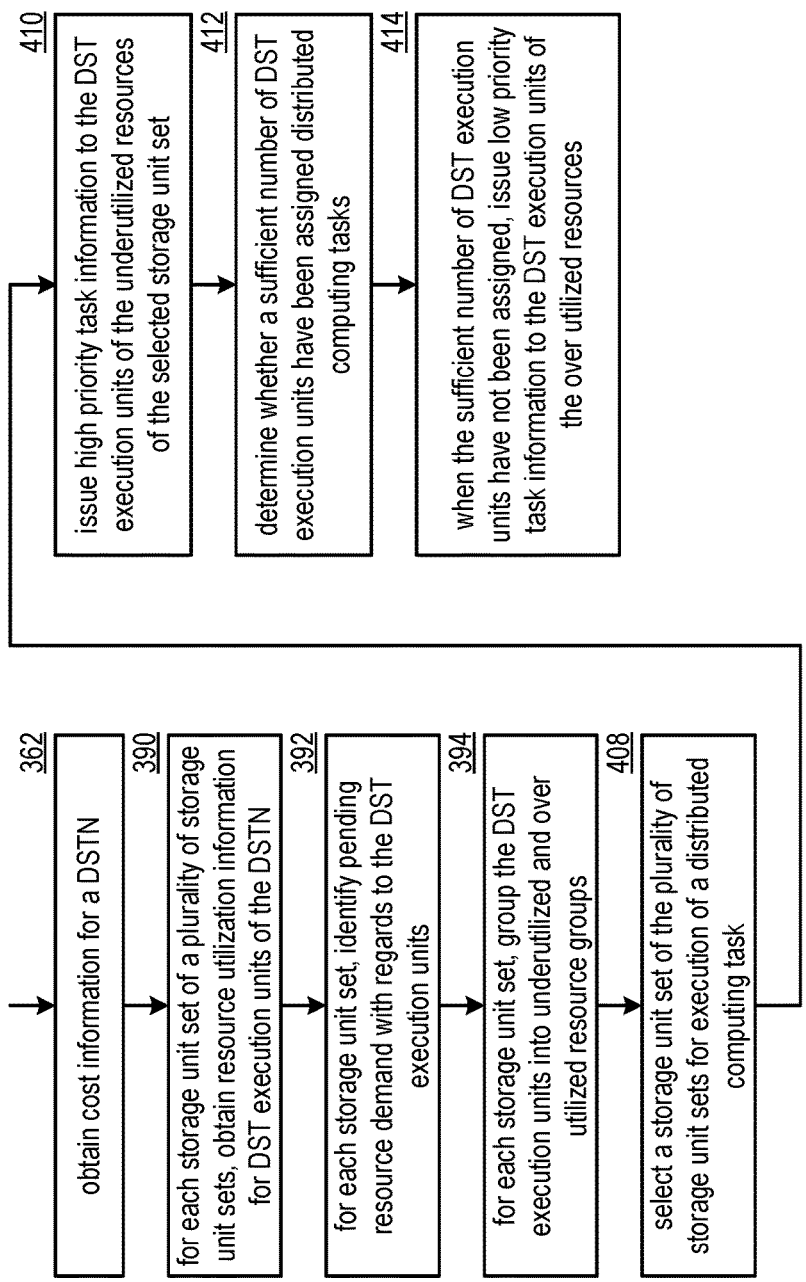
Figure 44A:
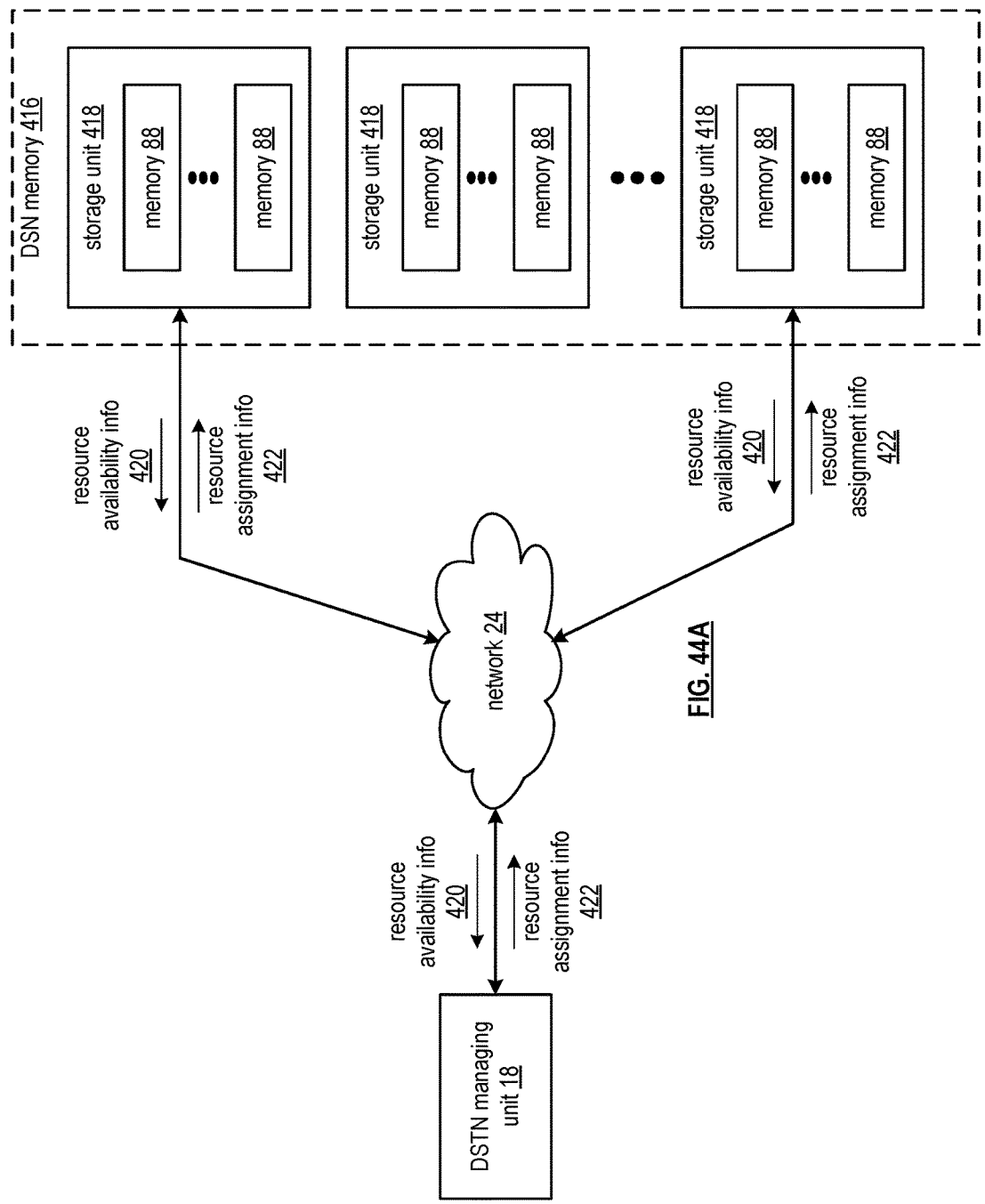
Figure 44B:
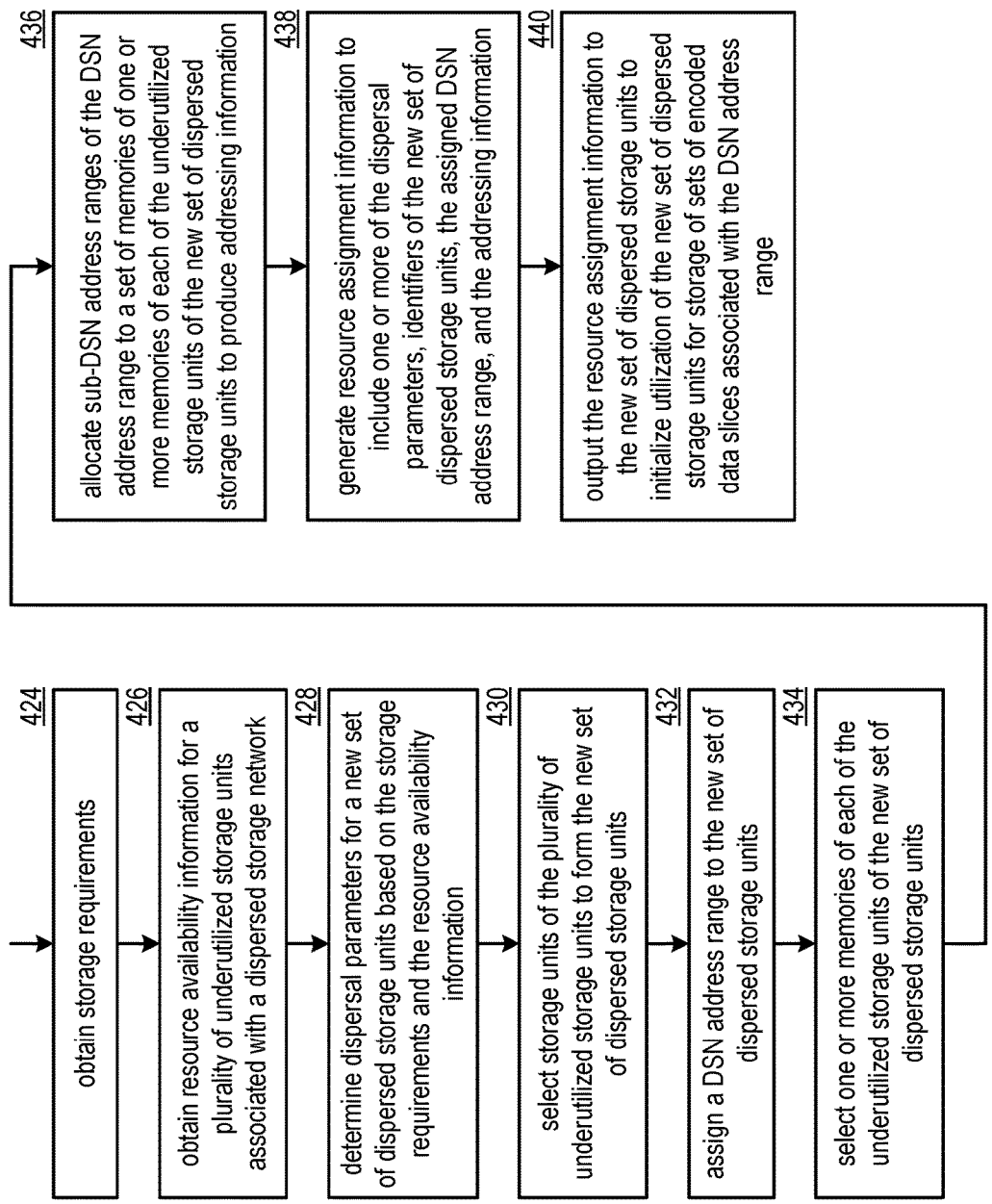
Figure 45A:
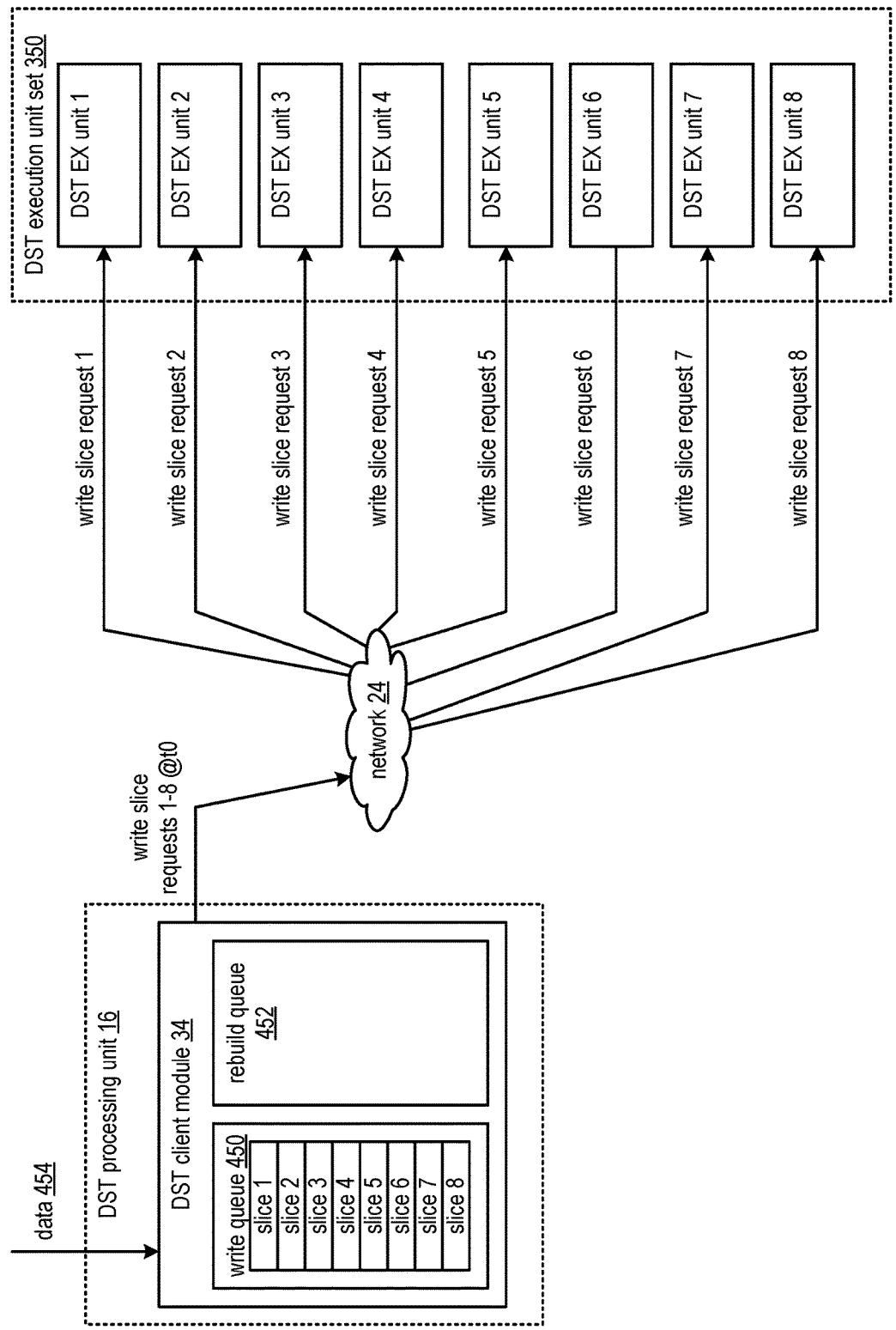
Figure 45B:
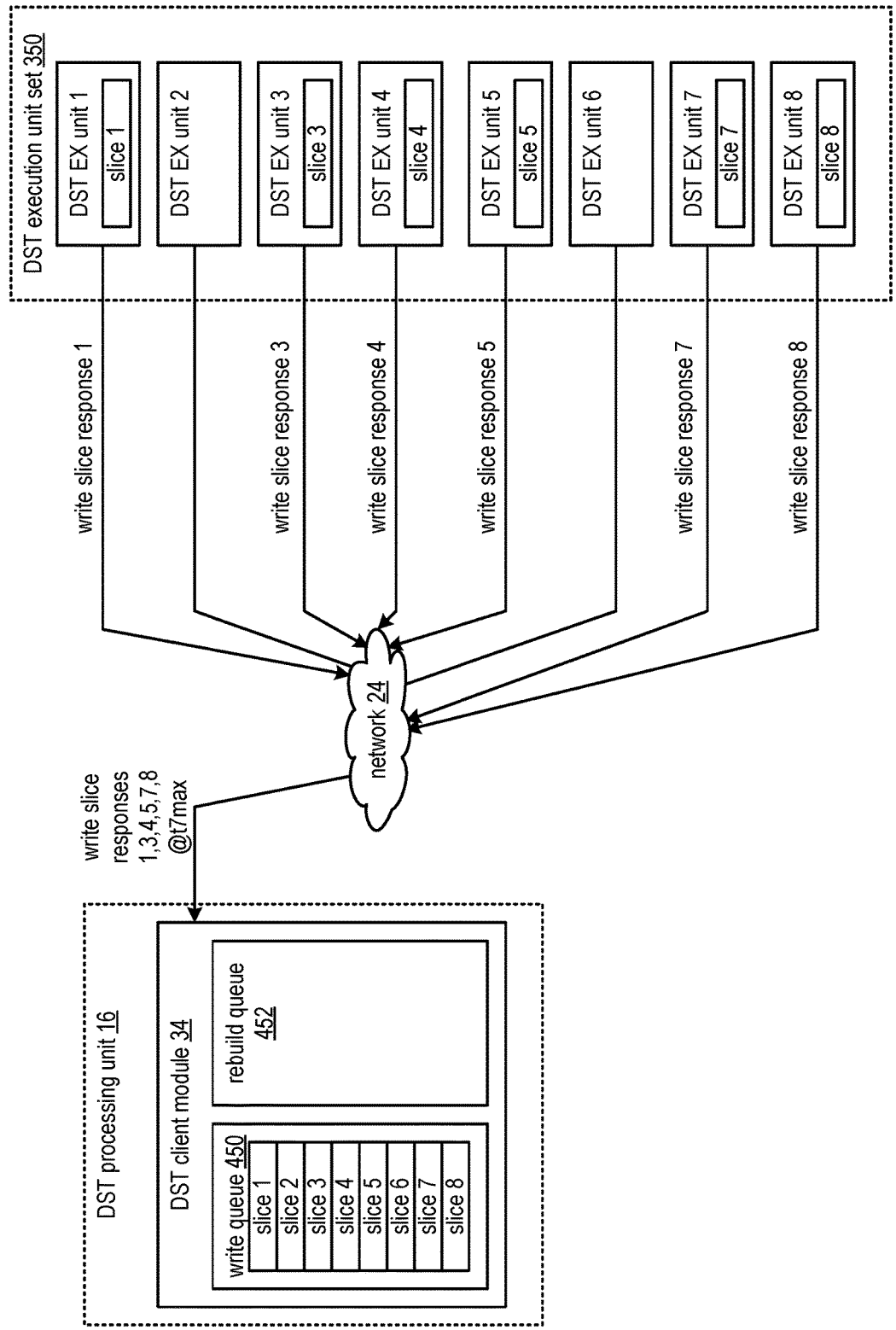
Figure 45C:
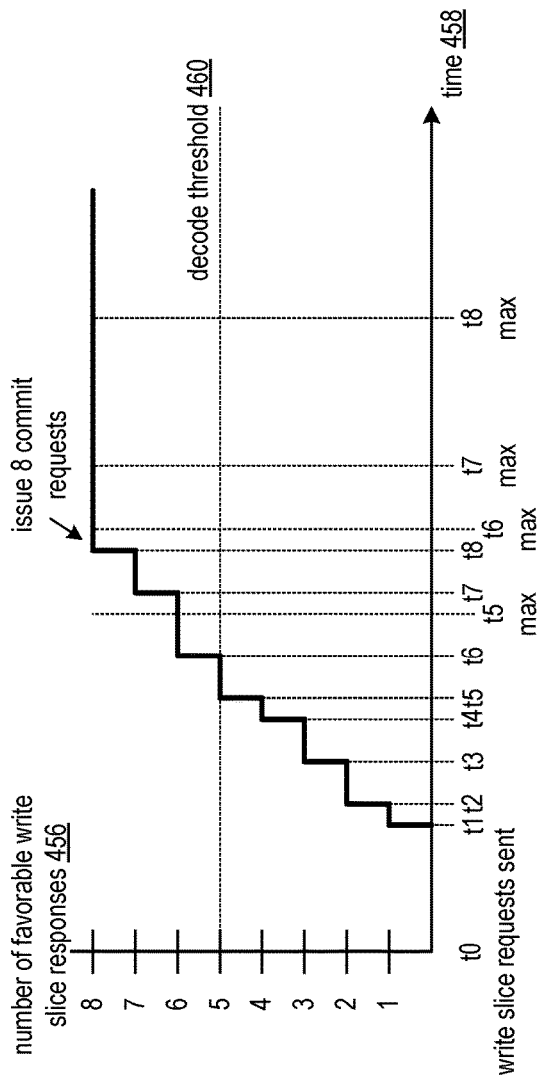
Figure 45D:
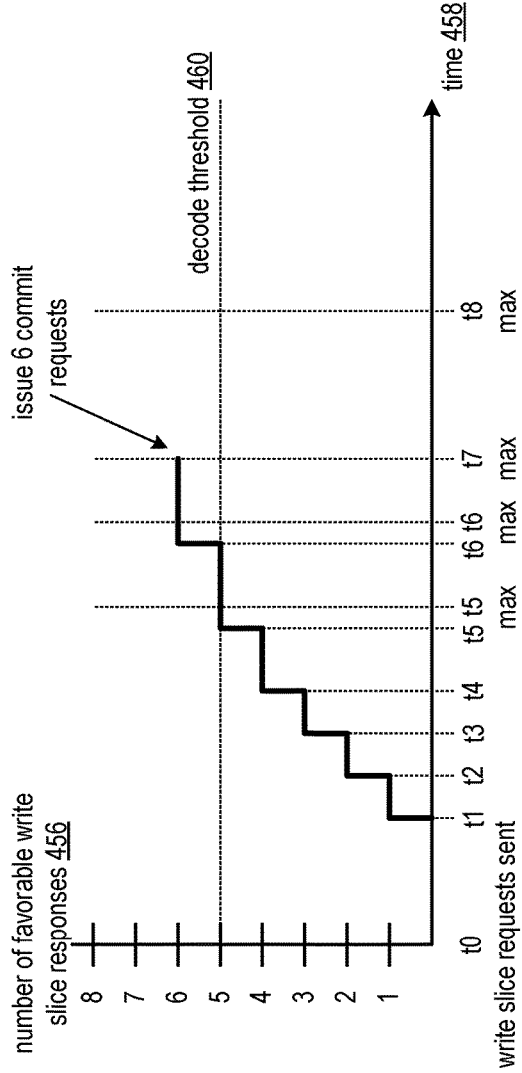
Figure 45E:
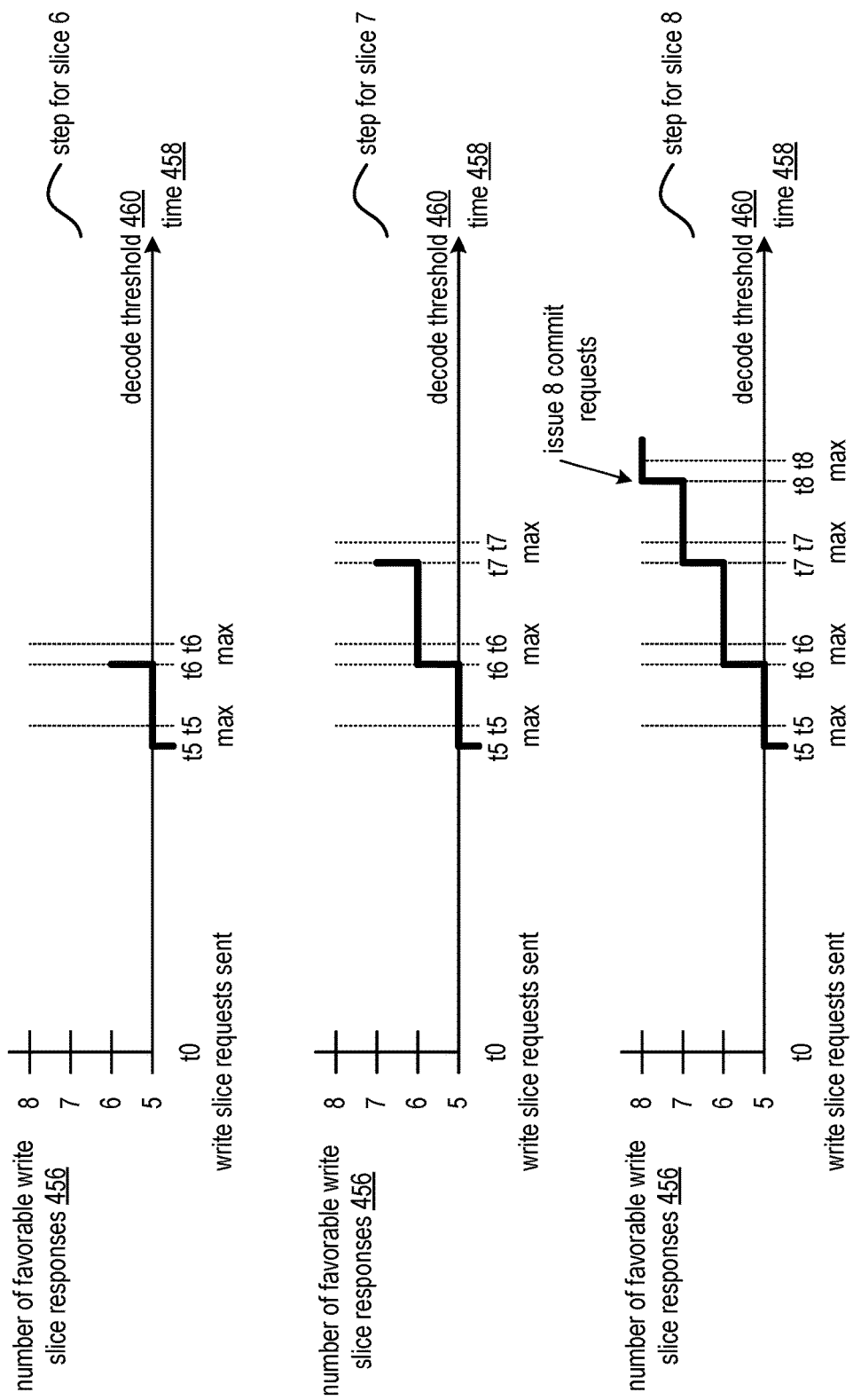
Figure 45F:
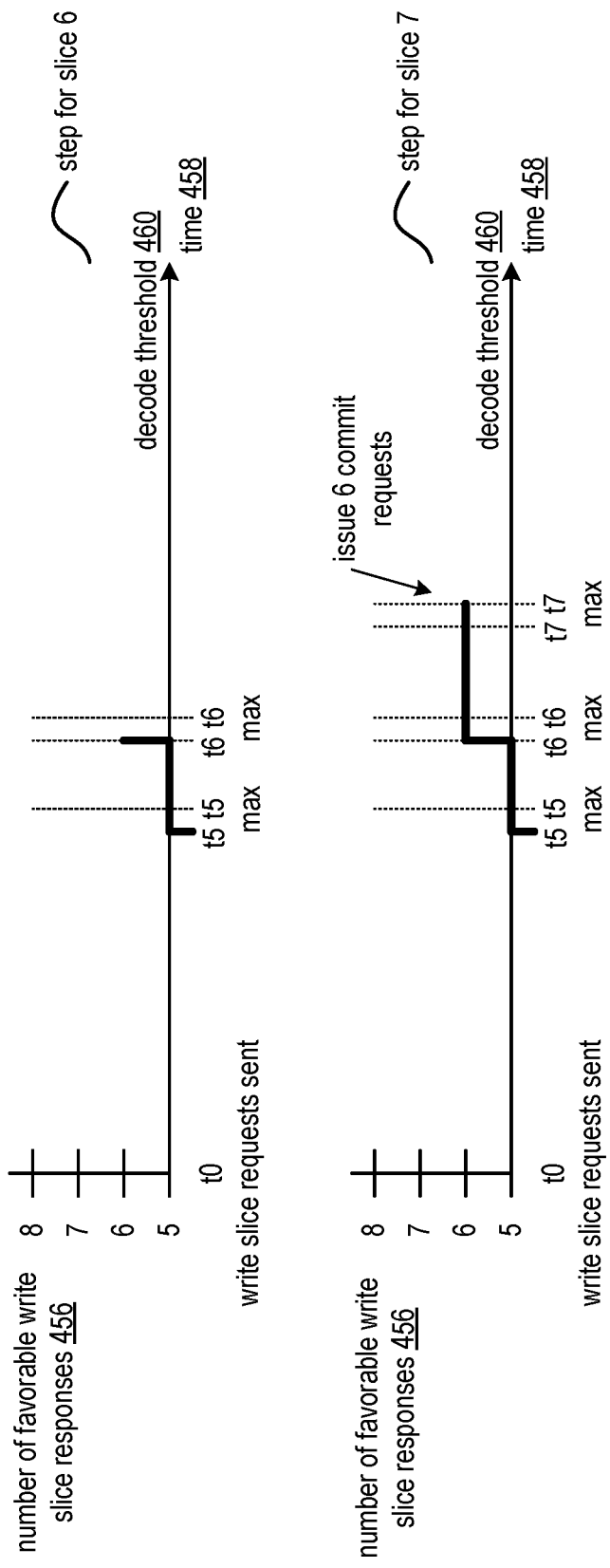
Figure 45G:
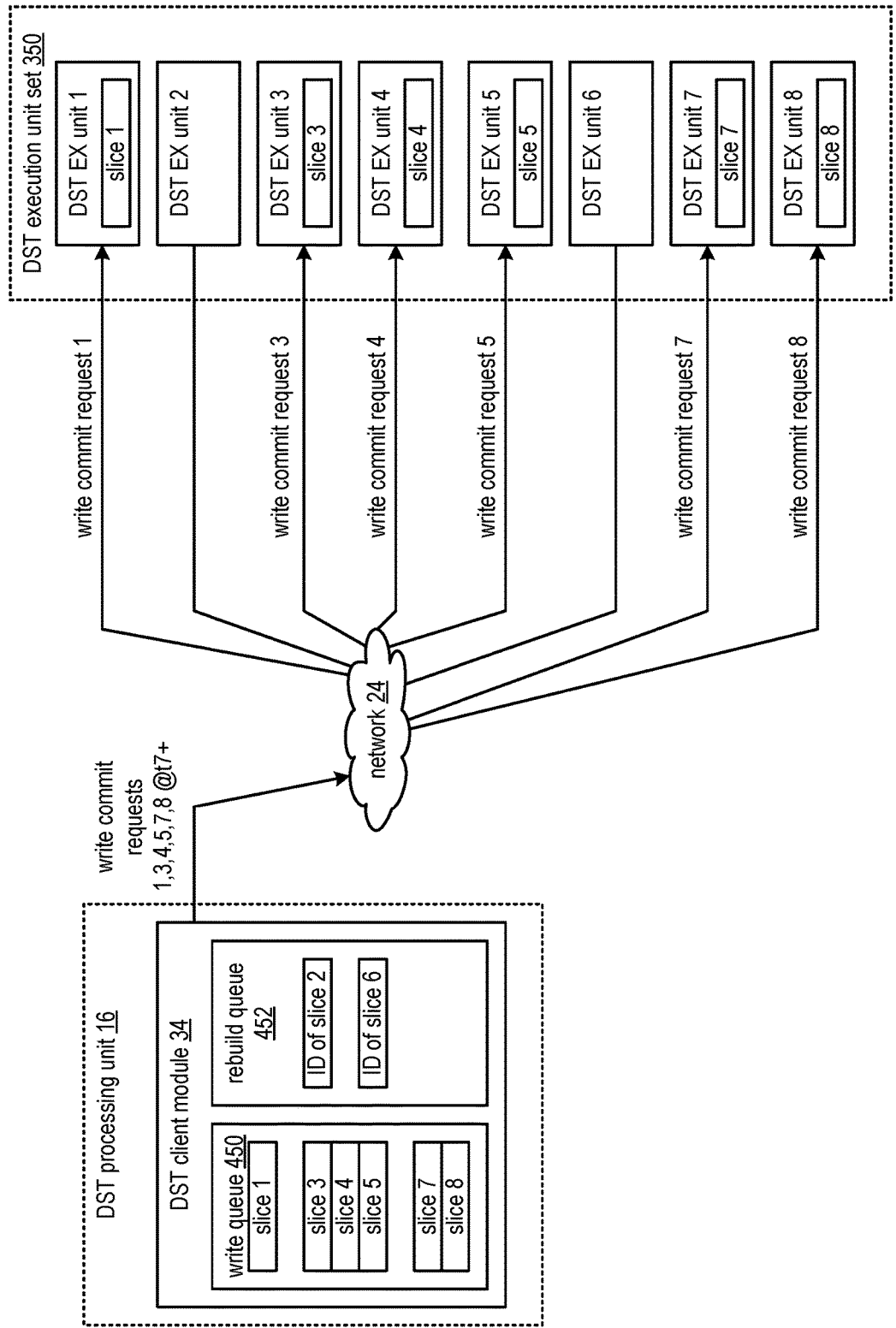
Figure 45H:
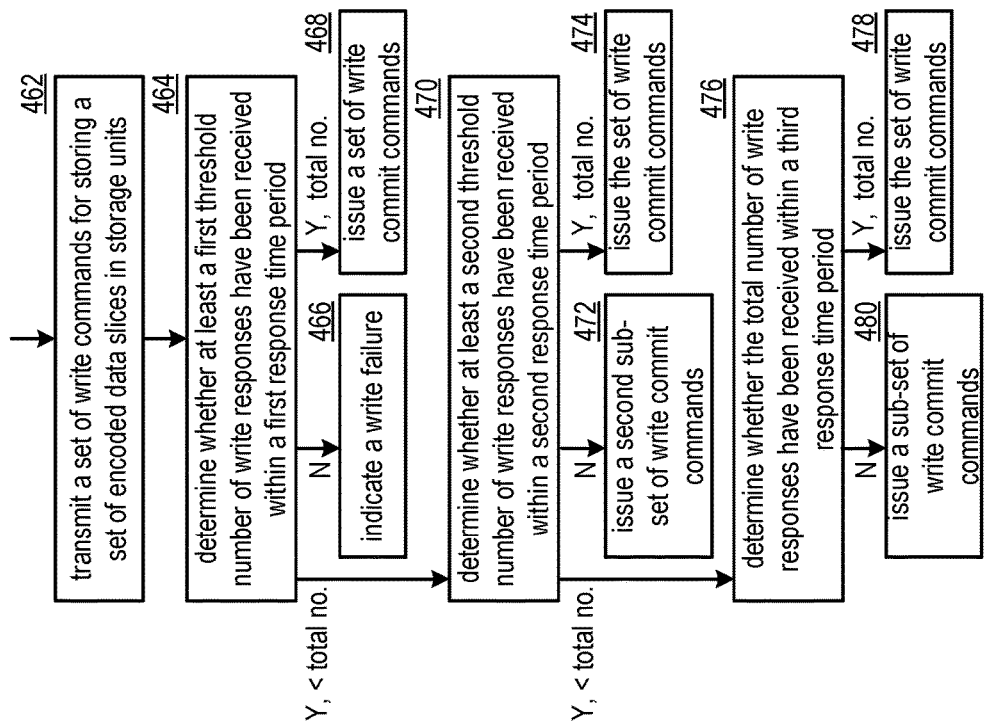
Figure 46A:
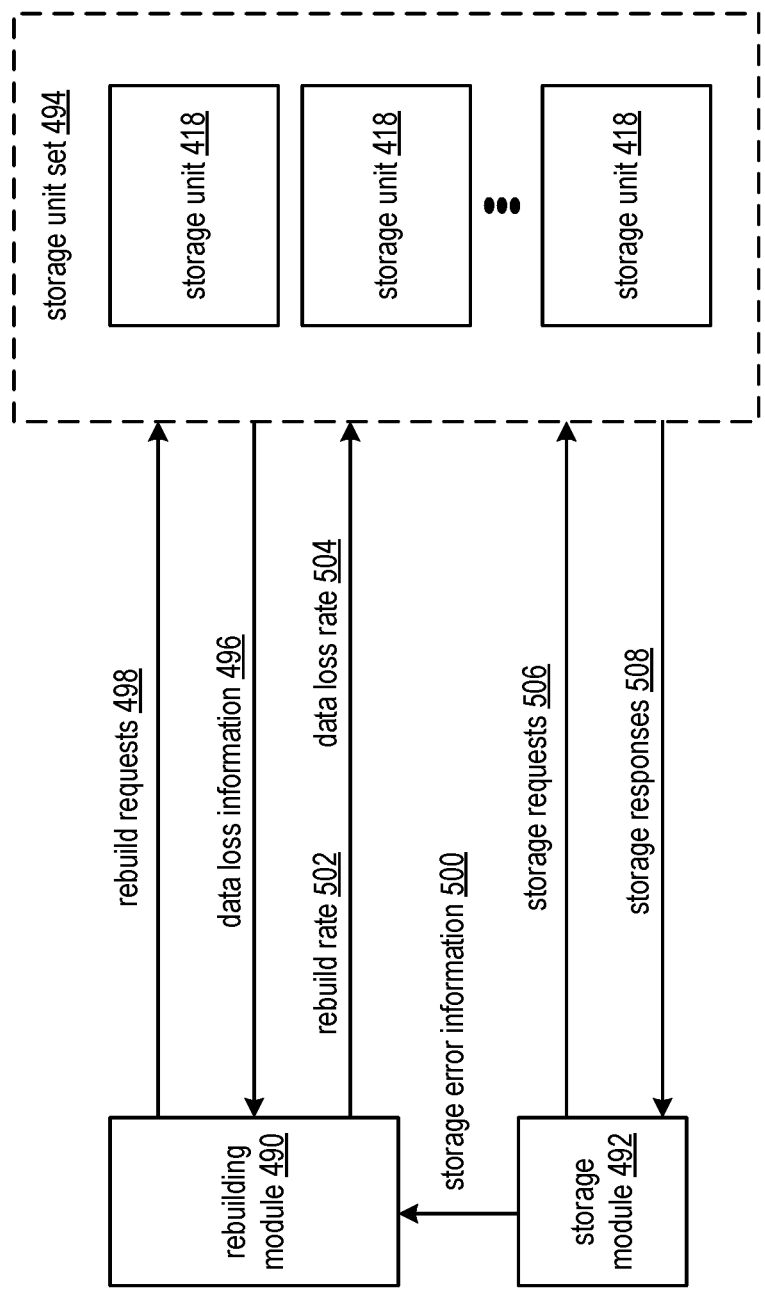
Figure 46B:
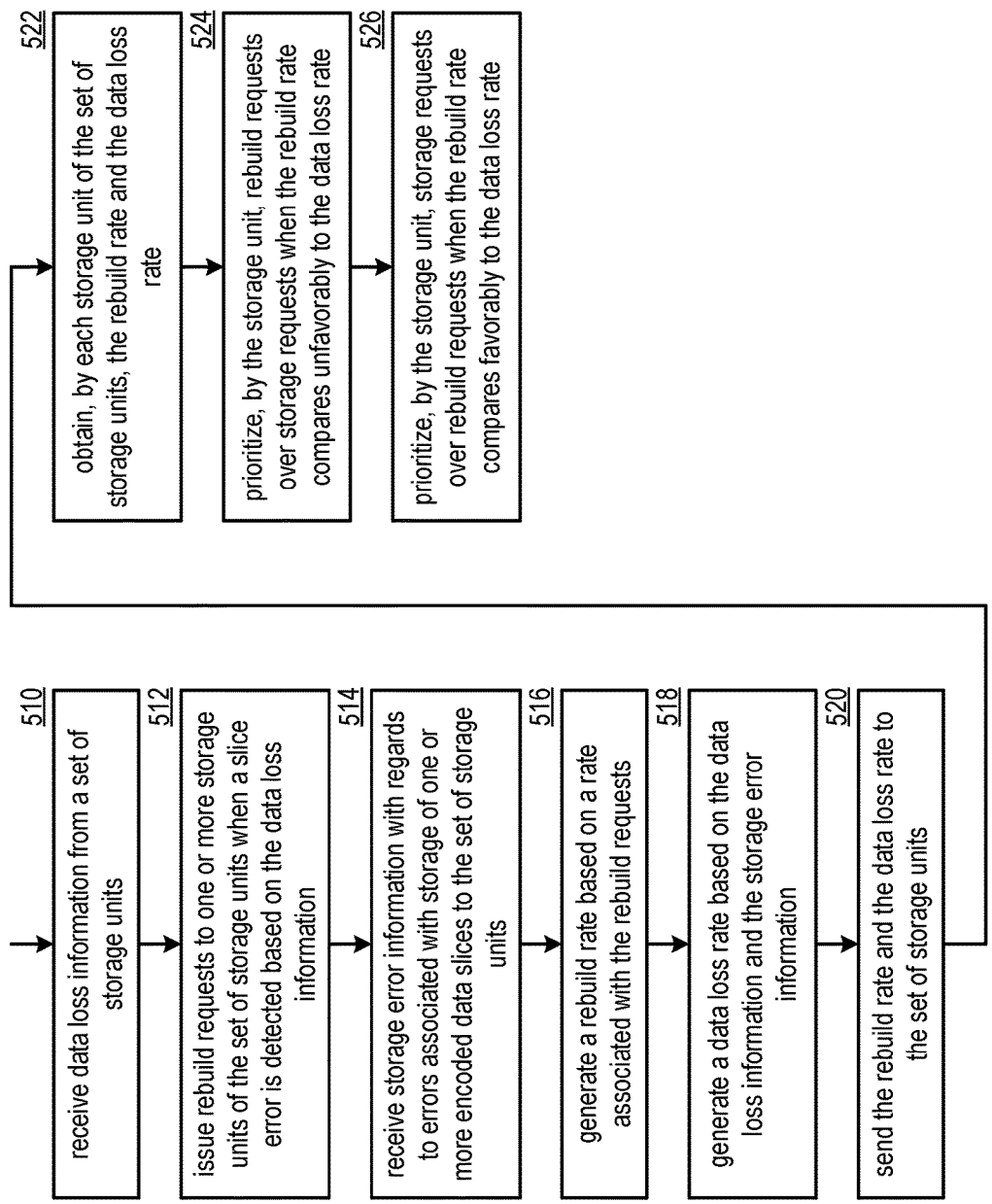
Figure 47C:
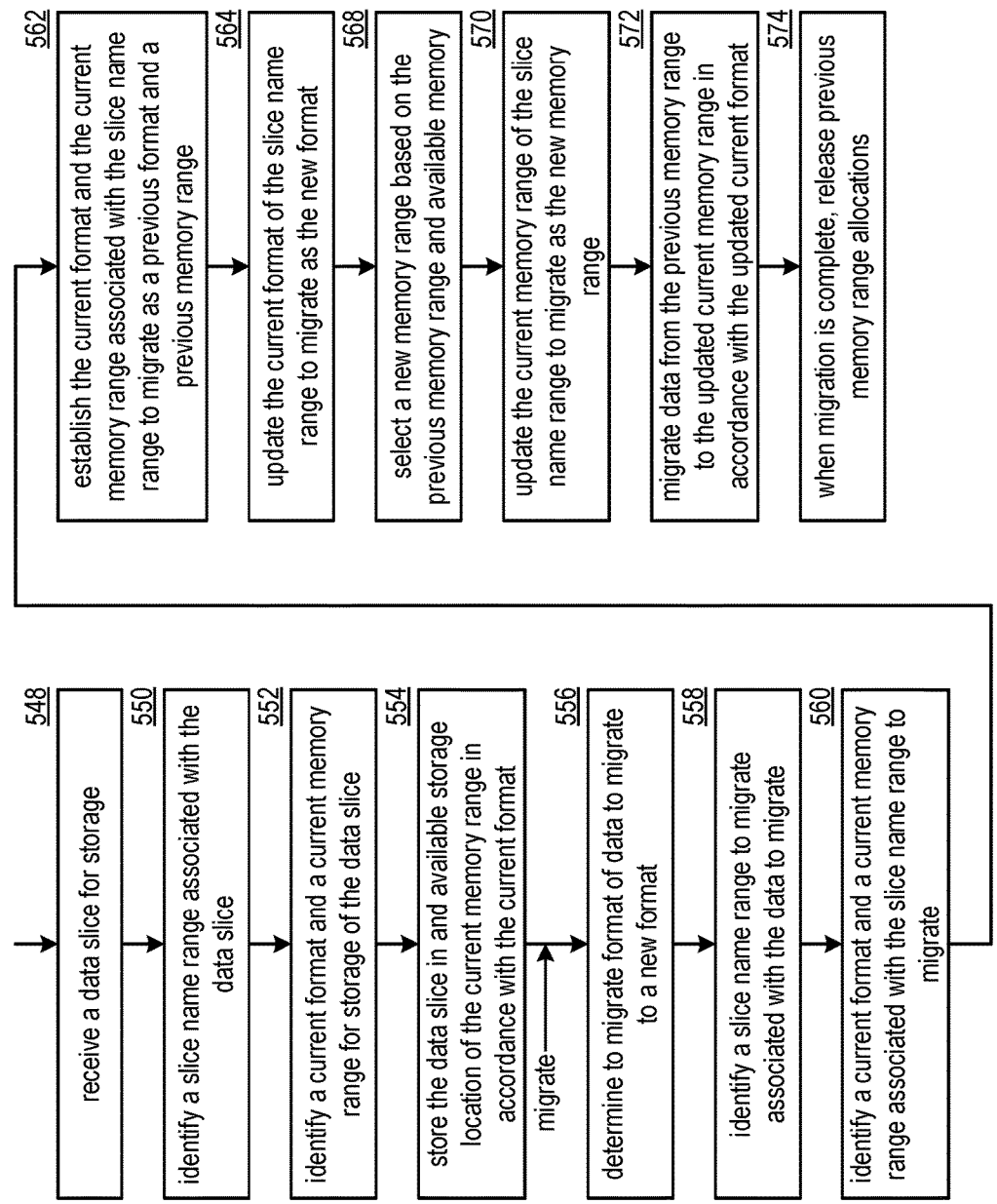
Figure 48A:
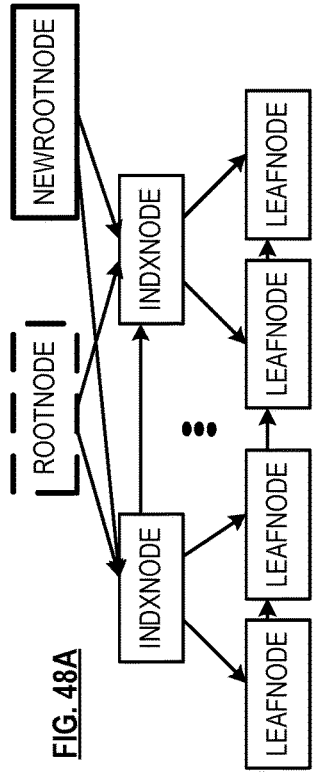
Figure 48B:
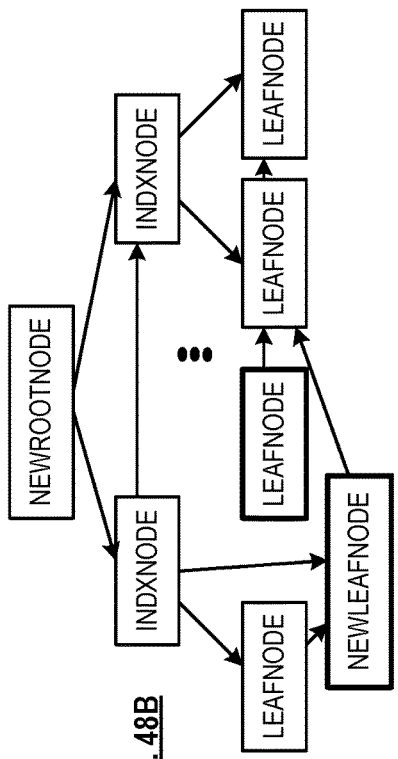
Figure 48C:
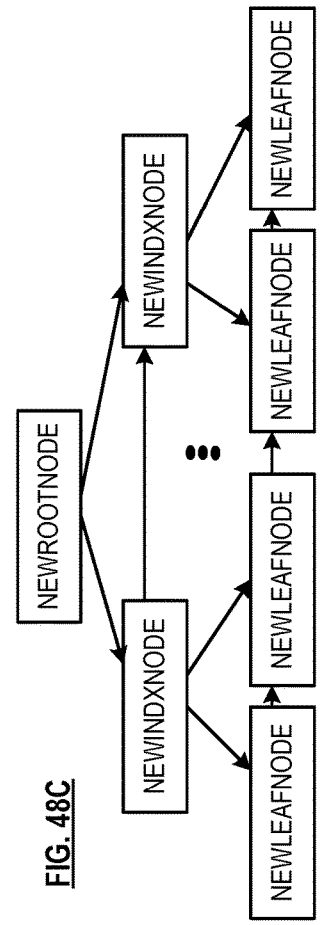
Figure 48D:
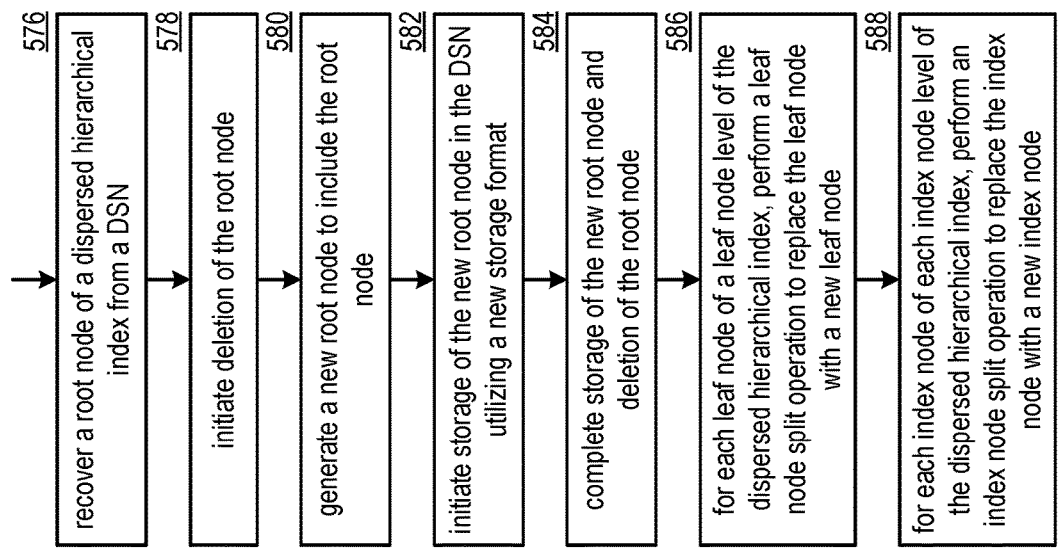
Figure 49A:
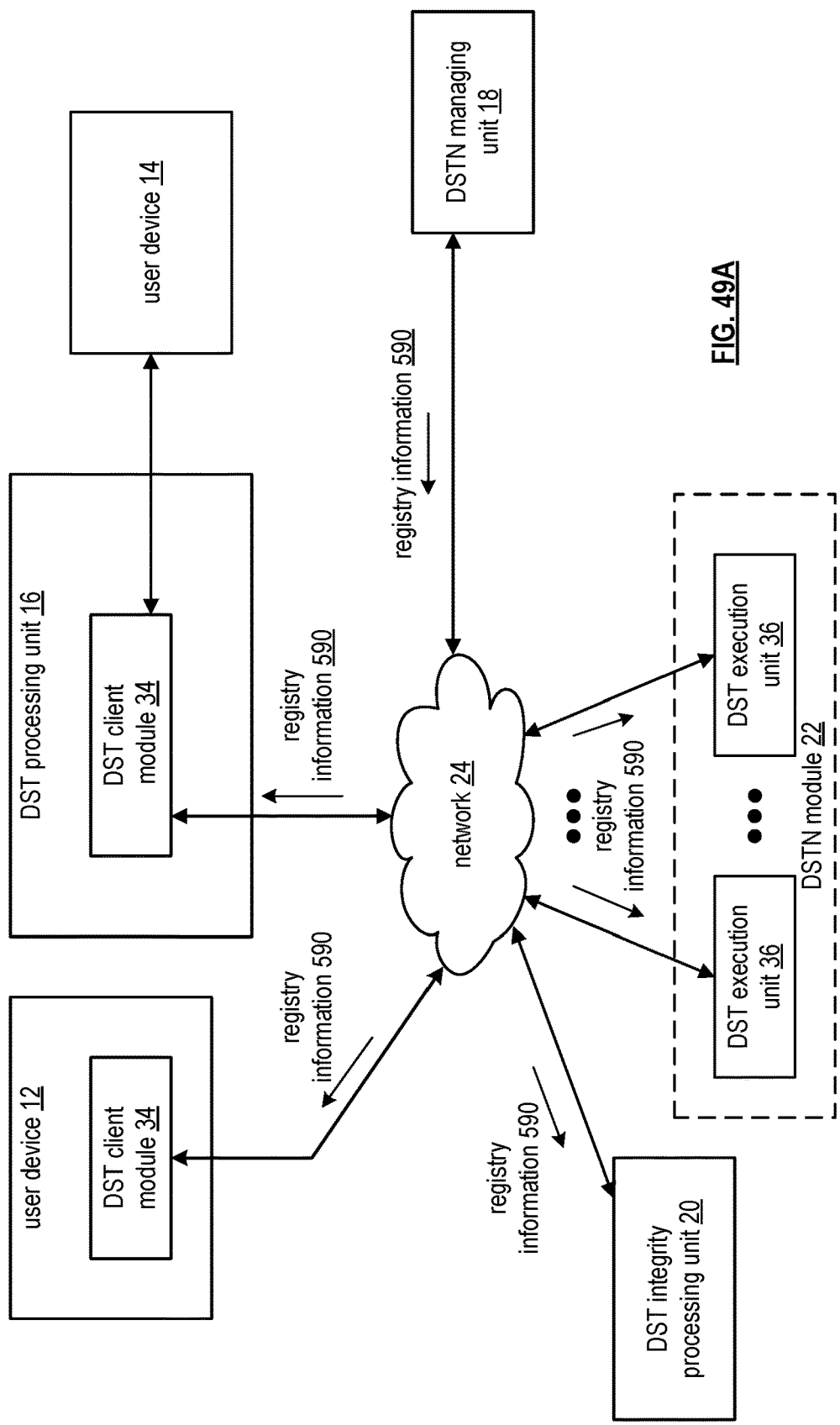
Figure 49B:
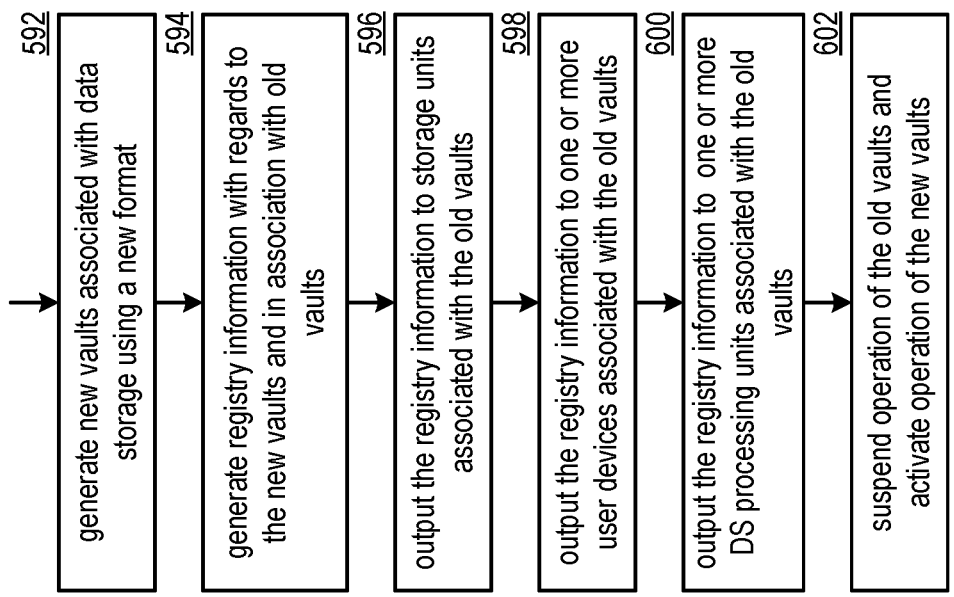
Figure 50A:
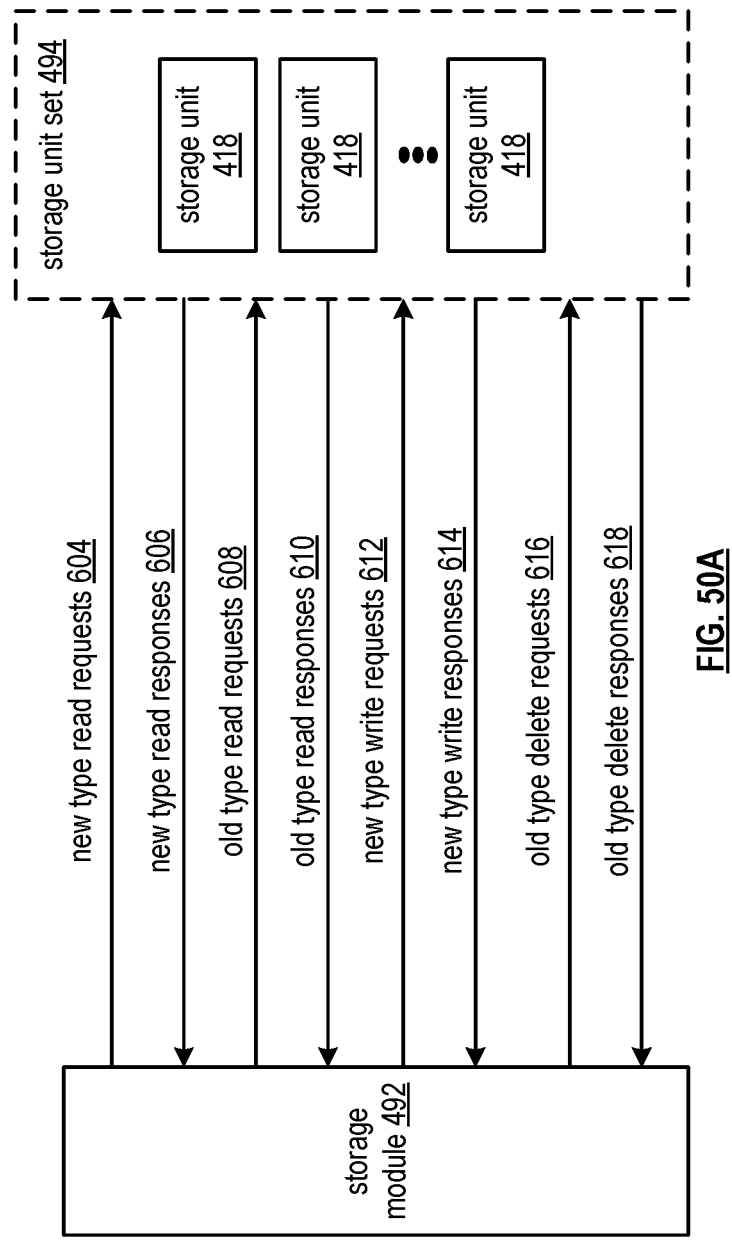
Figure 50B:
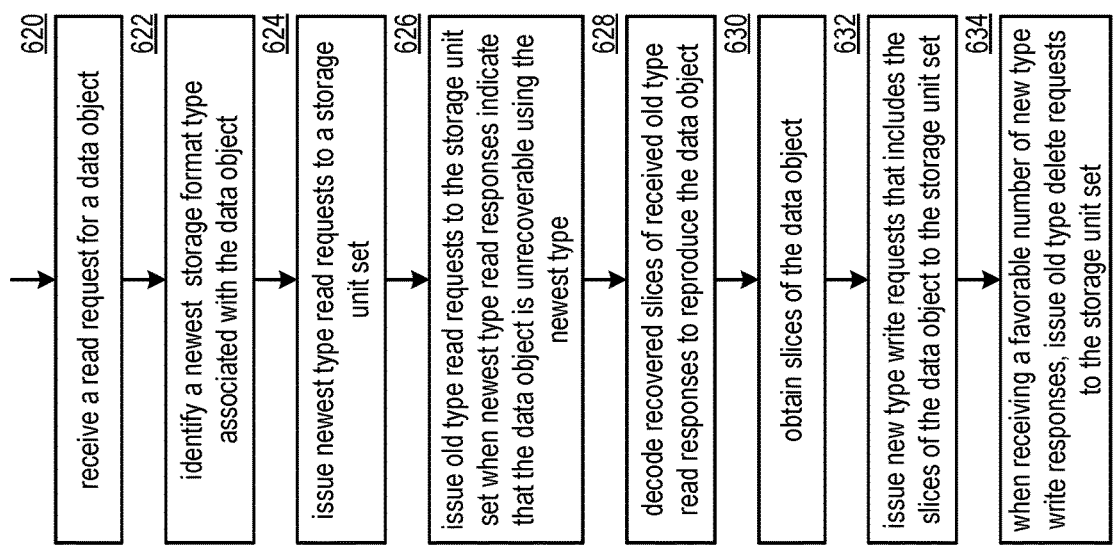

processing for retrieving dispersed error encoded data in accordance with the present invention;

FIG. 26 is a schematic block diagram of an example of a dispersed error decoding for the example of FIG. 25 in accordance with the present invention;

FIG. 27 is a schematic block diagram of an example of a distributed storage and task processing network (DSTN) module storing a plurality of data and a plurality of task codes in accordance with the present invention;

FIG. 28 is a schematic block diagram of an example of the distributed computing system performing tasks on stored data in accordance with the present invention;

FIG. 29 is a schematic block diagram of an embodiment of a task distribution module facilitating the example of FIG. 28 in accordance with the present invention;

FIG. 30 is a diagram of a specific example of the distributed computing system performing tasks on stored data in accordance with the present invention;

FIG. 31 is a schematic block diagram of an example of a distributed storage and task processing network (DSTN) module storing data and task codes for the example of FIG. 30 in accordance with the present invention;

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

FIG. 40A is a schematic block diagram of another embodiment of a distributed computing system in accordance with the present invention;

FIG. 40B is a flowchart illustrating an example of prioritizing rebuilding data in accordance with the present invention;

FIG. 41A is a schematic block diagram of another embodiment of a distributed computing system in accordance with the present invention;

FIG. 41B is a flowchart illustrating an example of prioritizing reading data in accordance with the present invention;

FIG. 42A is a schematic block diagram of another embodiment of a distributed computing system in accordance with the present invention;

FIG. 42B is a flowchart illustrating an example of prioritizing storing data in accordance with the present invention;

FIG. 43A is a schematic block diagram of another embodiment of a distributed computing system in accordance with the present invention;

FIG. 43B is a flowchart illustrating an example of prioritizing distributed computing tasks in accordance with the present invention;

FIG. 44A is a schematic block diagram of an embodiment of a dispersed storage network in accordance with the present invention;

FIG. 44B is a flowchart illustrating an example of assigning storage resources in accordance with the present invention;

FIGS. 45A, 45B, and 45G are schematic block diagrams of other embodiments of a dispersed storage network (DSN) illustrating examples of storing data in accordance with the present invention;

FIGS. 45C, 45D, 45E, and 45F are timing diagrams illustrating examples of establishing response time periods in accordance with the present invention;

FIG. 45H is a flowchart illustrating an example of storing data in accordance with the present invention;

FIG. 46A is a schematic block diagram of another embodiment of a dispersed storage network in accordance with the present invention;

FIG. 46B is a flowchart illustrating another example of prioritizing rebuilding data in accordance with the present invention;

FIG. 47A is a schematic block diagram of an embodiment of a set of storage units in accordance with the present invention;

FIG. 47B is a diagram illustrating an example of a structure of a storage information table in accordance with the present invention;

FIG. 47C is a flowchart illustrating an example of migrating data formats in accordance with the present invention;

FIGS. 48A-C are diagrams illustrating examples of a series of steps for updating a dispersed hierarchical index structure in accordance with the present invention;

FIG. 48D is a flowchart illustrating an example of migrating nodes of a dispersed hierarchical index to a new data format in accordance with the present invention;

FIG. 49A is a schematic block diagram of another embodiment of a distributed computing system in accordance with the present invention;

FIG. 49B is a flowchart illustrating an example of updating a storage format in accordance with the present invention;

FIG. 50A is a schematic block diagram of another embodiment of a dispersed storage network in accordance with the present invention; and FIG. 50B is a flowchart illustrating an example of converting a storage format type in accordance with the present invention

DETAILED DESCRIPTION OF THE INVENTION

Figure 1:
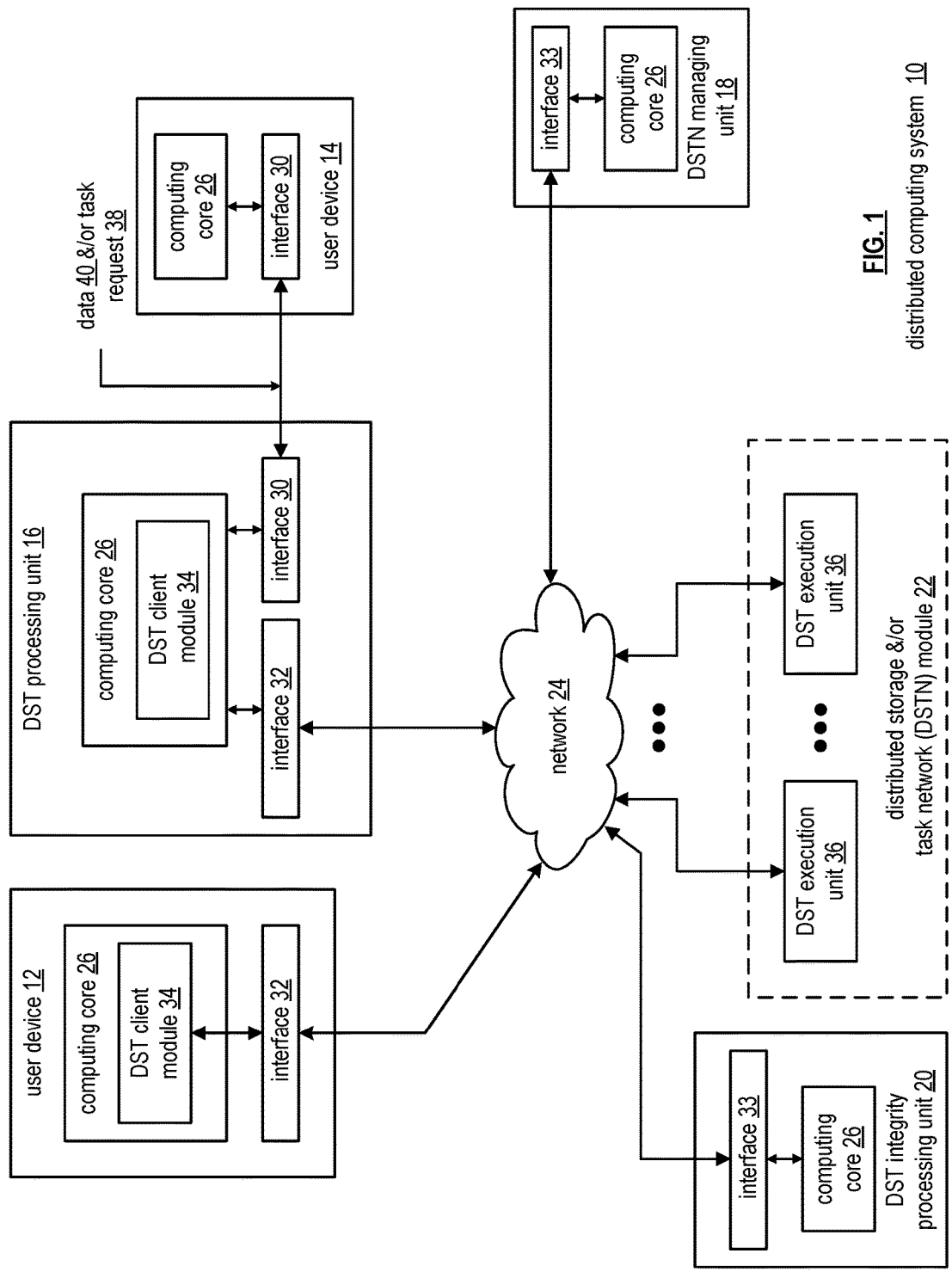
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g., or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
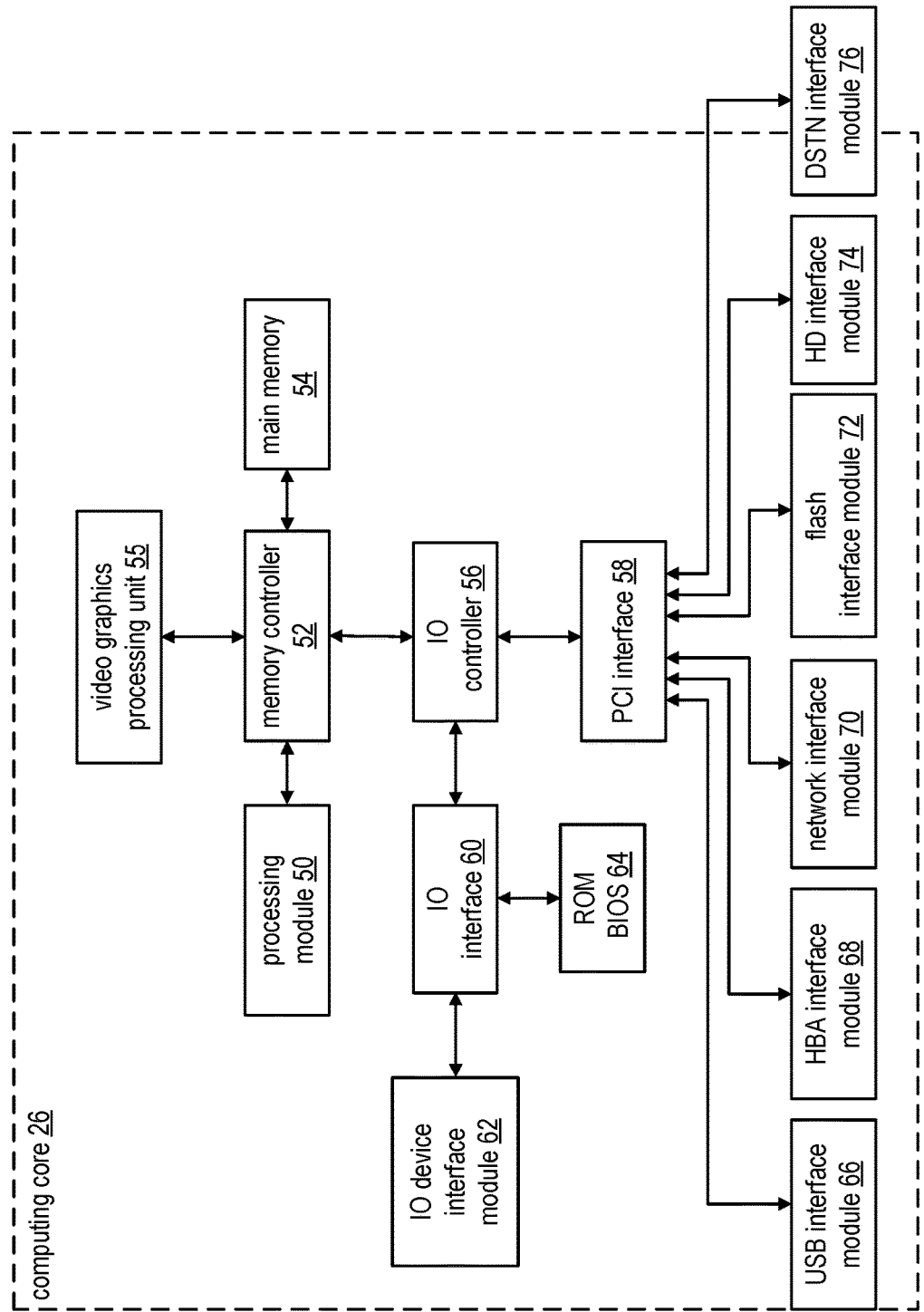
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
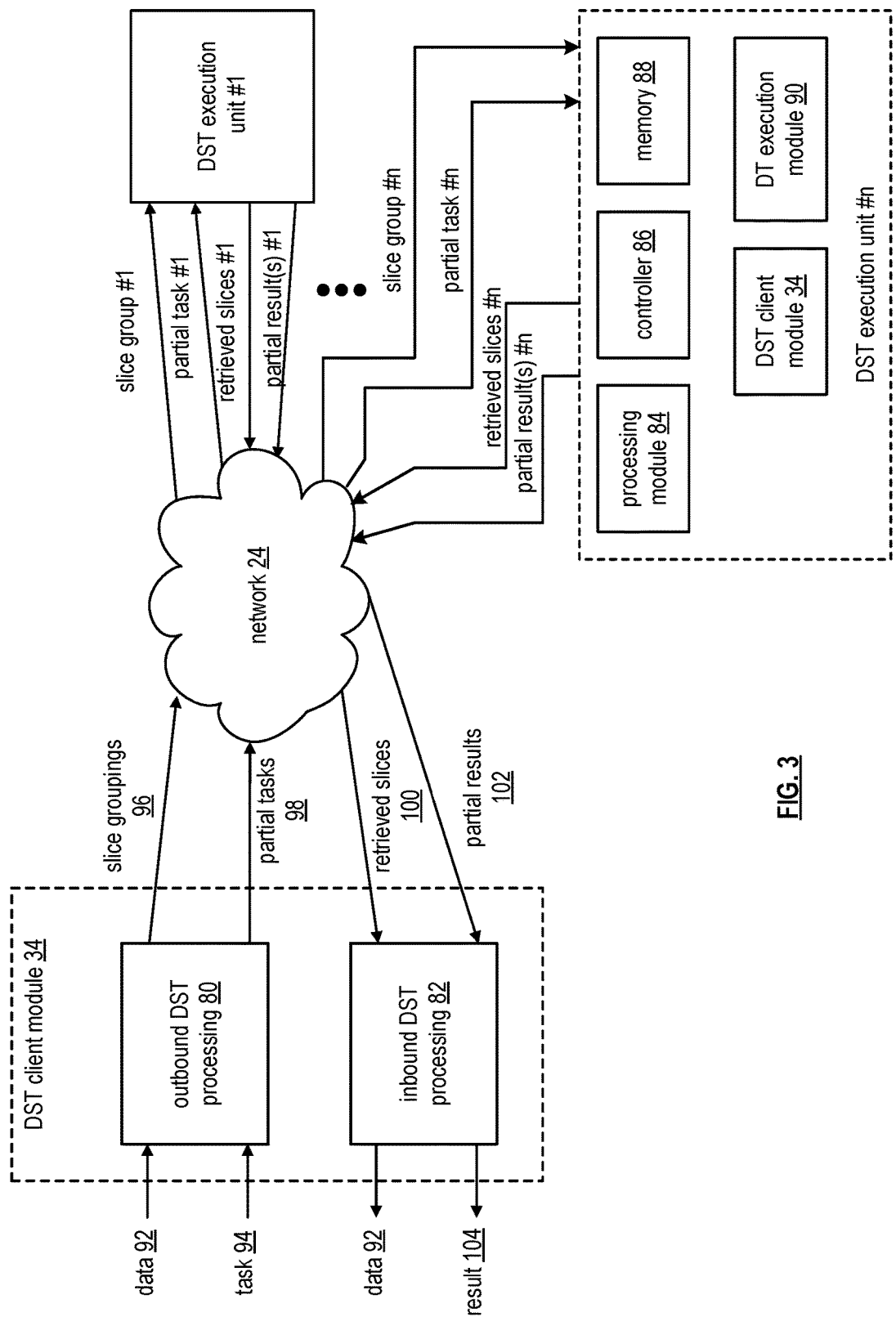
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terabytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terabytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-n.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
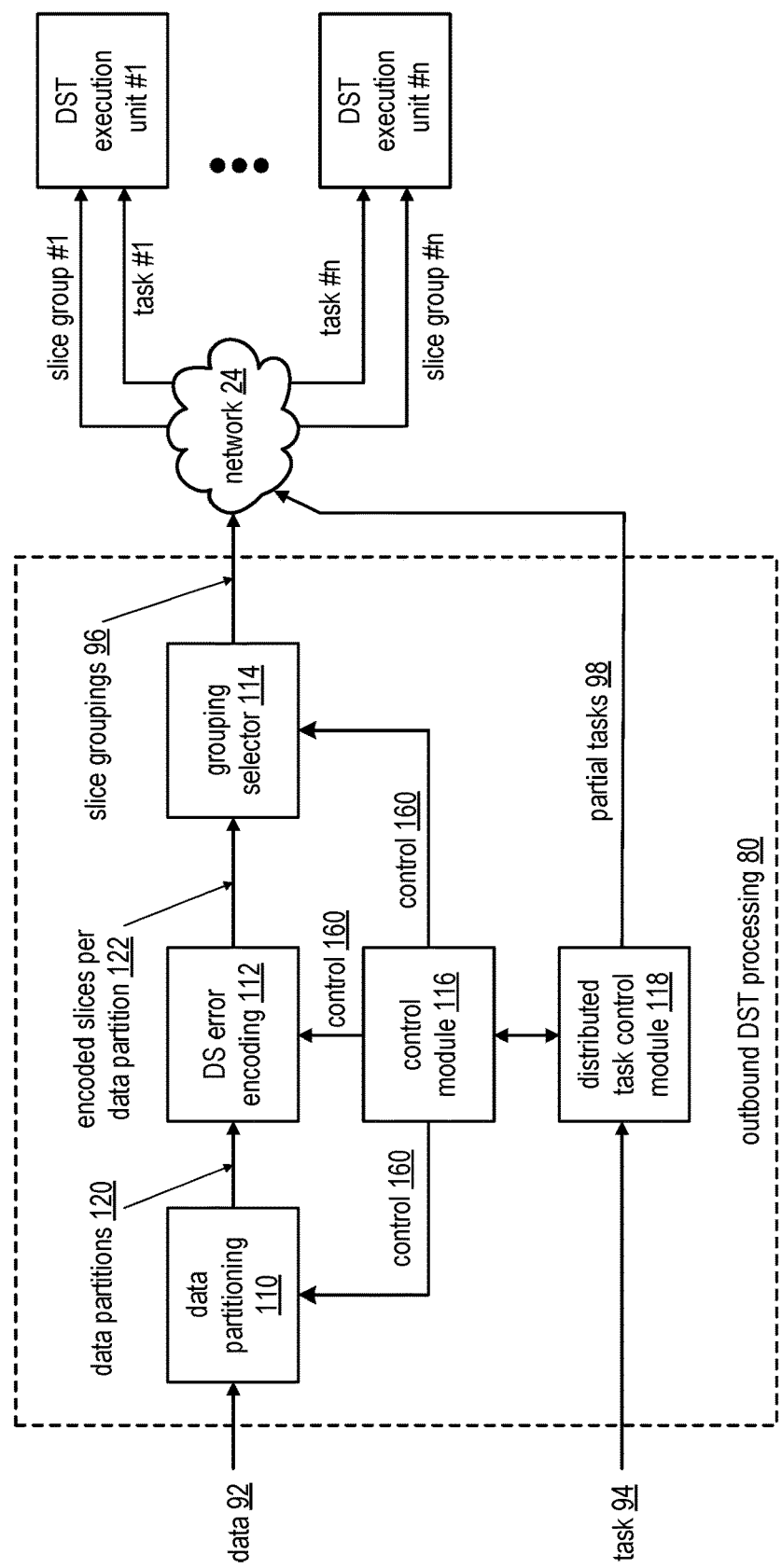
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terabytes) into 100,000 data segments, each being 1 Gigabyte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the grouping selector module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phrase and a second set of partial tasks for finding and counting the second phrase. The distributed task control module 118 sends respective first and/or second partial tasks 98 to each DST execution unit 36.

Figure 5:
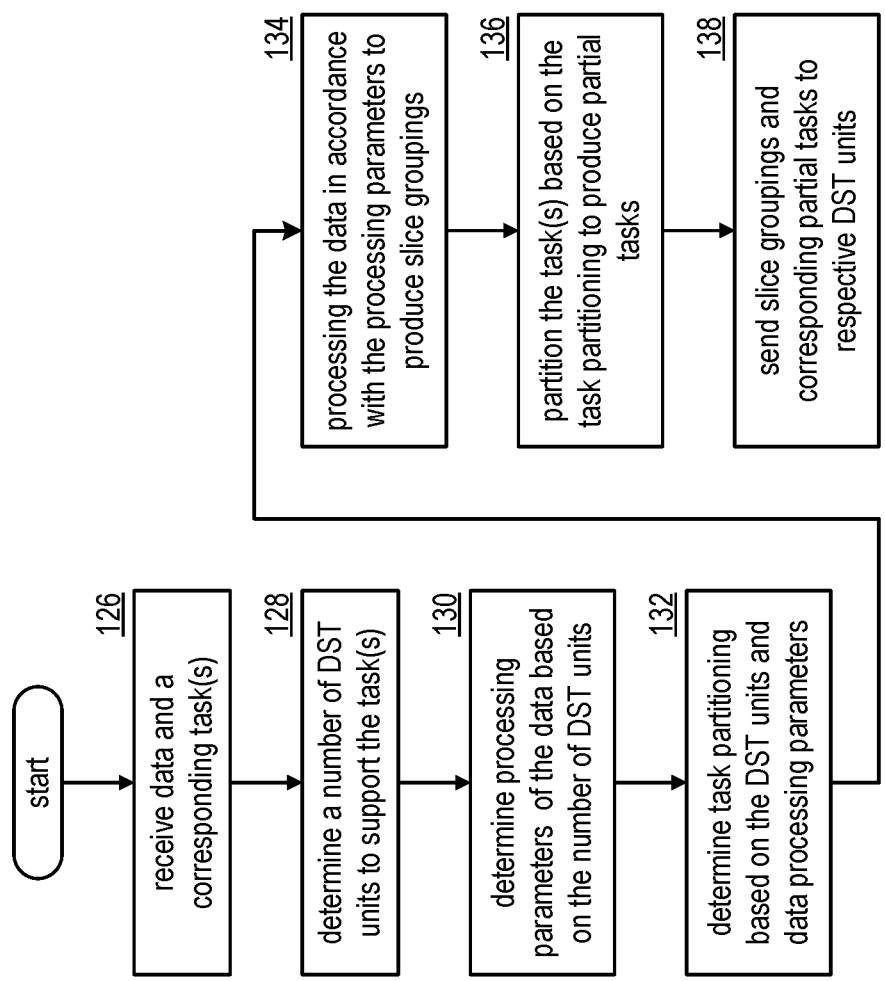
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
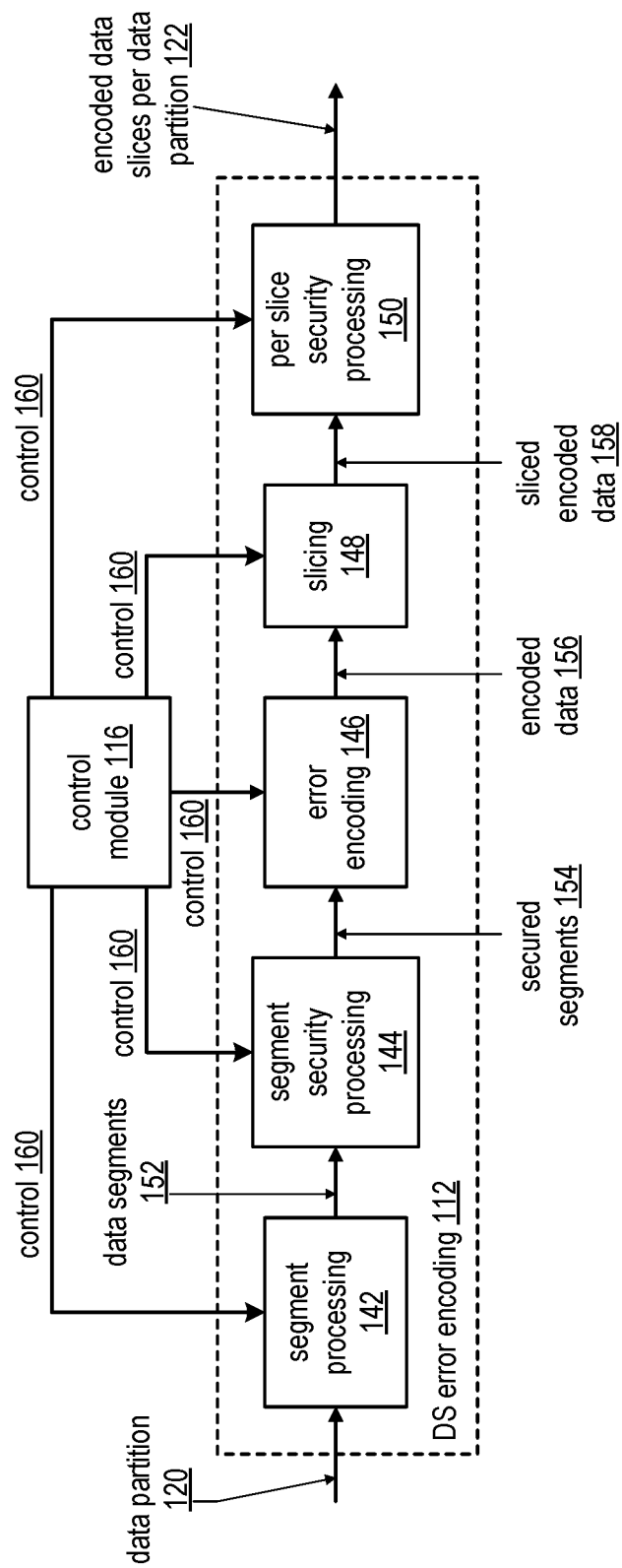
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of encoded data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
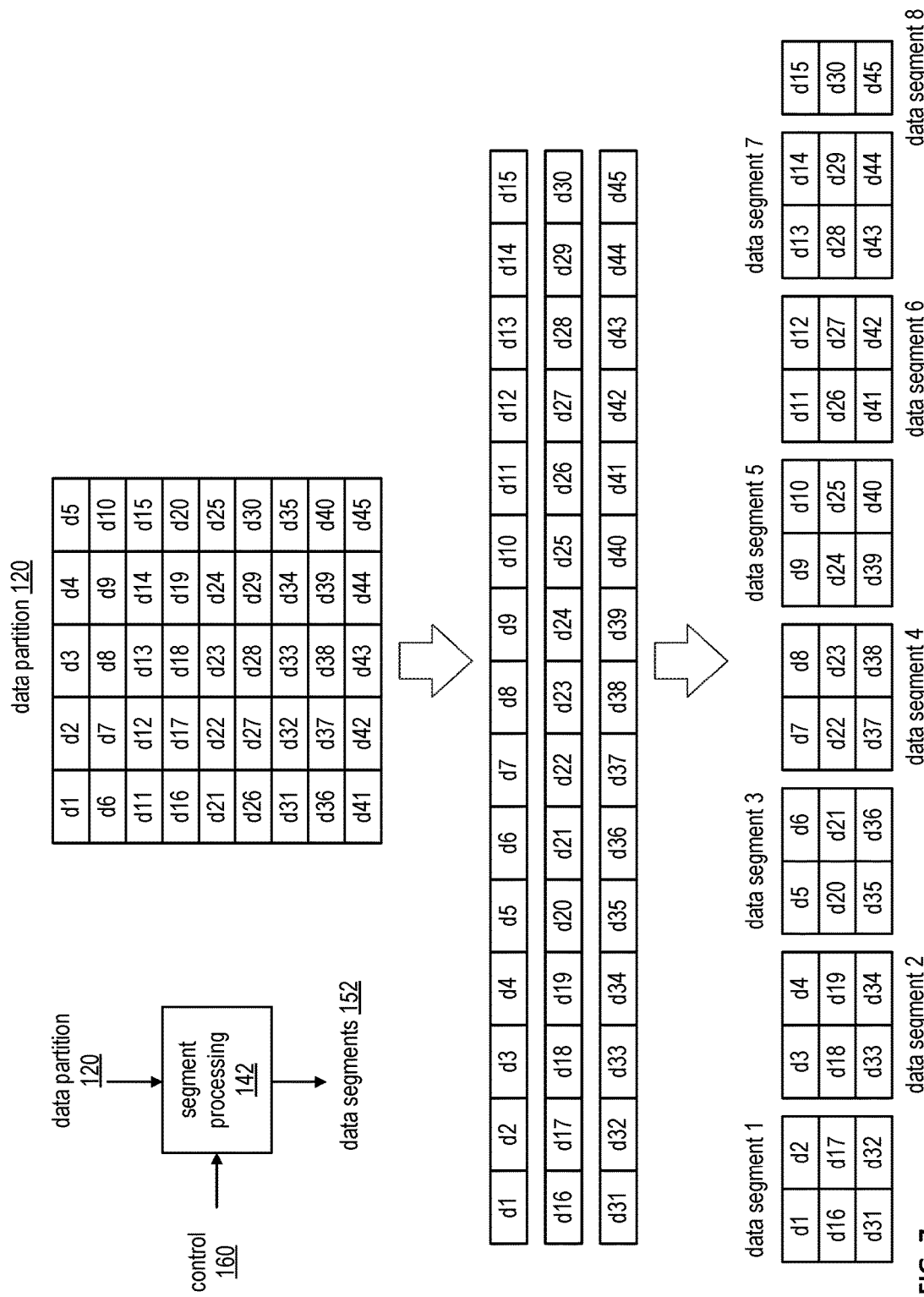
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
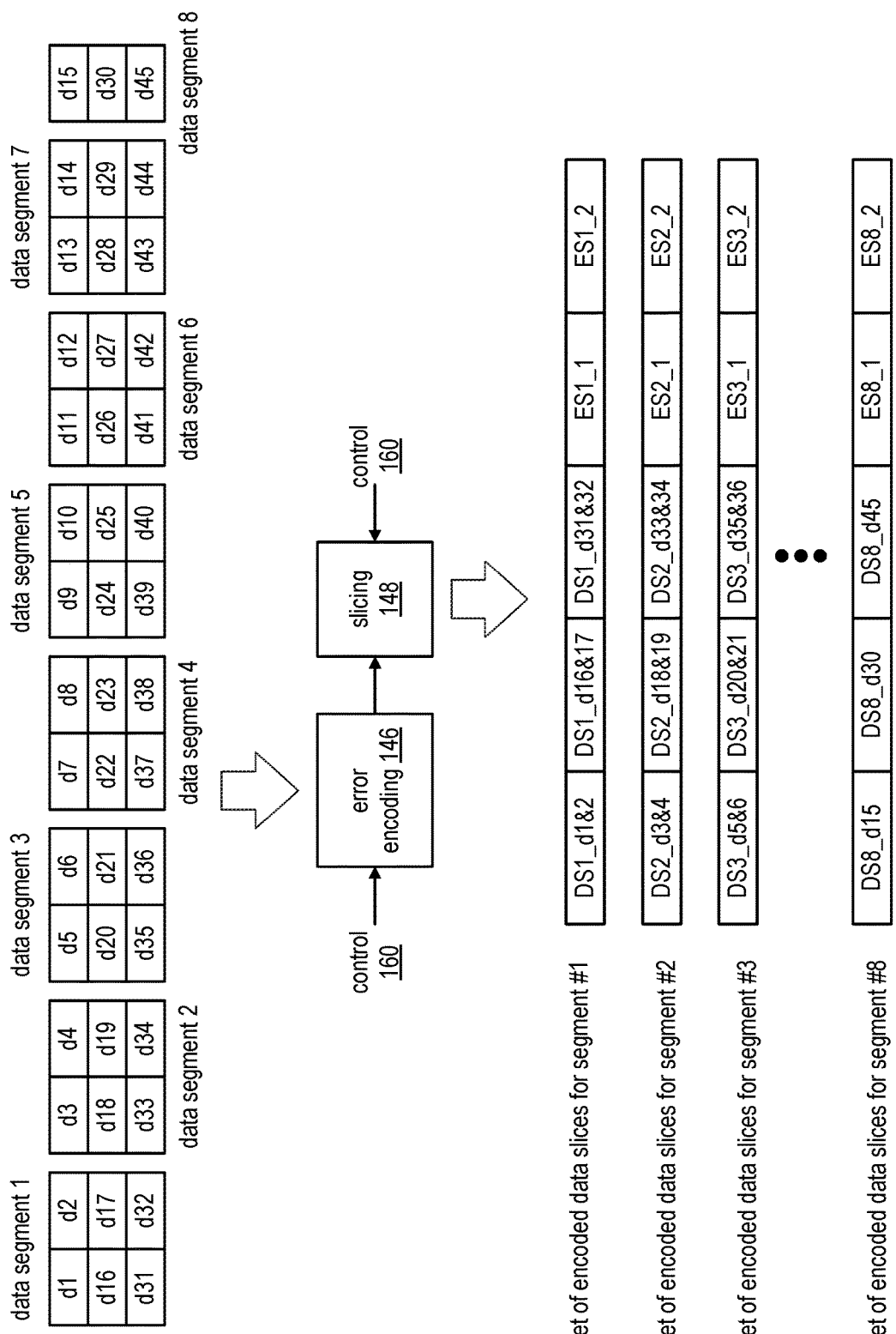
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_d1&2) of the first set of encoded data slices (e.g., corresponding to data segment 1) is substantially similar to content of the first word (e.g., d1 & d2); the content of the second encoded data slice (DS1_d16&17) of the first set of encoded data slices is substantially similar to content of the second word (e.g., d16 & d17); and the content of the third encoded data slice (DS1_d31&32) of the first set of encoded data slices is substantially similar to content of the third word (e.g., d31 & d32).

The content of the fourth and fifth encoded data slices (e.g., ES1_1 and ES1_2) of the first set of encoded data slices include error correction data based on the first-third words of the first data segment. With such an encoding and slicing scheme, retrieving any three of the five encoded data slices allows the data segment to be accurately reconstructed.

The encoding and slicing of data segments 2-7 yield sets of encoded data slices similar to the set of encoded data slices of data segment 1. For instance, the content of the first encoded data slice (DS2_d3&4) of the second set of encoded data slices (e.g., corresponding to data segment 2) is substantially similar to content of the first word (e.g., d3 & d4); the content of the second encoded data slice (DS2_d18&19) of the second set of encoded data slices is substantially similar to content of the second word (e.g., d18 & d19); and the content of the third encoded data slice (DS2_d33&34) of the second set of encoded data slices is substantially similar to content of the third word (e.g., d33 & d34). The content of the fourth and fifth encoded data slices (e.g., ES1_1 and ES1_2) of the second set of encoded data slices includes error correction data based on the first-third words of the second data segment.

Figure 9:
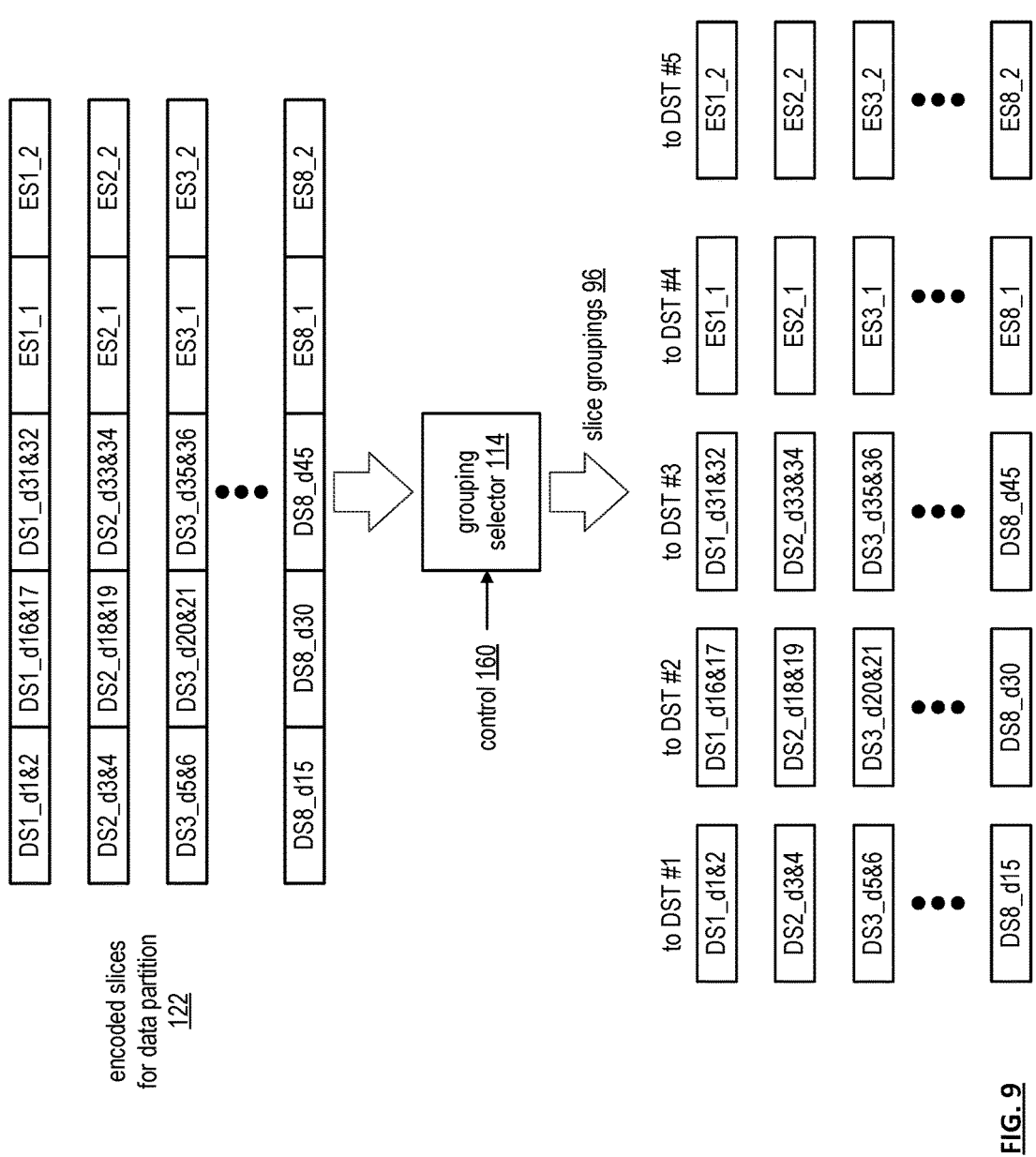
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with group selection information as control information 160 from a control module. Encoded slices for data partition 122 are grouped in accordance with the control information 160 to produce slice groupings 96. In this example, a grouping selector module 114 organizes the encoded data slices into five slice groupings (e.g., one for each DST execution unit of a distributed storage and task network (DSTN) module). As a specific example, the grouping selector module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selector module 114 also creates a second slice grouping for a DST execution unit #2, which includes second encoded slices of each of the sets of encoded slices. As such, the second DST execution unit receives encoded data slices corresponding to data blocks 16-30. The grouping selector module 114 further creates a third slice grouping for DST execution unit #3, which includes third encoded slices of each of the sets of encoded slices. As such, the third DST execution unit receives encoded data slices corresponding to data blocks 31-45.

The grouping selector module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selector module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
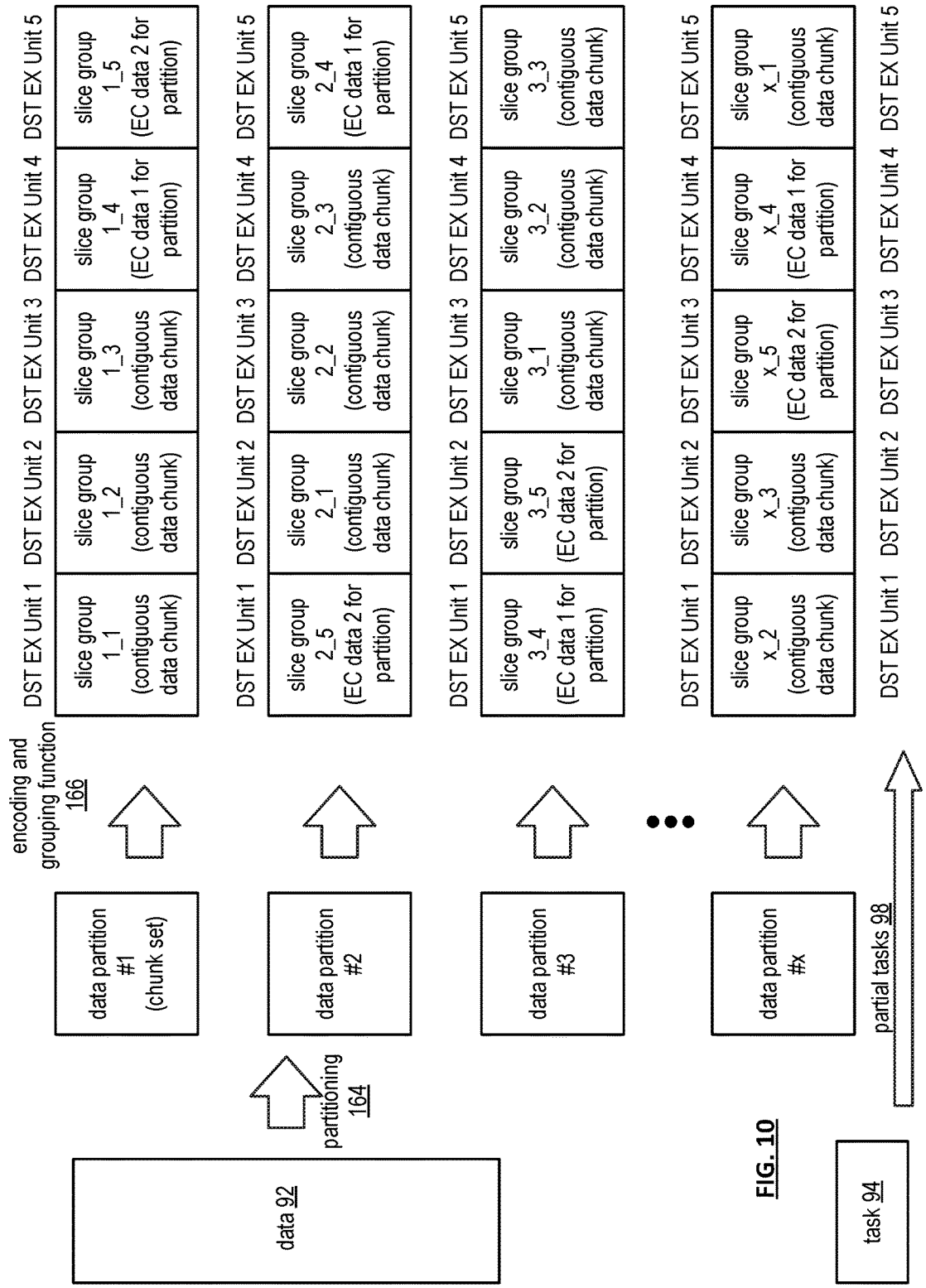
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1-x, where x is an integer greater than 4). Each data partition (or chunkset of data) is encoded and grouped into slice groupings as previously discussed by an encoding and grouping function 166. For a given data partition, the slice groupings are sent to distributed storage and task (DST)

execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

Figure 11:
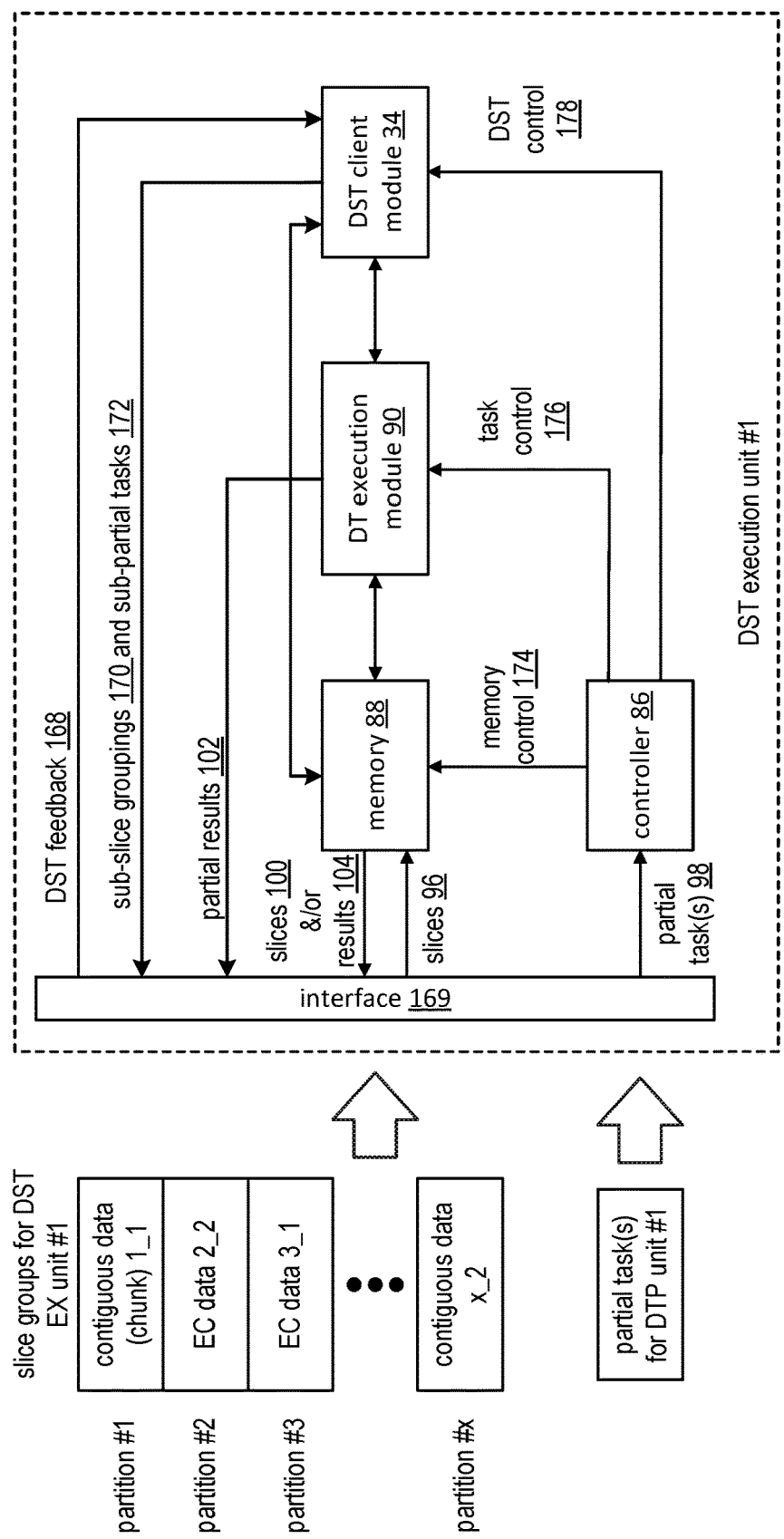
FIG. 11 is a schematic block diagram of an embodiment of a DST execution unit in accordance with the present invention.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 in the memory 88. For example, when the partial task 98 includes a retrieval request, the controller 86 outputs the memory control 174 to the memory 88 to facilitate retrieval of slices 100 and/or results 104.

Figure 12:
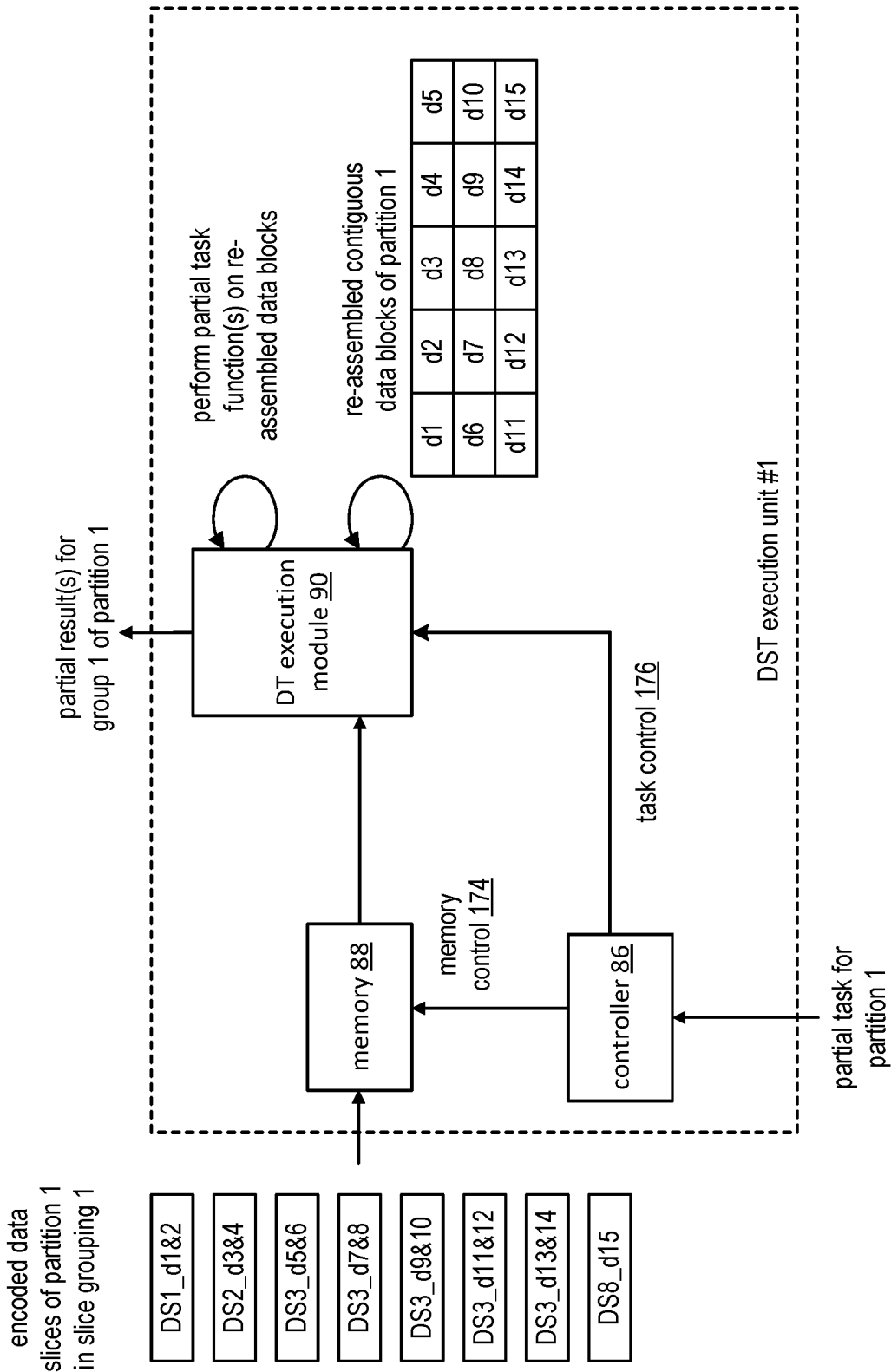
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step of executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
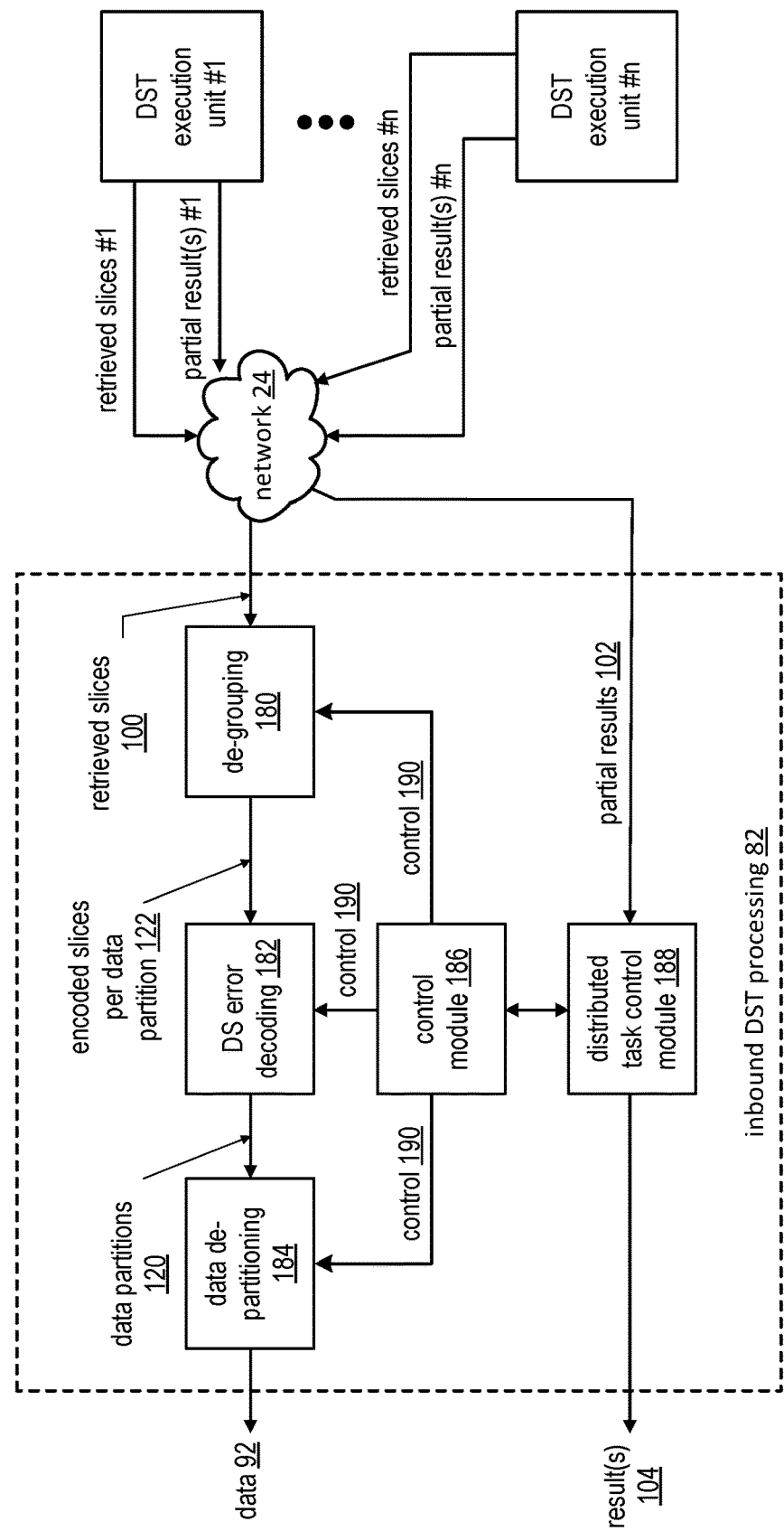
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved encoded data slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieved encoded data slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 14:
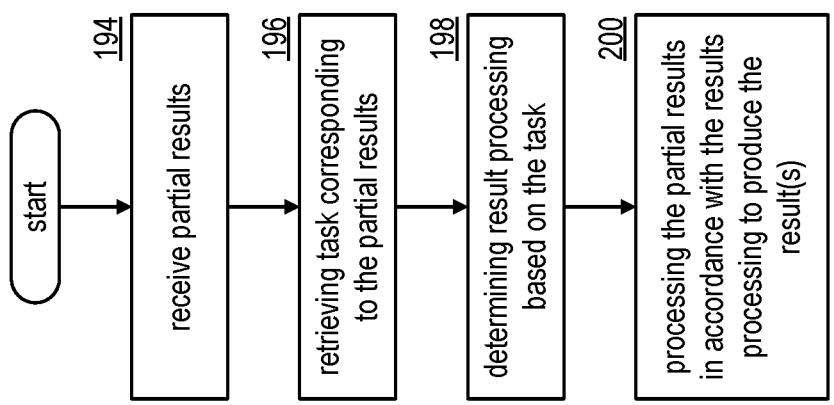
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, results of processing the information would indicate to add the partial results to produce the final results. The method continues at step 200 where the DST client module processes the partial results in accordance with the result processing information to produce the final result or results.

Figure 15:
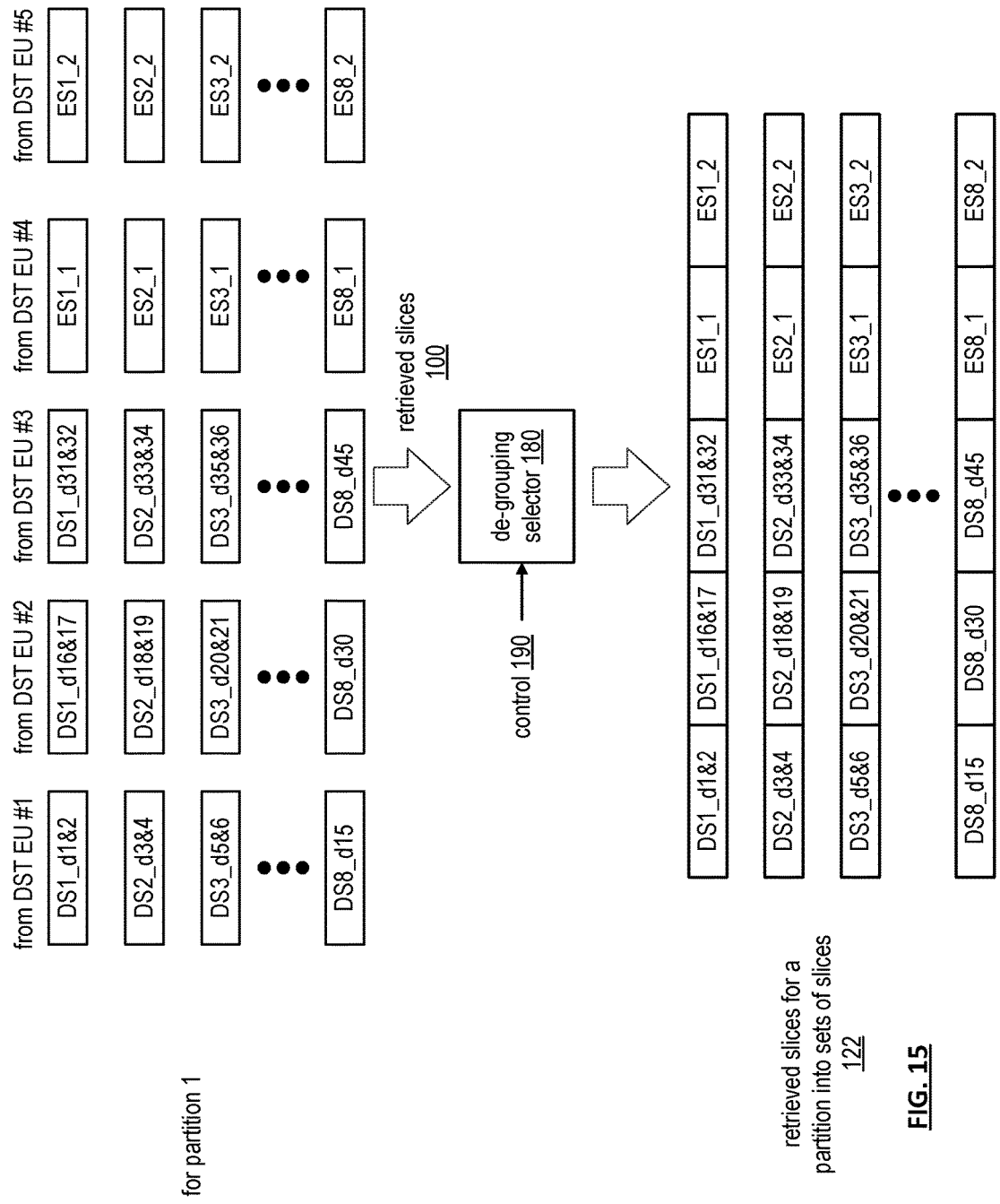
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
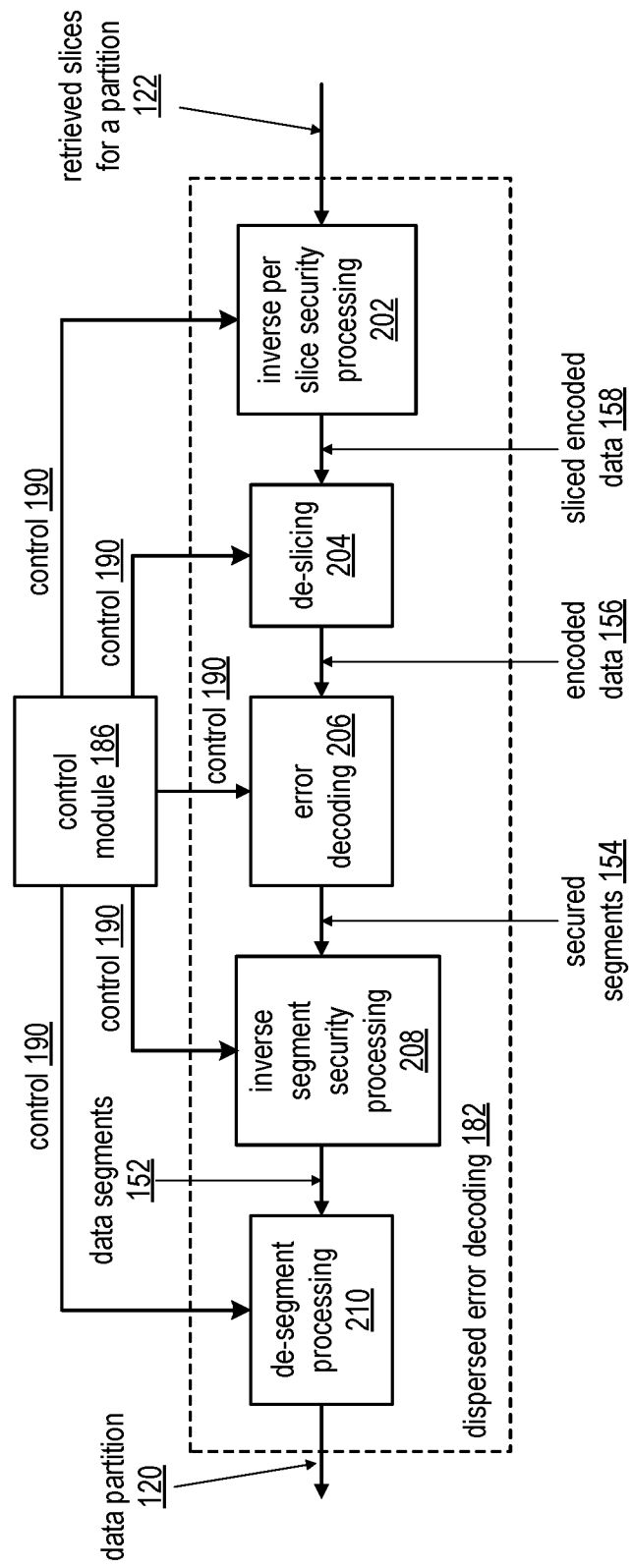
FIG. 16 is a schematic block diagram of an embodiment of a dispersed error decoding in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
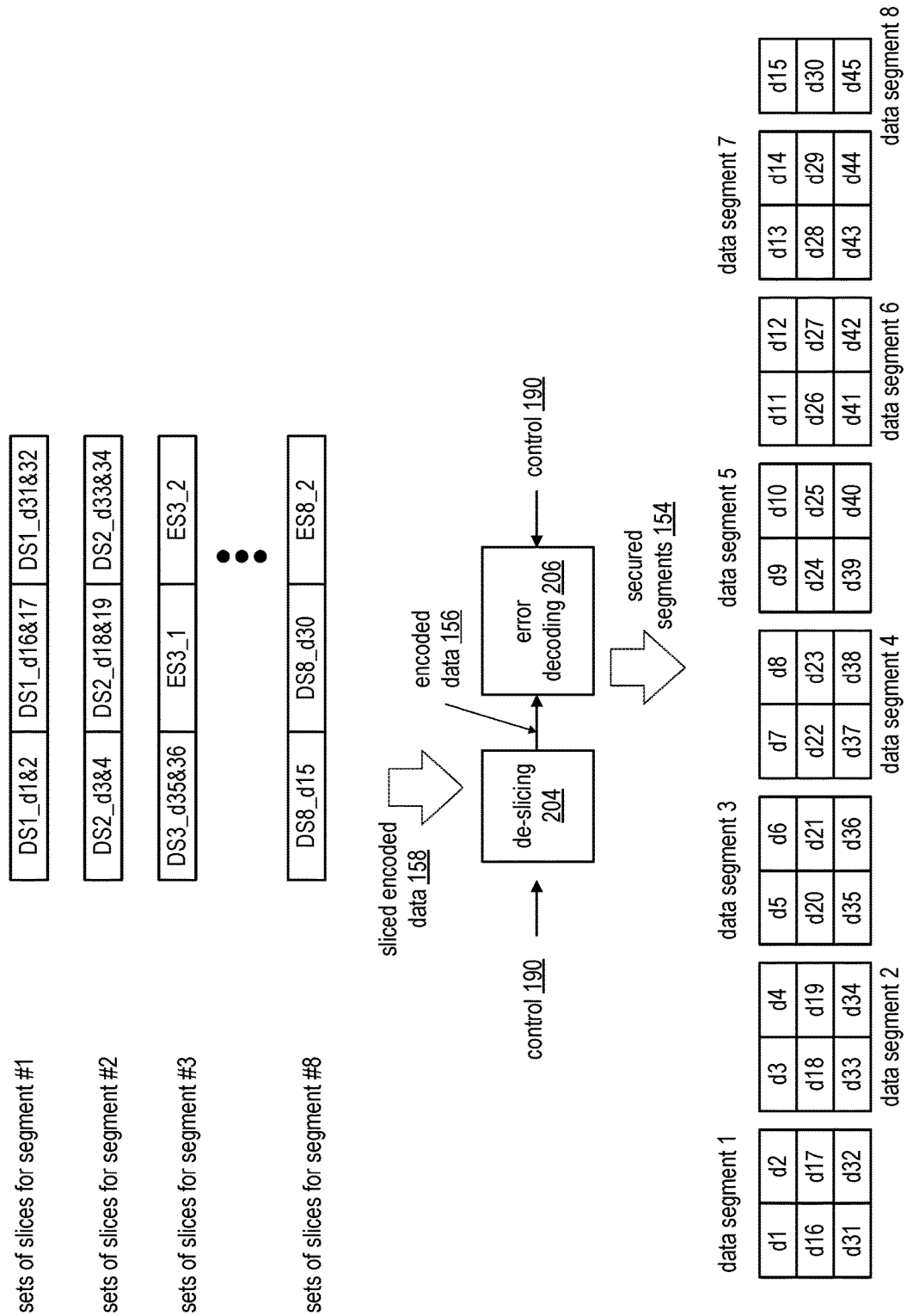
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_d1&d2) or an error code based encoded data slice (e.g., ES3_1).

An error decoding module 206 decodes the encoded data 156 of each data segment in accordance with the error correction decoding parameters of control information 190 to produce secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
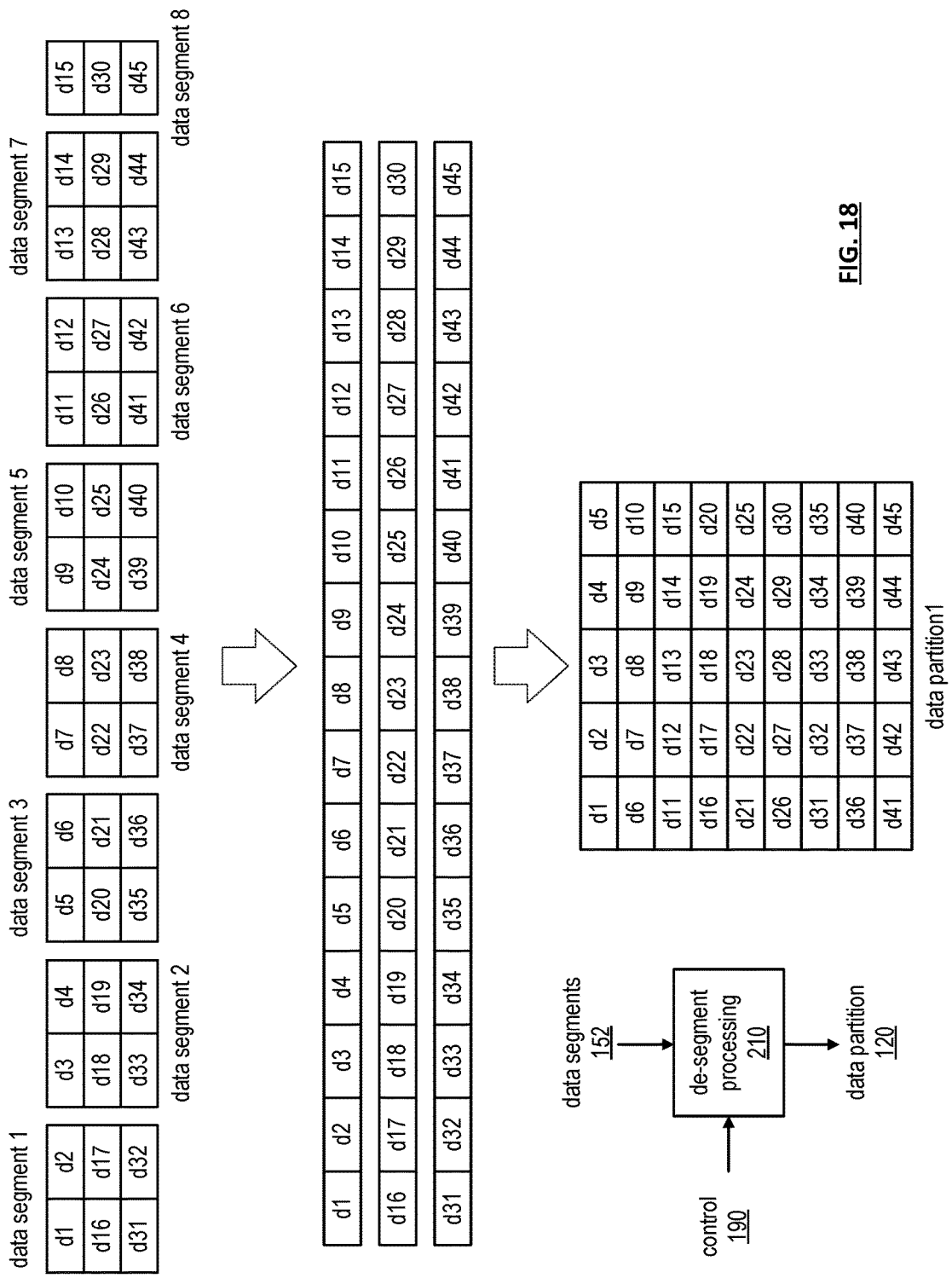
FIG. 18 is a diagram of an example of a de-segment processing of the dispersed error decoding in accordance with the present invention.

FIG. 18 is a diagram of an example of de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

Figure 19:
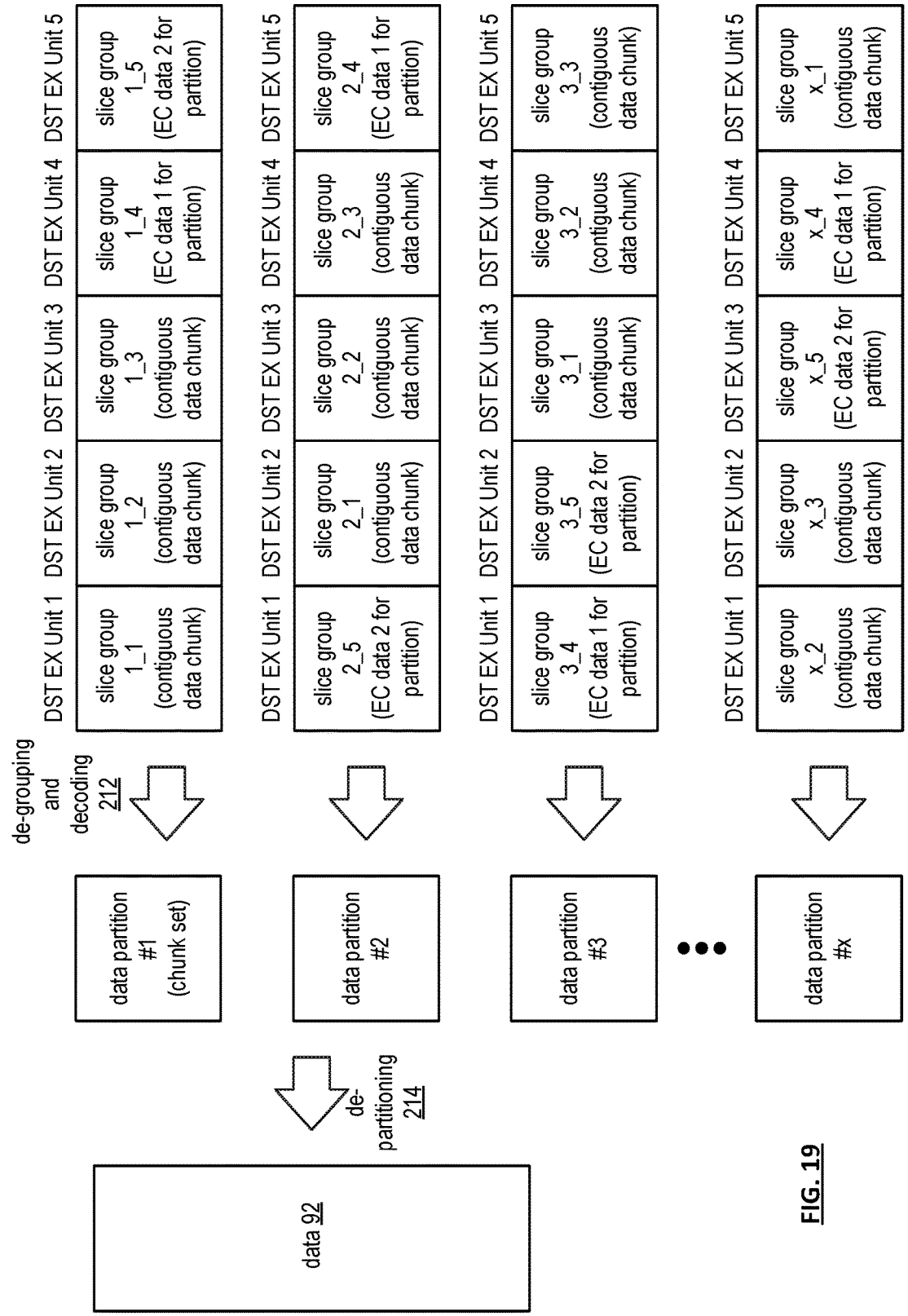
FIG. 19 is a diagram of an example of converting slice groups into data in accordance with the present invention.

FIG. 19 is a diagram of an example of converting slice groups into data 92 within an inbound distributed storage and task (DST) processing section. As shown, the data 92 is reconstructed from a plurality of data partitions (1-x, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
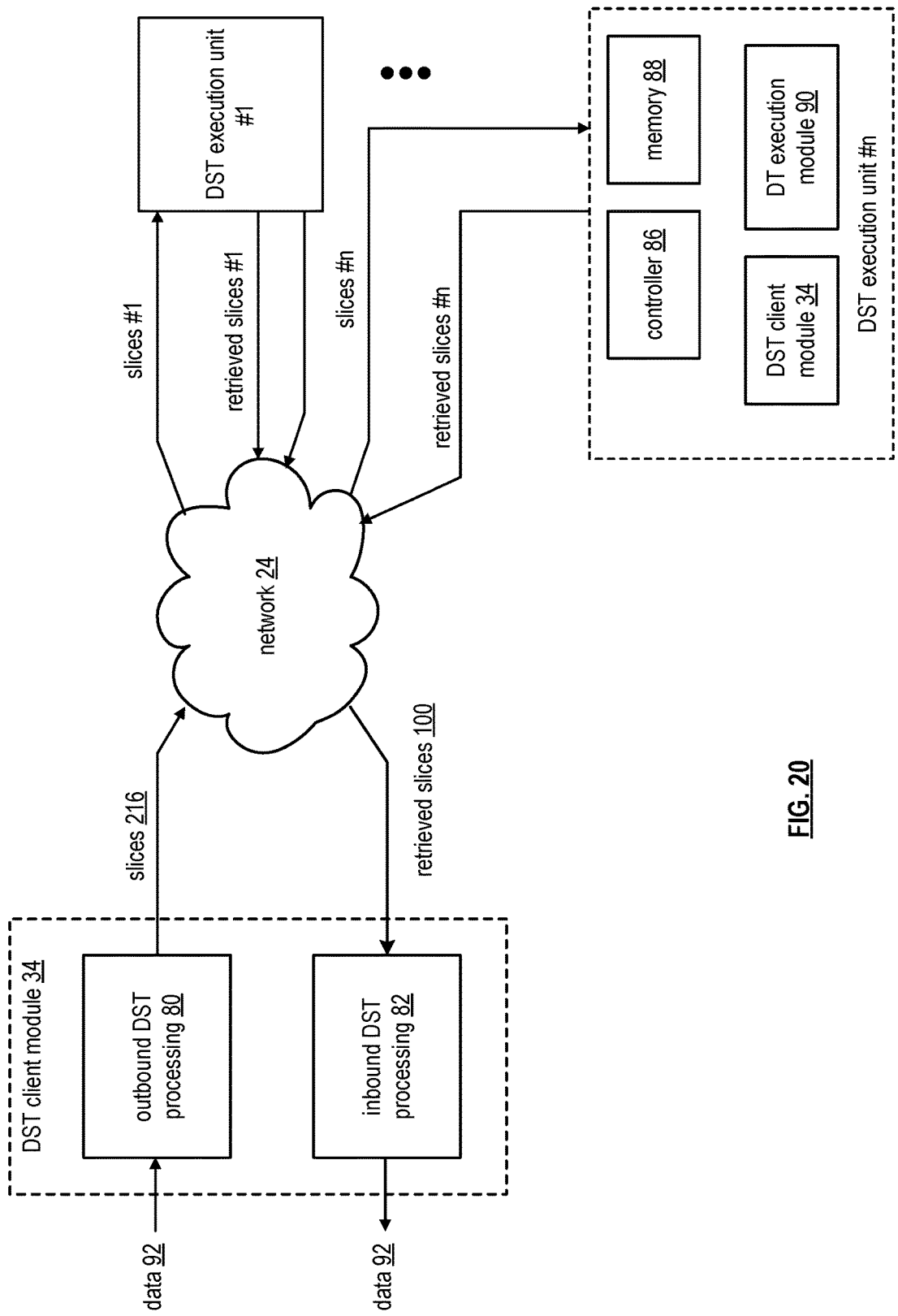
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
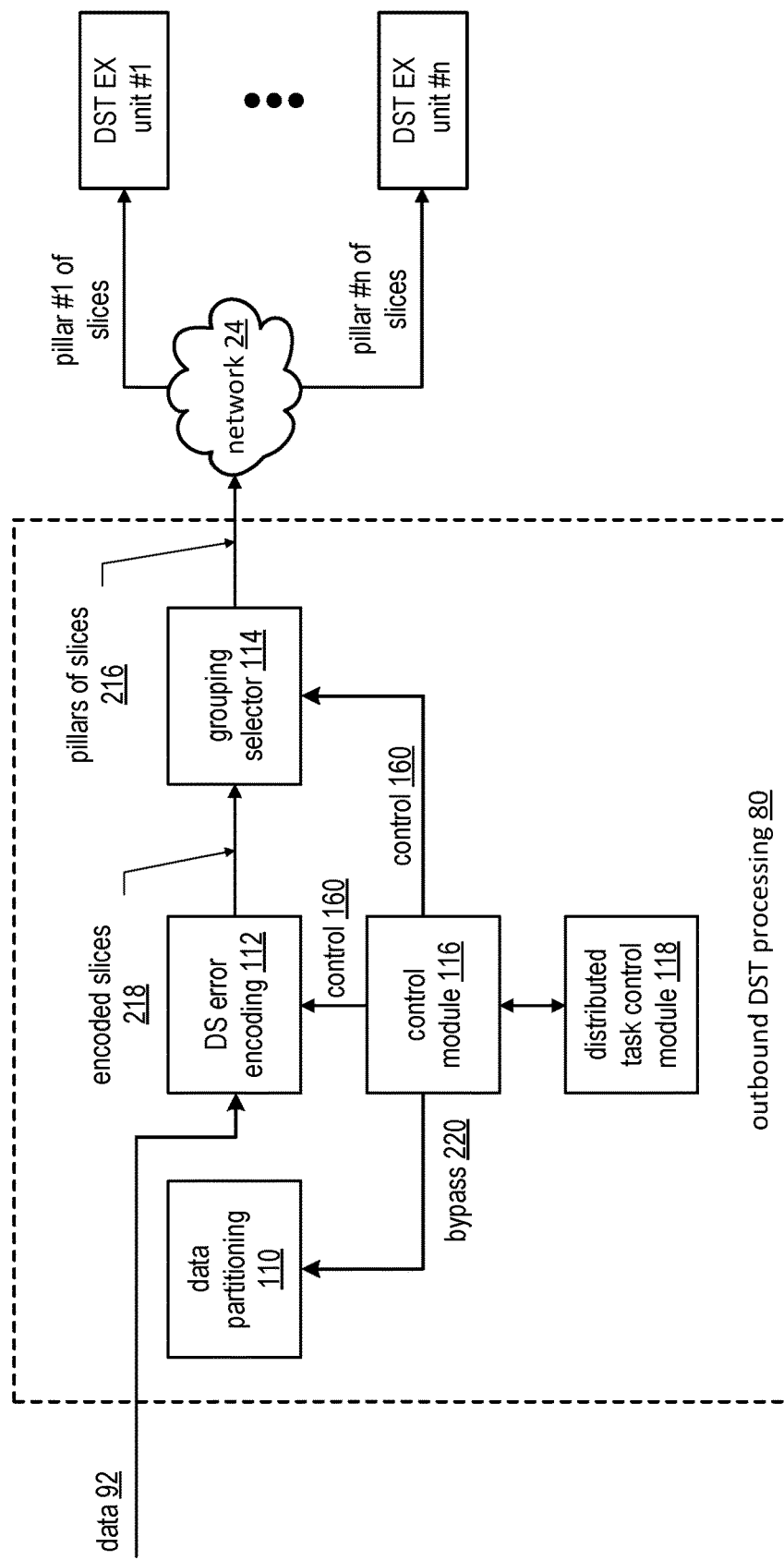
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 218 of the data segments into pillars of slices 216. The number of pillars corresponds to the pillar width of the DS error encoding parameters. In this example, the distributed task control module 118 facilitates the storage request.

Figure 22:
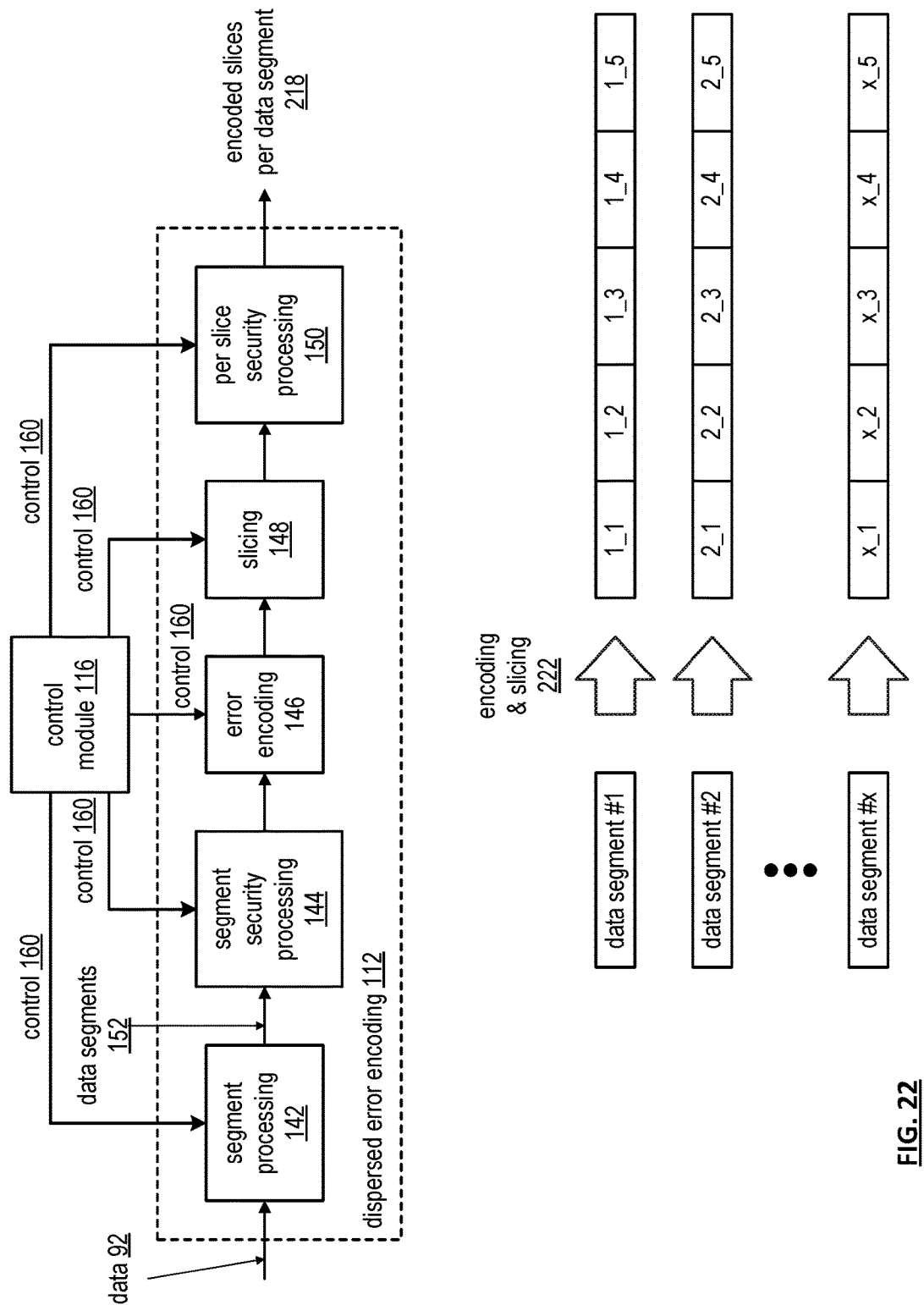
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
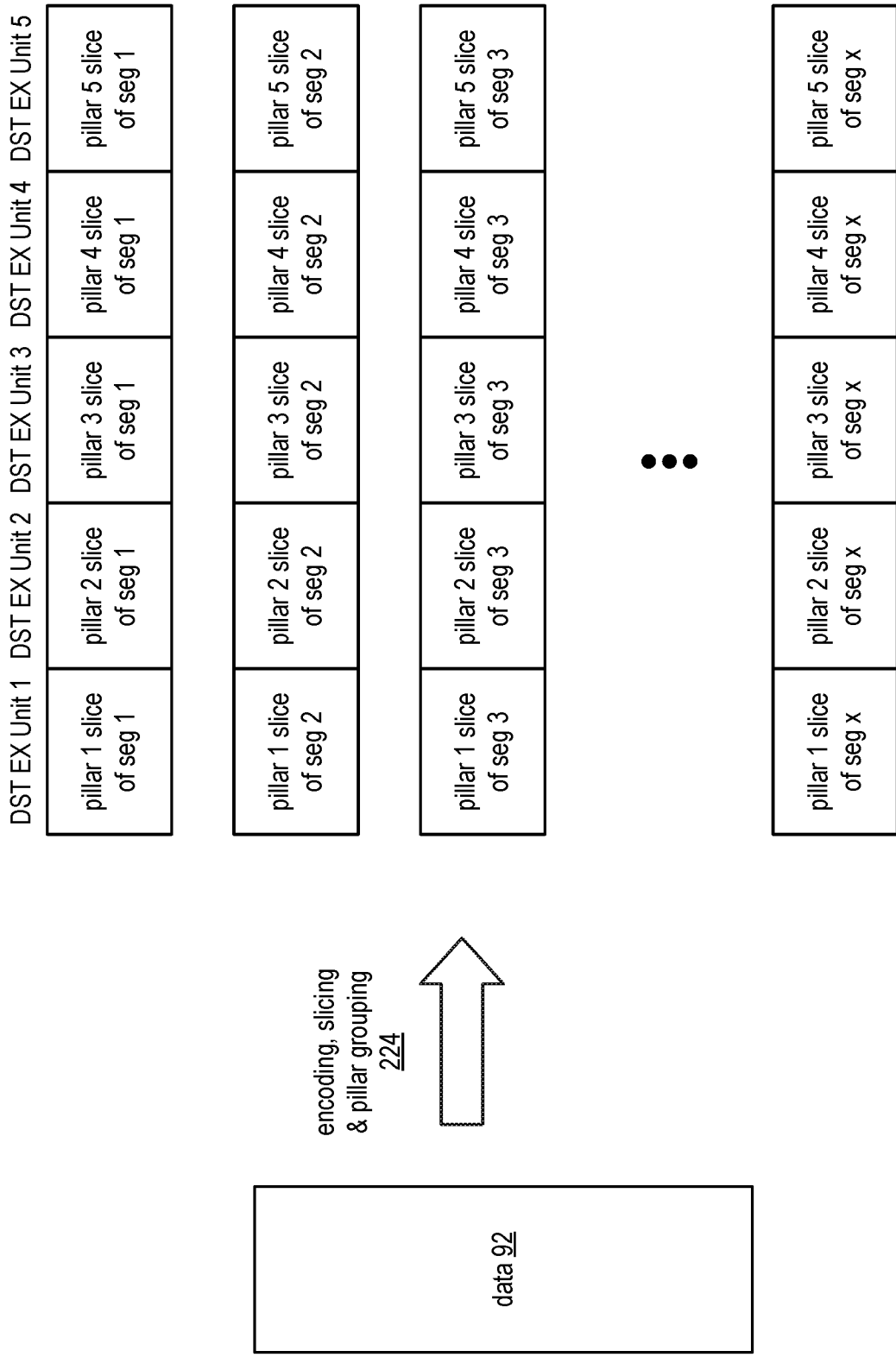
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selector module organizes the sets of encoded data slices into pillars of data slices. In this example, the DS error encoding parameters include a pillar width of 5 and a decode threshold of 3. As such, for each data segment, 5 encoded data slices are created.

The grouping selector module takes the first encoded data slice of each of the sets and forms a first pillar, which may be sent to the first DST execution unit. Similarly, the grouping selector module creates the second pillar from the second slices of the sets; the third pillar from the third slices of the sets; the fourth pillar from the fourth slices of the sets; and the fifth pillar from the fifth slices of the set.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from a control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terabytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distribution module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task ⇔ sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few Terabytes or more), addressing information of Addr_1_AA, and DS parameters of 3/5; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slice names of the encoded data slices of the data, etc. The DS parameters may include identity of an error encoding scheme, decode threshold/pillar width (e.g., 3/5 for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of 3/5; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., 3/5 for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task ⇔ sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task ⇔ sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1—identify non-words (non-ordered); task 1_2—identify unique words (non-ordered); task 1_3—translate (non-ordered); task 1_4—translate back (ordered after task 1_3); task 1_5—compare to ID errors (ordered after task 1-4); task 1_6—determine non-word translation errors (ordered after task 1_5 and 1_1); and task 1_7—determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases 288. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.,) may include the word and/or phrase, how many times it is used, where in the data it is used, and/or any other information requested regarding a word and/or phrase.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of 3/5 for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done by the DSTN module. In addition, the task distribution module determines the number of partitions to divide the data into (e.g., 2_1 through 2_z) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_z by DT execution modules 1_1, 2_1, 3_1, 4_1, and 5_1. For instance, DT execution modules 1_1, 2_1, 3_1, 4_1, and 5_1 search for non-words in data partitions 2_1 through 2_z to produce task 1_1 intermediate results (R1-1, which is a list of non-words). Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_z to produce task 1-4 intermediate results (R1-4, which is the translated back data).

Task 1_5 (e.g., compare data and translated data to identify translation errors) is ordered after task 1_4 and is to be executed on task 1_4's intermediate results (R4-1) and on the data. DT execution modules 1_1, 2_1, 3_1, 4_1, and 5_1 are allocated to compare the data partitions (2_1 through 2_z) with partitions of task 1-4intermediate results partitions R1-4_1 through R1-4_z to produce task 1_5 intermediate results (R1-5, which is the list words translated incorrectly).

Task 1_6 (e.g., determine non-word translation errors) is ordered after tasks 1_1 and 1_5 and is to be executed on tasks 1_1 's and 1_5's intermediate results (R1-1and R1-5). DT execution modules 1_1, 2_1, 3_1, 4_1, and 5_1 are allocated to compare the partitions of task 1_1 intermediate results (R1-1_1 through R1-1_z) with partitions of task 1-5intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1and R1-5). DT execution modules 1_2, 2_2, 3_2, 4_2, and 5_2 are allocated to compare the partitions of task 1_2 intermediate results (R1-2_1 through R1-2_z) with partitions of task 1-5intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1-3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1(the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terabyte). If yes, it partitions the first intermediate result (R1-1) into a plurality of partitions (e.g., R1-1_1 through R1-1_m). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial results (e.g., $1^{st}$ through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terabyte). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., $1^{st}$ through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1-3_1 through R1-3_y). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., $1^{st}$ through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
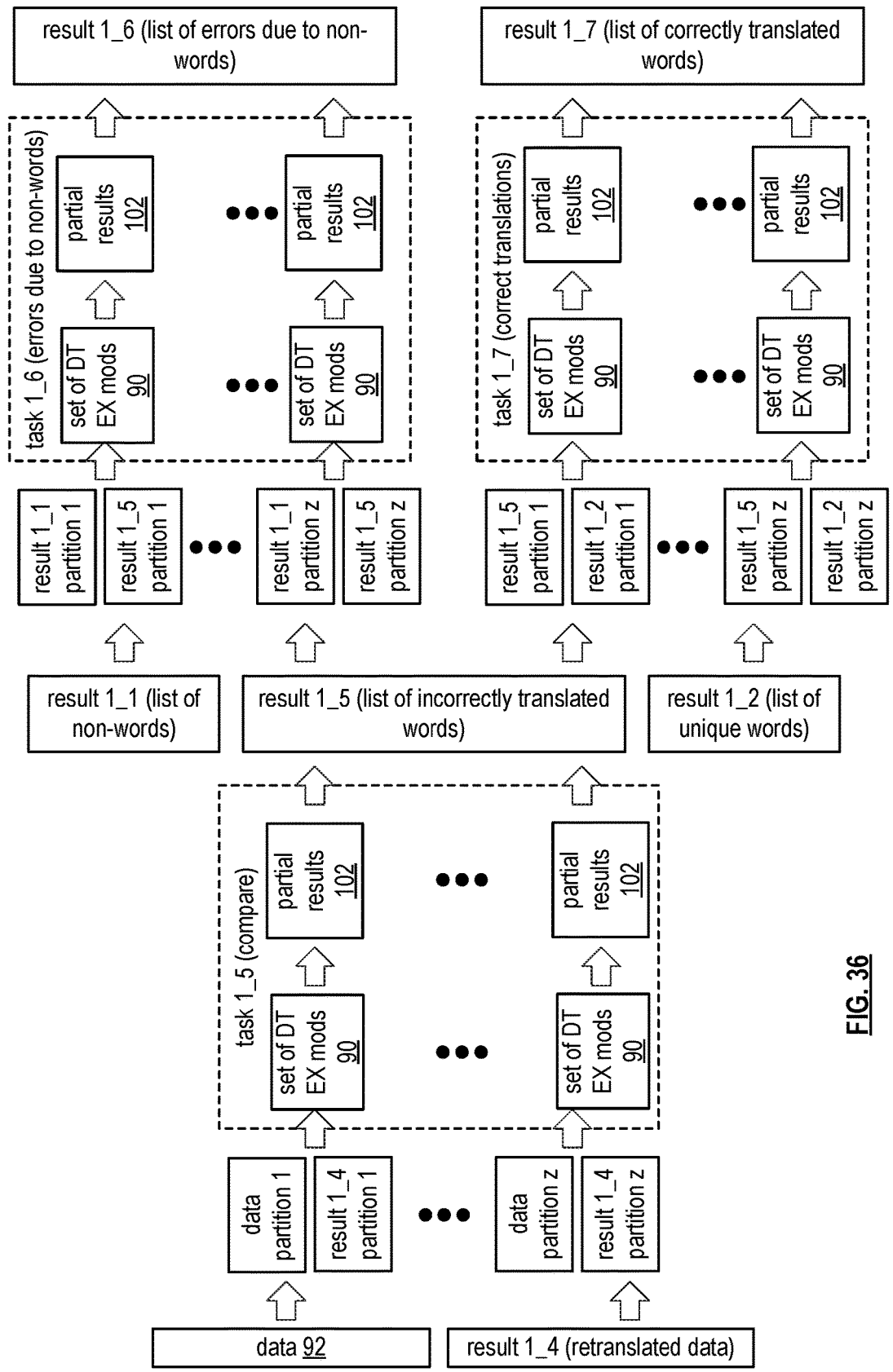

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., $1^{st}$ through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_z). For each partition of the fifth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., $1^{st}$ through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2). To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., $1^{st}$ through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., $1^{st}$ through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terabyte). If yes, it partitions the task 2 intermediate result (R2) into a plurality of partitions (e.g., R2_1 through R2_m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., $1^{st}$ through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terabyte). If yes, it partitions the task 3 intermediate result (R3) into a plurality of partitions (e.g., R3_1 through R3_m). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1- 4, 5, and 7).

FIG. 39 is a diagram of an example of combining result information into final results 104 for the example of FIG. 30. In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

FIG. 40A is a schematic block diagram of another embodiment of a distributed computing system that includes the distributed storage and task network (DSTN) managing unit 18 of FIG. 1, the distributed storage and task (DST) integrity processing unit 20 of FIG. 1, the network 24 of FIG. 1, and a DSTN execution unit set 350. The system may provide a DSTN and/or a dispersed storage network (DSN). The DSTN execution unit set 350 includes a plurality of DST execution units 36 of FIG. 1.

The system functions to classify DST execution units 36 as underutilized resources 351 or over utilized resources 352 and to prioritize execution of pending resource demands based on the classifications. An underutilized resource has more resource capacity than resource utilization and an over utilized resource has less resource capacity than resource demand. The DST integrity processing unit 20 performs a series of steps to classify the DST execution units 36.

In an example of operation, the DST integrity processing unit 20 obtains cost information 354 for the DSTN execution unit set 350. The cost information 354 includes one or more of bandwidth costs of communication links, burst bandwidth cost when capacity is exceeded, fixed capacity cost, variable power costs of the facility at different times a day, cost of time for servicing field components, average time it takes to service a failed component, and varying costs by time of day or day of week. The obtaining includes one or more of initiating a query to the DS managing unit 18, initiating a query to an external entity, receiving the cost information 354, performing a lookup, accessing a billing record, and calculating based on multiple historical cost records.

The DST integrity processing unit 20 obtains resource utilization information 356 of the plurality of DST execution units 36. The resource utilization information 356 includes one or more of a fixed bandwidth capacity utilization level, a burst bandwidth utilization level, bandwidth utilization by time of day and day of week, write availability information, read reliability information, utilization by DSN address range and computing processing level utilization. The obtaining includes at least one of initiating a resource utilization request to at least some of the plurality of DST execution units 36 and receiving the resource utilization information 356 from one or more DST execution units 36 of the plurality of DST execution units 36.

Having received the resource utilization information 356, the DST integrity processing unit 20 identifies pending resource demand for tasks associated with the plurality of DST execution units 36. The pending resource demand includes tasks related to one or more of rebuilding slices to be rebuilt, performing distributed computing partial tasks, maintenance tasks, update tasks, and performing data access tasks (e.g., write, read, delete, list). The identifying includes one or more of initiating a query to the at least some of the DST execution units 36, receiving a task list, accessing a task list, receiving one or more task requests, interpreting a maintenance schedule, and identifying an encoded data slice for rebuilding.

The DST integrity processing unit 20 groups the DST execution units 36 into the underutilized and over utilized resource groups based on one or more of the resource utilization information 356 and the cost information 354. The grouping includes, for each DST execution unit 36, identifying the DST execution unit 36 as underutilized when a resource utilization level of the DST execution unit 36 is less than a utilization threshold level based on the cost information. The grouping further includes identifying the DST execution unit 36 as over utilized when a resource execution level of the DST execution unit 36 is less than a pending resource demand level for the DST execution unit 36 based on the cost information.

The DST integrity processing unit 20 performs a series of further tasks to prioritize the execution of the pending resource demands based on the classifications. The DST integrity processing unit 20 issues high-priority rebuilding information 358 to DST execution units 36 of the underutilized resources 351 to include tasks based on the pending resource demand. The issuing includes generating the high-priority rebuilding information 358 to include pending rebuilding tasks. The DST integrity processing unit 20 determines whether sufficient capacity is available within the underutilized resources 351 to service the pending resource demand in accordance with a goal performance level. For example, the DST integrity processing unit 20 indicates that capacity is not available when an estimated performance level of the underutilized resources is less than the goal performance level. For instance, an estimated time to completion for the DST execution units 36 to perform a next ten rebuilding tasks is greater than a time to completion goal. When sufficient capacity is not available, the DST integrity processing unit 20 issues low priority rebuilding information 360 to the DST execution units 36 of the over utilized resources 352 to include remaining tasks based on the pending resource demand. The issuing includes generating the low priority rebuilding information 360 to include the remaining tasks of the pending resource demand. For instance, the DST integrity processing unit 20 assigns two of the next ten rebuilding tasks rebuilding tasks to the DST execution units 36 of the over utilized resources 352.

FIG. 40B is a flowchart illustrating an example of prioritizing rebuilding data. The method begins with step 362 where a processing module (e.g., of a distributed storage and task (DST) integrity processing unit 20) obtains cost information for a distributed storage and task network (DSTN). The method continues at step 364 where the processing module obtains resource utilization information for DST execution units of the DSTN. The method continues at step 366 where the processing module identifies pending resource demands with regards to the DST execution units. The method continues at step 368 where the processing module groups (e.g., classifies) the DST execution units into underutilized and over utilized resource groups.

The method continues at step 370 where the processing module issues high-priority rebuilding information (e.g., including at least some pending rebuilding tasks of pending rebuilding tasks) to the DST execution units of the underutilized resources. The method continues at step 372 where the processing module determines whether sufficient capacity is available within the underutilized resources to perform tasks of the pending resource demand. When sufficient capacity is not available within the underutilized resources, the method continues at step 374 where the processing module issues low priority rebuilding information to the DST execution units of the over utilized resources to perform remaining tasks (e.g., at least some of the rebuilding tasks) of the pending resource demand.

FIG. 41A is a schematic block diagram of another embodiment of a distributed computing system that includes the distributed storage and task network (DSTN) managing unit 18 of FIG. 1, the distributed storage and task (DST) processing unit 16 of FIG. 1, the network 24 of FIG. 1, and the DSTN execution unit set 350 of FIG. 40A. The DSTN execution unit set 350 includes a plurality of DST execution units 36 of FIG. 1.

The system functions to classify DST execution units 36 as underutilized resources 351 or overutilized resources 352 and to prioritize execution of pending resource demands based on the classifications. The DST processing unit 16 performs a series of steps to classify the DST execution units 36. In an example of operation, the DST processing unit 16 obtains cost information 354 for the DSTN execution unit set 350.

The DST processing unit 16 obtains resource utilization information 356 of the plurality of DST execution units 36. The obtaining includes at least one of initiating a resource utilization request to at least some of the plurality of DST execution units 36 and receiving the resource utilization information 356 from one or more DST execution units 36 of the plurality of DST execution units 36. The DST integrity processing unit 20 identifies pending resource demand for tasks associated with the plurality of DST execution units 36. The pending resource demand includes tasks related to one or more of rebuilding slices to be rebuilt, performing distributed computing partial tasks, maintenance tasks, update tasks, and performing data access tasks (e.g., write, read, delete, list). The identifying includes one or more of initiating a query to the at least some of the DST execution units 36, receiving a task list, accessing a task list, receiving one or more task requests, interpreting a maintenance schedule, and identifying an encoded data slice for rebuilding.

The DST processing unit 16 groups the DST execution units 36 into the underutilized and over utilized resource groups based on one or more of the resource utilization information 356 and the cost information 354. The grouping includes, for each DST execution unit 36, identifying the DST execution unit 36 as underutilized when a resource utilization level of the DST execution unit 36 is less than a utilization threshold level based on the cost information 354. The grouping further includes identifying the DST execution unit 36 as over utilized when a resource execution level of the DST execution unit 36 is less than a pending resource demand level for the DST execution unit 36 based on the cost information 354.

The DST processing unit 16 performs a series of further tasks to prioritize the execution of the pending resource demands based on the classifications. The DST processing unit 16 issues high-priority read access information 376 to DST execution units 36 of the underutilized resources 351 to include tasks based on the pending resource demand. The issuing includes generating the high-priority read access information 376 to include at least some read slice requests of a read threshold number of read slice requests of the pending resource demand. The generating includes determining a number of the at least some read slice requests based on one or more of the resource utilization information in the cost information. For example, the DST processing unit 16 generates 11 read slice requests when the underutilized resources includes 11 DST execution units 36. The DST processing unit 16 determines whether the high-priority read access information includes the read threshold number of read slice requests. For example, the DST processing unit 16 indicates that the high-priority read access information 376 does not include the read threshold number of read slice requests when the read threshold is 12 and the DST processing unit 16 generated the 11 read slice requests.

When the at least the read threshold number of read slice requests are not included, the DST processing unit 16 issues low priority read access information 378 to the DST execution units 36 of the over utilized resources 352 to include remaining read slice requests of the read threshold number of read slice requests. The issuing includes identifying DST execution units 36 of the over utilized DST execution units 36 that are least over utilized based on corresponding resource utilization information 356, selecting the remaining read slice requests that are associated with the identified DST execution units 36, generating the remaining read slice requests, and outputting the remaining read slice requests to the identified DST execution units 36.

FIG. 41B is a flowchart illustrating an example of prioritizing reading data, which include similar steps to FIG. 40B. The method begins with steps 362-368 of FIG. 40B where a processing module (e.g., of a distributed storage and task (DST) integrity processing unit 20) obtains cost information for a distributed storage and task network (DSTN), obtains resource utilization information for DST execution units of the DSTN, identifies pending resource demand with regards to the DST execution units, and groups the DST execution units into underutilized and over utilized resource groups.

The method continues at step 380 where the processing module issues high-priority read access information to the DST execution units of the underutilized resources to include at least some read slice requests of a read threshold number of read slice requests of the pending resource demand. The method continues at step 382 where the processing module determines whether the high-priority read access information includes the read threshold number of read slice requests. When the high-priority read access information does not include the read threshold number of read slice requests, the method continues at step 384 where the processing module issues low priority read access information to the DST execution units of the over utilized resources. The low priority read access information includes remaining read slice requests of the read threshold number of read slice requests. The issuing includes selecting corresponding DST execution units of the DST execution units of the over utilized resources that are least over utilized.

FIG. 42A is a schematic block diagram of another embodiment of a distributed computing system that includes the distributed storage and task network (DSTN) managing unit 18 of FIG. 1, the distributed storage and task (DST) processing unit 16 of FIG. 1, the network 24 of FIG. 1, and two or more DSTN execution unit sets 350. Each DSTN execution unit set 350 of the two or more DSTN execution unit sets includes a set of DST execution units 36 of FIG. 1.

The system functions to, for each DSTN execution unit set 350, classify associated DST execution units 36 as underutilized resources 351 or overutilized resources 352 and to prioritize execution of pending resource demands based on the classifications. The DST processing unit 16 performs a series of steps to classify the DST execution units 36. In an example of operation, the DST processing unit 16 obtains cost information 354 for the DSTN execution unit sets 350. The obtaining includes one or more of initiating a query to the DS managing unit 18, initiating a query to an external entity, receiving the cost information 354, performing a lookup, accessing a billing record, and determining based on multiple historical cost records.

For each DSTN execution unit set 350, the DST processing unit 16 obtains resource utilization information 356 of the set of DST execution units. The obtaining includes at least one of initiating a resource utilization request to at least some of the set of DST execution units 36 and receiving the resource utilization information 356 from one or more DST execution units 36 of the set of DST execution units 36.

Having received the resource utilization information 356, DST processing unit 16 identifies pending resource demand for tasks associated with each set of DST execution units. The pending resource demand includes tasks related to one or more of rebuilding slices to be rebuilt, performing distributed computing partial tasks, maintenance tasks, update tasks, and performing data access tasks (e.g., write, read, delete, list). The identifying includes one or more of initiating a query to the at least some of the DST execution units 36, receiving a task list, accessing a task list, receiving one or more task requests, interpreting a maintenance schedule, and identifying an encoded data slice for rebuilding.

For each DSTN execution unit set, the DST processing unit 16 groups the DST execution units 36 into the underutilized and the over utilized resource groups based on one or more of the resource utilization information 356 and the cost information 354. The grouping includes, for each DST execution unit 36, identifying the DST execution unit 36 as underutilized when a resource utilization level of the DST execution unit 36 is less than a utilization threshold level based on the cost information 354. The grouping further includes identifying the DST execution unit 36 as over utilized when a resource execution level of the DST execution unit 36 is less than a pending resource demand level for the DST execution unit 36 based on the cost information 354.

The DST processing unit 16 performs a series of further tasks to prioritize the execution of the pending resource demands based on the classifications. The DST processing unit 16 selects one DST execution unit set of the at least two DSTN execution unit sets based on one or more of the resource utilization information 356 and the pending resource demand. For example, the DST processing unit 16 selects the one DST execution unit set associated with a highest number of DST execution units 36 of a corresponding underutilized resources 351.

The DST processing unit 16 issues high-priority write access information 386 to DST execution units 36 of the underutilized resources 351 to include tasks based on the pending resource demand. The issuing includes generating the high-priority write access information 386 to include at least some write slice requests of a write threshold number of write slice requests of the pending resource demand. The generating includes determining a number of the at least some write slice requests based on one or more of the resource utilization information in the cost information. For example, the DST processing unit 16 generates 13 write slice requests when the underutilized resources 351 includes 13 DST execution units 36 of the one DSTN execution unit set. The DST processing unit 16 determines whether the high-priority read access information 386 includes the write threshold number of write slice requests. For example, the DST processing unit 16 indicates that the high-priority write access information 386 does not include the write threshold number of write slice requests when the write threshold is 14 and the DST processing unit 16 generated the 13 write slice requests.

When the at least the write threshold number of write slice requests are not included, the DST processing unit 16 issues low priority write access information 388 to the DST execution units 36 of the overutilized resources 352 of the one DSTN execution unit set to include remaining write slice requests of the write threshold number of write slice requests. The issuing includes identifying DST execution units 36 of the over utilized DST execution units 36 that are least over utilized based on corresponding resource utilization information 356, selecting the remaining write slice requests that are associated with the identified DST execution units 36, generating the remaining write slice requests, and outputting the remaining write slice requests to the identified DST execution units 36.

FIG. 42B is a flowchart illustrating an example of prioritizing storing data, which include similar steps to FIG. 40B. The method begins with step 362 of FIG. 40B where a processing module (e.g., of a distributed storage and task (DST) processing unit) obtains cost information for a distributed storage and task network (DSTN). For each storage unit set of a plurality of storage unit sets of the DSTN, the method continues at step 390 where the processing module obtains resource utilization information for DST execution units associated with the storage unit set (e.g., initiate a query, perform a test, perform a lookup, receiving an error message, access historical records, receive the resource utilization information). For each storage unit set, the method continues at step 392 where the processing module identifies pending resource demand with regards to the DST execution units associated with the storage unit set (e.g., query one or more DST execution units, access a task list, receive one or more requests, identify encoded data slices for writing). For each storage unit set, the method continues at step 394 where the processing module groups the DST execution units into underutilized and over utilized resource groups.

The method continues at step 396 where the processing module selects a storage unit set of the plurality of storage unit sets for storing the data. The selecting may be based on one or more of the resource utilization information and the pending resource demand. For the example, the processing module selects the storage unit set associated with a highest number of DST execution units of the underutilized resources. The method continues at step 398 where the processing module issues high-priority write access information to the DST execution units of the underutilized resources of the selected storage unit set. The issue includes outputting at least some write slice requests of a write threshold number of write slice requests of the pending resource demand. The method continues at step 400 where the processing module determines whether the high-priority write access information includes at least the write threshold number of write slice requests. When the high-priority write access information does not include the at least the write threshold number of write slice requests, the method continues at step 402 where the processing module issues low priority write access information to the DST execution units of the over utilized resources of the selected storage unit set. The issue includes including remaining write slice requests of the write threshold number of write slice requests.

FIG. 43A is a schematic block diagram of another embodiment of a distributed computing system that includes the distributed storage and task network (DSTN) managing unit 18 of FIG. 1, the distributed storage and task (DST)

processing unit 16 of FIG. 1, the network 24 of FIG. 1, and two or more DSTN execution unit sets 350. Each DSTN execution unit set of the two or more DSTN execution unit sets includes a set of DST execution units 36 of FIG. 1.

The system functions to, for each DSTN execution unit set 350, classify DST execution units 36 as underutilized resources 351 or overutilized resources 352 and to prioritize execution of pending resource demands based on the classifications. The DST processing unit 16 performs a series of steps to classify the DST execution units 36. In an example of operation, the DST processing unit 16 obtains cost information 354 for the DSTN execution unit sets. The obtaining includes at least one of initiating a query to the DS managing unit 18, initiating a query to an external entity, receiving the cost information 354, performing a lookup, accessing a billing record, and determining based on multiple historical cost records.

For each DSTN execution unit set, the DST processing unit 16 obtains resource utilization information 356 of the set of DST execution units 350. The obtaining includes at least one of initiating a resource utilization request to at least some of the set of DST execution units 36 and receiving the resource utilization information 356 from one or more DST execution units 36 of the set of DST execution units 36. The DST processing unit 16 identifies pending resource demand for tasks associated with each set of DST execution units. The pending resource demand includes tasks related to one or more of rebuilding slices to be rebuilt, performing distributed computing partial tasks, maintenance tasks, update tasks, and performing data access tasks (e.g., write, read, delete, list). The identifying includes one or more of initiating a query to the at least some of the DST execution units 36, receiving a task list, accessing a task list, receiving one or more task requests, interpreting a maintenance schedule, and identifying an encoded data slice for rebuilding.

For each DSTN execution unit set 350, the DST processing unit 16 groups the DST execution units 36 into the underutilized and the overutilized resource groups based on one or more of the resource utilization information 356 and the cost information 354. The grouping includes, for each DST execution unit 36, identifying the DST execution unit 36 as underutilized when a resource utilization level of the DST execution unit 36 is less than a utilization threshold level based on the cost information 354. The grouping further includes identifying the DST execution unit 36 as over utilized when a resource execution level of the DST execution unit 36 is less than a pending resource demand level for the DST execution unit 36 based on the cost information 354.

The DST processing unit 16 performs a series of further tasks to prioritize the execution of the pending resource demands based on the classifications. The DST processing unit 16 selects one DST execution unit set of the at least two DSTN execution unit sets based on one or more of the resource utilization information 356 and the pending resource demand. For example, the DST processing unit 16 selects the one DST execution unit set associated with a highest number of DST execution units 36 of a corresponding underutilized resources, where the DST execution units 36 of the underutilized resources 351 are capable of performing partial tasks of distributed computing tasks.

The DST processing unit 16 issues high-priority task information 404 to DST execution units 36 of the underutilized resources 351 to include tasks based on the pending resource demand. The issuing includes generating the high-priority task information 404 to include write slice requests with data for a distributed computing task and partial tasks performed on the data for the distributed computing task. The generating includes determining a number of partial tasks and data to distribute based on one or more of the resource utilization information 356 and the cost information 354. For example, the DST processing unit 16 distributes eight of ten partial tasks to the DST execution units of the underutilized resources 351 when an estimated performance of the DST execution units of the underutilized resources 351 compares favorably to a desired performance level to execute the eight partial tasks. The DST processing unit 16 determines whether the high-priority task information 404 includes a sufficient number of tasks to meet or exceed a task execution performance goal. For example, the DST processing unit 16 indicates that the high-priority task information 404 does not include the sufficient number of tasks when the high-priority task information 404 includes the eight of the 10 partial tasks for execution.

When the sufficient number of tasks are not included in the high-priority task information 404, the DST processing unit 16 issues low priority task information 406 to the DST execution units 36 of the overutilized resources 352 of the one DSTN execution unit set to include remaining tasks to meet or exceed the task execution performance goal. The issuing includes generating the low priority task information to include the remaining tasks and sending the low priority task information 406 to at least some of the DST execution units 36 of the overutilized resources 352 of the one DST execution unit set.

FIG. 43B is a flowchart illustrating an example of prioritizing distributed computing tasks, which include similar steps to FIGS. 40B and 42B. The method begins with step 362 of FIG. 40B where a processing module (e.g., of a distributed storage and task (DST) processing unit) obtains cost information for a distributed storage and task network (DSTN). The method continues with steps 390-394 of FIG. 42B where, for each storage set of a plurality of storage sets, the processing module obtains resource utilization information for DST execution units of the DSTN, identifies pending resource demand with regards to the DST execution units, and groups the DST execution units into underutilized and over utilized resource groups.

The method continues at step 408 where the processing module selects a storage unit set of the plurality of storage unit sets for execution of a distributed computing task. The selecting is based on one or more of the resource utilization information and the pending resource demand. The method continues at step 410 where the processing module issues high-priority task information to the DST execution units of the underutilized resources of the selected storage unit set. The issuing includes generating the high-priority task information to include at least some (e.g., enough to match capacity) partial tasks of a set of partial tasks of the distributed computing task.

The method continues at step 412 where the processing module determines whether a sufficient number of DST execution units have been assigned distributed computing tasks. The processing module indicates that a sufficient number have not been assigned when all data for the distributed computing task and all partial tasks for the distributed computing task have not been assigned DST execution units (e.g., not enough capacity so far). When the sufficient number of DST execution units have not been assigned, the method continues at step 414 where the processing module issues low priority task information to the DST execution units of the over utilized resources. The issuing includes generating the low priority task information to include remaining partial tasks (e.g., and associated remaining partial tasks) of the set of partial tasks.

FIG. 44A is a schematic block diagram of an embodiment of a dispersed storage network (DSN) that includes the distributed storage and task network (DSTN) managing unit 18 of FIG. 1, the network 24 of FIG. 1, and a dispersed storage network (DSN) memory 416. The DSN memory 416 includes a plurality of storage units 418. Each storage unit 418 may be implemented using one or more of a storage server, a memory array, a DS storage unit, and the DST execution unit 36 of FIG. 1. Each storage unit 418 includes a plurality of memories 88 of FIG. 3.

The system functions to assign operation within the DSN to a set of storage units 418 of the plurality of storage units. The DSTN managing unit 18 performs a series of steps to assign the operation of the set of storage units. In an example of operation, the DSTN managing unit 18 obtains storage requirements. The storage requirements includes one or more of a storage availability requirement, a retrieval reliability requirement, and a storage efficiency requirement. The obtaining includes at least one of initiating a query, receiving the storage requirements, performing a lookup, determining the storage requirements based on user input, receiving a storage request, and receiving an error message.

The DSTN managing unit 18 obtains resource availability information 420 for the plurality of storage units 418. The resource availability information 420 includes one or more of a storage capacity level, a storage utilization level, a number of memory devices within a storage unit, a number of active memory devices, capacity of each memory device, utilization of each memory device, and an input/output bandwidth capacity level. The obtaining includes at least one of initiating a query, receiving a response that includes the resource availability information 420, performing a lookup, and receiving an error message.

The DSTN managing unit 18 determines dispersal parameters based on the storage requirements and the resource availability information 420. For example, the DSTN managing unit 18 generates a pillar width of the dispersal parameters to be less than or equal to a number of storage units that are available and will substantially meet the storage requirements. As another example, the DSTN managing unit 18 generates a decode threshold number of the dispersal parameters based on the generated pillar width and the storage requirements (e.g., to achieve the retrieval reliability requirement). As yet another example, the DSTN managing unit 18 generates a write threshold number of the dispersal parameters based on one or more of the pillar width, the decode threshold, and the storage requirements (e.g., to achieve the storage availability requirement).

The DSTN managing unit 18 selects the set of storage units based on the dispersal parameters and the resource availability information 420. For example, the DSTN managing unit 18 identifies storage units associated with resource availability information compatible with the storage requirements and the dispersal parameters. For instance, the DSTN managing unit selects 16 storage units associated with favorable resource availability information when the pillar width is 16.

The DSTN managing unit 18 assigns a DSN address range to the set of storage units. The assigning includes at least one of identifying a DSN address range from a to be assigned address range list, receiving a request, identifying a requirement for a new generation of a previous generation of a vault, identifying a new vault, and identifying an available DSN address range based on previously assigned DSN address ranges. The DSTN managing unit 18 may assign one or more memories 88 of each storage unit 418 of the selected set of storage units to sub-DSN address ranges of the assigned DSN address range to produce addressing information based on the resource availability information in the storage requirements. Alternatively, each storage unit assigns one or more memories of the storage unit. The selecting includes selecting enough memories to meet a projected storage capacity goal for an associated vault of the assigned DSN address range.

The DSTN managing unit 18 generates resource assignment information 422 to include one or more of the dispersal parameters, identifiers of the set of storage units, the assigned DSN address range, and the addressing information. The DSTN managing unit 18 outputs the resource assignment information 422 to each storage unit of the set of storage units to initialize utilization of the set of storage units for storage of sets of encoded data slices. The outputting includes sending the resource assignment information 422 directly to the set of storage units and sending the resource assignment information 422 via the DSTN managing unit 18 for redistribution as registry information to numerous DSN entities including the set of storage units.

FIG. 44B is a flowchart illustrating an example of assigning storage resources. The method begins with step 424 where a processing module (e.g., of a distributed storage and task network (DSTN) managing unit) obtains storage requirements. The method continues at step 426 where the processing module obtains resource availability information for a plurality of underutilized storage units associated with a dispersed storage network (DSN) memory. The method continues at step 428 where the processing module determines dispersal parameters for a new set of dispersed storage units based on the storage requirements and the resource availability information. For example, the processing module determines the dispersal parameters to achieve a meantime to data loss goal and/or a write availability goal.

The method continues at step 430 where the processing module selects storage units of the plurality of underutilized storage units to form the new set of dispersed storage units. The selecting the storage units may be based on the dispersal parameters and the resource availability information such that operation of the new set of dispersed storage units substantially achieves the storage requirements. The method continues at step 432 where the processing module assigns a DSN address range to the new set of dispersed storage units.

The method continues at step 434 where the processing module selects one or more memories of each of the underutilized storage units of the new set of dispersed storage units. The method continues at step 436 where the processing module allocates sub-DSN address ranges of the DSN address range to a set of memories of one or more memories of each of the underutilized storage units of the new set of dispersed storage units to produce addressing information. For example, the processing module divides a DSN address range for a storage unit by a number of available memories for the dispersed storage unit to produce the sub-DSN address ranges for the dispersed storage unit.

The method continues at step 438 where the processing module generates resource assignment information to include one or more of the dispersal parameters, identifiers of the new set of dispersed storage units, the assigned DSN address range, and the addressing information. The method continues at step 440 where the processing module outputs the resource assignment information to the new set of dispersed storage units to initialize utilization of the new set of dispersed storage units for storage of sets of encoded data slices associated with the DSN address range.

FIGS. 45A, 45B and 45G are schematic block diagrams of other embodiments of a dispersed storage network (DSN) illustrating examples of storing data. The DSN includes the distributed storage and task (DST) processing unit 16 of FIG. 1, the network 24 of FIG. 1, and a DST execution unit set 350. The DST execution unit set 350 includes a set of DST execution units 1-8. Alternatively, the DST execution unit set 350 may include any number of DST execution units. Hereafter, the DST execution unit may be referred to interchangeably as a storage unit of a set of storage units. Each DST execution unit may be implemented utilizing the DST execution unit 36 of FIG. 1. The DST processing unit 16 includes the DST client module 34 of FIG. 1. The DST client module 34 includes at least one memory such that the at least one memory stores one or more of a write queue 450 and a rebuild queue 452.

In another embodiment, the DST client module 34 may further includes a dispersed storage (DS) module. The DS module may be implemented utilizing a plurality of processing modules. For instance, the plurality of processing modules may include the processing module 84 of FIG. 3. As a specific example, the plurality of processing modules includes a first module, a second module, a third module, a fourth module, a fifth module, and a sixth module.

The DSN functions to store data 454 in the DST execution unit set 350. In an example of operation, DST client module 34 partitions the data 454 to produce a plurality of data segments. The DST client module 34 dispersed storage error encodes each data segment into a set of encoded data slices. Each set of encoded data slices includes a total number of encoded data slices, where a threshold number (e.g., a decode threshold number) of encoded data slices is needed to recover the data segment. The threshold number is less than the total number.

As such, successful storage of each of the total number of encoded data slices for the set of encoded data slices may provide improved data retrieval reliability. For example, a highest level of data retrieval reliability is associated with storage of the total number of encoded data slices and a lowest level of data retrieval reliability is associated with storage of the threshold number of encoded data slices. Many factors may affect the successful storage of the total number of encoded data slices, including one or more of network reliability, DST execution unit availability, and DST execution unit loading.

The storing of the data includes at least two phases. The at least two phases include a write phase and a commit phase. For example, the storage of the data includes, for each encoded data slice, the DST client module 34 issuing a write command to a corresponding DST execution unit and issuing a write commit command to the corresponding DST execution unit when a commit phase trigger has been detected which includes receiving a favorable write response in response to the write command. As such, the many factors that affect the successful storage may impact the issuing of the write command, the receiving of the favorable write response, and the issuing of the write commit command.

The detecting of the commit phase trigger includes receiving favorable write responses for the set of encoded data slices within a desired timing profile. The desired timing profile includes receiving a number of favorable write responses within a desired time frame. As such, the many factors that affect the successful storage may impact whether the favorable write responses are received within the desired time frame. For example, when 8 favorable write responses have been received within the desired time frame, the DST client module 34 issues 8 write commit commands to complete the successful storage of all 8 encoded data slices.

As another example, once a threshold number (e.g., 5) of favorable write responses have been received, the DST client module 34 may issue corresponding write commit commands at any time but improved retrieval reliability is provided when waiting for a full set of 8 favorable write responses. While waiting longer for all 8 of the favorable write responses, the longer the storage of the data will take. A system improvement may be provided when a balance is struck between an undesired long period of time to store the data and the data retrieval reliability level. For instance, the DST client module 34 issues 6 corresponding write commit commands after receiving 6 favorable write responses when a response time frame has expired while waiting for a 7th favorable write response. The receiving of the favorable write responses to detect the commit phase trigger is discussed in greater detail with reference to FIGS. 45 C-F.

FIG. 45A illustrates initial steps of the example of the storing of the data. Having produced the set of encoded data slices 1-8, the DST client module 34 caches the set of encoded data slices 1-8 in the write queue 450. Having cached the set of encoded data slices 1-8, the DST client module 34 transmits, via the network 24 at time t0, a set of write slice requests 1-8 as write commands for storing the set of encoded data slices in the set of DST execution units 1-8.

FIG. 45B illustrates further steps of the example of the storing of the data, where at least some of the DST execution units temporarily store encoded data slices extracted from received write slice requests. As a specific example, the DST execution unit 1 stores encoded data slice 1 in a local memory of the DST execution unit 1, DST execution unit 3 stores encoded data slice 3, DST execution unit 4 stores encoded data slice 4, DST execution unit 5 stores encoded data slice 5, DST execution unit 7 stores encoded data slice 7, and DST execution unit 8 stores encoded data slice 8. The many factors that prevent the successful storage of the data may prevent the storing of some of the encoded data slices for storage. As a specific example, one or more storage errors prevents storage of encoded data slices 2 and 6 within a time frame t7max.

The DST execution units associated with the successful temporary storage of encoded data slices issue favorable write responses to the DST client module 34. For example, DST execution unit 1 sends, via the network 24, a favorable write slice response 1 indicating that the encoded data slice 1 has been temporarily stored in the DST execution unit 1, DST execution unit 3 sends, via the network 24, a favorable write slice response 3 indicating that the encoded data slice 3 has been temporarily stored in the DST execution unit 3, etc.

The DST client module 34 receives write slice responses from the DST execution unit set 350. As a specific example, the DST client module 34 receives, via the network 24, write slice responses 1, 3, 4, 5, 7 and 8 at time t7max, where each of the write slice responses indicates that the corresponding encoded data slice has been successfully temporarily stored. Having received the write responses, the DST client module 34 determines whether at least a first threshold number of the write responses have been received within a first response time period. For example, the DST client module 34 determines whether five write responses have been received within a time period of t5max, where t5max is a maximum amount of time from t0 allowed to receive the first threshold number of the write responses in accordance with the desired timing profile. The desired timing profile is discussed in greater detail with reference to FIGS. 45C-F.

FIGS. 45C, 45D, 45E and 45F are timing diagrams illustrating examples of establishing response time periods of the desired timing profile. The establishing of the response time periods includes one of a desired timing profile based on a predetermination of maximum allowed time frames for each incremental received write response and a dynamic determination of a next allowed time frame for each incremental received write response. FIGS. 45C and 45D illustrate examples of establishing the response time periods based on the predetermination of the maximum allowed time frames for each incremental received write response. FIGS. 45E and 45F illustrates examples of establishing response time periods based on the dynamic determination of the next allowed time frame for each incremental received write response. Each example indicates a number of favorable slice responses 456 received over time 458, where one or more maximum time frames are associated with the receiving of the write responses when the first threshold number includes the decode threshold number 460, and where the total number is 8 and the decode threshold number is 5.

FIG. 45C illustrates a first example of the establishing of the response time periods, where the first threshold number of 5 write responses are received at t5, where t5 is less than an allowable t5max in accordance with the desired timing profile where the first response time period is pre-established. As such, when the DST client module 34 of FIG. 45B determines whether the at least a first threshold number of 5 write responses have been received within the first response time period t5max, the DST client module 34 indicates that the first threshold number have been received within the first response time period. Alternatively, when the at least the first threshold number of the write responses have not been received within the first response time period, the DST client module 34 indicates a write failure.

When the at least the first threshold number of the write responses have been received within the first response time period and the at least the first threshold number is equal to the total number, the DST client module 34 issues a set of write commit commands corresponding to the set of encoded data slices. When the at least the first threshold number of the write responses have been received within the first response time period and the at least the first threshold number is less than the total number, the DST client module 34 determines whether at least a second threshold number of the write responses have been received within a second response time period, where the first threshold number is less than the second threshold number and where the second response time period is subsequent to the first response time period. The second response time period may be pre-established. For example, the DST client module 34 determines whether a sixth write response has been received before t6max. As another example, the DST client module 34 determines whether a seventh write response has been received before t7max. As yet another example, the DST client module 34 determines whether an eighth write response has been received before t8max.

When the at least the second threshold number of the write responses have been received within the second response time period and the at least the second threshold number is equal to the total number, the DST client module 34 issues the set of write commit commands corresponding to the set of encoded data slices. When the at least the second threshold number of the responses have been received within the second response time period and the at least the second threshold number is less than the total number, the DST client module 34 determines whether the total number of responses have been received within a third response time period, where the second threshold number is less than the total number and where the third response time period is subsequent to the second response time period and the third response time period is pre-established. For example, the DST client module 34 determines whether the seventh write response has been received before t7max. As another example, the DST client module 34 determines whether the eighth write response has been received before t8max.

When the total number of responses have been received within the third response time period, the DST client module 34 issues the set of write commit commands corresponding to the set of encoded data slices. For example, the DST client module 34 issues 8 write commit commands to the set of storage units when eight write responses have been received at t8, where t8 is less than t8max of the desired timing profile.

Alternatively, or in addition to, prior to expiration of the third response time period, the DST client module 34 determines whether at least a fourth threshold number of responses have been received within a fourth response time period, where the fourth threshold number is less than the total number and wherein the fourth response time period is a portion of the third response time period and is subsequent to the second response time period. For example, the DST client module 34 determines whether an eighth write response has been received within t8max.

When the at least the fourth threshold number of the responses have been received within the fourth response time period and the at least the fourth threshold number is less than the total number, the DST client module 34 determines whether the total number of responses have been received within the third response time period. For example, the DST client module 34 determines that the total number of responses have been received when the eighth write response has been received at t8 and t8 is less than t8max.

FIG. 45D illustrates a second example of the establishing of the response time periods. When the at least the first threshold of the write responses have been received within the first response time period (e.g., t5<t5max) and the at least the second threshold number of the write responses have been received within the second response time period (e.g., t6<t6max), the DST client module 34 determines whether the total number of responses have been received within the third response time period (t8 within t8max). When the total number of responses have not been received within the third response time period, the DST client module 34 issues a sub-set of write commit commands (e.g., 6 write commit requests) to associated storage units corresponding to a response number of encoded data slices for which a response was received, where the response number is less than the total number and is equal to or greater than the at least the second threshold number.

Alternatively, when the at least the first threshold of the write responses have been received and the at least the second threshold number of the write responses have not been received within the second response time period (e.g., if t6>t6max), the DST client module 34 issues a second sub-set of 5 write commit commands corresponding to a second response number (e.g., 5) of encoded data slices for which the response was received prior to the expiration of the second response time period.

FIG. 45E illustrates a third example of the establishing of the response time periods that includes three steps corresponding to receiving write responses for encoded data slices 6-8. In a first step for receiving the encoded data slice 6, the DST client module 34 receives the at least the first threshold number of write responses within the first response time period. For instance, the DST client module 34 receives five write responses by t5 prior to t5max. Having received the first threshold of the write responses within the first response time period, the DST client module 34 determines the second response time period based on the first response time period and the receiving of the at least the first threshold number of write responses. For example, the DST client module 34 determines t6max to achieve a balance in storage time and data retrieval reliability level. The DST client module 34 receives the sixth write response at t6 prior to t6max.

In a second step for receiving the encoded data slice 7, the DST client module 34 determines the third response time period based on the receiving of the at least the second threshold number of write responses. For example, the DST client module 34 determines t7max to achieve the balance in storage time and data retrieval reliability level. The DST client module 34 receives the seventh write response at t7 prior to t7max.

In a third step for receiving the encoded data slice 8, the DST client module 34 determines a fourth response time period based on the receiving of the at least the third threshold number of write responses. For example, the DST client module 34 determines t8max to achieve the balance in storage time and data retrieval reliability level. The DST client module 34 receives the eighth write response at t8 prior to t8max. When receiving the total number of write responses within the fourth response time period, the DST client module 34 issues the set of write commit commands to the set of storage units. For example, the DST client module 34 issues eight write commit commands to the set of storage units.

FIG. 45F illustrates a fourth example of the establishing of the response time periods that includes two steps corresponding to receiving write responses for encoded data slices 6-7. In a first step for receiving the encoded data slice 6, the DST client module 34 receives the at least the first threshold number of write responses within the first response time period. For instance, the DST client module 34 receives five write responses by t5 prior to t5max. Having received the first threshold of the write responses within the first response time period, the DST client module 34 determines the second response time period based on the first response time period and the receiving of the at least the first threshold number of write responses. For example, the DST client module 34 determines t6max to achieve a balance in storage time and data retrieval reliability level. The DST client module 34 receives the sixth write response at t6 prior to t6max.

In a second step for receiving the encoded data slice 7, the DST client module 34 determines the third response time period based on the receiving of the at least the second threshold number of write responses. For example, the DST client module 34 determines t7max to achieve the balance in storage time and data retrieval reliability level. The DST client module 34 does not receive the seventh write response at t7 prior to t7max. When the total number of write responses have not been received within the third response time period, the DST client module 34 issues a sub-set of write commit commands corresponding to a response number of encoded data slices for which a write response was received, where the response number is less than the total number and is equal to or greater than the at least the second threshold number. For example, the DST client module 34 issues 6 write commit commands to corresponding storage units when not receiving the total number of write responses by t7max.

FIG. 45G illustrates final steps of the example of the storing of the data. When the total number of write responses have not been received within the third response time period, the DST client module 34 issues a sub-set of write commit commands corresponding to a response number of encoded data slices for which a write response was received, where the response number is less than the total number and is equal to or greater than the at least the second threshold number. For example, the DST client module 34 sends, via the network 24 at a time subsequent to t7, write commit requests 1, 3, 4, 5, 7 and 8 as write commands to the DST execution units 1, 3, 4, 5, 7 and 8 to commit encoded data slices 1, 3, 4, 5, 7 and 8. Each of the DST execution units 1, 3, 4, 5, 7 and 8 changes status of the temporarily stored encoded data slices 1, 3, 4, 5, 7 and 8 to non-temporarily stored and makes available the encoded data slices 1, 3, 4, 5, 7 and 8 for retrieval. The DST client module 34 identifies remaining encoded data slices of the set of encoded data slices for rebuilding. The DST client module 34 stores identities of the encoded data slices identified for rebuilding in the rebuild queue 452. For example, the DST client module identifies encoded data slices 2 and 6 and stores identities of encoded data slices 2 and 6 in the rebuild queue 452.

The storing of the data may include further phases. For example, the DST client module 34 issues write finalize commands to DST execution units 1, 3, 4, 5, 7 and 8 when subsequently receiving favorable write commit responses in accordance with the desired timing profile. When issuing the write finalize commands, the DST client module 34 may delete the encoded data slices 1, 3, 4, 5, 7 and 8 from the write queue 452 to conclude the storing of the data.

FIG. 45H is a flowchart illustrating an example of storing data. The method begins at step 462 where a processing module (e.g., a distributed storage and task processing module of a dispersed storage network (DSN)) transmits a set of write commands for storing a set of encoded data slices in storage units of the DSN, wherein a data segment is dispersed storage error encoded into the set of encoded data slices. The set of encoded data slices includes a total number of encoded data slices. A threshold number of encoded data slices is needed to recover the data segment. The threshold number is less than the total number.

The method continues at step 464 where the processing module determines whether at least a first threshold number of write responses have been received within a first response time period. The determining may include the processing module pre-establishing the first response time period. Alternatively, the processing module dynamically establishes the first response time period. The method continues to step 470 when the at least the first threshold number of write responses have been received within the first response time period and the at least the first threshold number is not equal to the total number. The method branches to step 468 when the at least the first threshold number of write responses have been received within the first response time period and the at least the first threshold number is equal to the total number. The method branches to step 466 when the at least the first threshold number of write responses have not been received within the first response time period.

When the at least the first threshold number of the write responses have not been received within the first response time period, the method continues at step 466 where the processing module indicates a write failure. For example, the processing module outputs a write failure message to at least one of a requesting entity and a managing entity. When the at least the first threshold number of the write responses have been received within the first response time period and the at least the first threshold number is equal to the total number, the method continues at step 468 where the processing module issues a set of write commit commands corresponding to the set of encoded data slices.

When the at least the first threshold number of the write responses have been received within the first response time period and the at least the first threshold number is less than the total number, the method continues at step 470 where the processing module determines whether at least a second threshold number of the write responses have been received within a second response time period, where the first threshold number is less than the second threshold number and where the second response time period is subsequent to the first response time period. The determining may include the processing module pre-establishing the second response time period. Alternatively, the processing module dynamically establishes the second response time period. When dynamically establishing the second response time period, the processing module determines the second response time period based on the first response time period and the receiving of the at least the first threshold number of responses.

The pre-establishing and the establishing of the second response time period may include determining cost information. The cost information includes a cost of not waiting for additional favorable write responses and a cost of waiting for one or more additional favorable write responses. The cost of not waiting includes one or more of incremental costs associated with losing data based on an estimated reliability level utilizing encoded data slices favorably written so far, network bandwidth costs due to rebuilding one or more unwritten slices later, and storage unit costs associated with rebuilding the one or more unwritten slices later. As a specific example, the processing module multiplies a cost of losing data by a difference of a probability of data loss implied by not writing an encoded data slice and a probability of data loss implied by writing the encoded data slice.

The cost of waiting includes one or more of a cost associated with an estimated amount of time to wait before determining to commit storage of the set of encoded data slices, a cost associated with a forecasted time to commit the storage versus a planned time to commit the storage, and a cost associated with lowered perceived system performance at a user device with regards to subsequently accessing the set of encoded data slices. As a specific example, the processing module calculates a cost associated with a difference between the forecasted time to commit the storage and an original storage deadline plan.

Having determined the cost information, the processing module determines the second time period (e.g., and similarly a possible third or more time periods) to enable commitment of storage of the set of encoded data slices based on the cost information. For example, the processing module establishes a shorter than average second time period to enable the commitment of the storage when the cost of waiting is greater than the cost of not waiting. As a specific example, the processing module determines to not wait any further after receiving at least a decode threshold number of favorable write responses to commit storage when the cost of waiting far outweighs the cost of not waiting (e.g., rebuilding costs are low). As another specific example, the processing module indicates to wait to commit storage until at least the second number of write responses have been received when the cost of not waiting is greater than the cost of waiting (e.g., slower/lowered performance cost is low).

The method branches to step 472 when the at least the second threshold number of write responses have not been received within the second response time period. The method branches to step 474 when the at least the second threshold number of write responses have been received within the second response time period and the at least the second threshold number is equal to the total number. The method continues to step 476 when the at least the second threshold number of write responses have been received within the second response time period and the at least the second threshold number is not equal to the total number.

When the at least the second threshold number of the write responses have not been received within the second response time period, the method continues at step 472 where the processing module issues a second sub-set of write commit commands corresponding to a second response number of encoded data slices for which the response was received prior to the expiration of the second response time period. When the at least the second threshold number of the write responses have been received within the second response time period and the at least the second threshold number is equal to the total number, the method continues at step 474 where the processing module issues a set of write commit commands corresponding to the set of encoded data slices.

When the at least the second threshold number of the write responses have been received within the second response time period and the at least the second threshold number is less than the total number, the method continues at step 476 where the processing module determines whether the total number of write responses have been received within a third response time period, where the second threshold number is less than the total number and where the third response time period is subsequent to the second response time period. The determining may include the processing module pre-establishing the third response time period. Alternatively, the processing module dynamically establishes the third response time period. When the processing module dynamically establishes the third response time period, the processing module determines the third response time period based on the receiving of the at least the second threshold number of responses.

When the total number of responses have been received within the third response time period, the method branches to step 478. When the total number of write responses have not been received within the third response time period, the method continues to step 480. When the total number of responses have been received within the third response time period, the method continues at step 478 where the processing module issues a set of write commit commands corresponding to the set of encoded data slices.

When the total number of write responses have not been received within the third response time period, the method continues at step 480 where the processing module issues a sub-set of write commit commands corresponding to a response number of encoded data slices for which a response was received, where the response number is less than the total number and is equal to or greater than the at least the second threshold number. Alternatively, or in addition to, prior to expiration of the third response time period, the processing module determines whether at least a fourth threshold number of responses have been received within a fourth response time period, wherein the fourth threshold number is less than the total number and wherein the fourth response time period is a portion of the third response time period and is subsequent to the second response time period. When the at least the fourth threshold number of the responses have been received within the fourth response time period and the at least the fourth threshold number is less than the total number, the processing module determines whether the total number of responses have been received within the third response time period.

FIG. 46A is a schematic block diagram of another embodiment of a dispersed storage network (DSN) that includes a rebuilding module 490, a storage module 492, and a storage unit set 494. The rebuilding module 490 may be implemented utilizing the distributed storage and task (DST) integrity processing unit 20 of FIG. 1. The storage module 492 may be implemented utilizing the DST processing unit 16 of FIG. 1. The storage unit set 494 includes a set of storage units 418 of FIG. 44A.

The DSN functions to prioritize rebuilding data. The storage units 418 store sets of encoded data slices associated with data and may receive rebuild requests 498 to rebuild at least some encoded data slices and may receive storage requests 506 to access the encoded data slices. Each storage unit 418 may not have enough processing capability to process a totality of the rebuild requests 498 and the storage requests 506 within desired time frames. The storage unit 418 utilizes a task prioritization algorithm to prioritize the totality of the rebuild requests 498 and the storage requests 506. The rebuilding module 490 collects data loss information 496 and storage error information 500, generates a rebuilding rate 502, generates a data loss rate 504, and shares the rates of rebuilding and data loss with the storage unit set 494. The storage unit 418 executes the task prioritization algorithm based on the rates of rebuilding and data loss to perform the task prioritization algorithm.

The rebuild request 498 includes at least one of a request to rebuild an encoded data slice, a slice name, a request for a partially encoded slice, a request to scan a slice for error, and a request to retrieve a slice for a rebuild operation. The storage request 506 includes a write slice request that includes a slice name and an encoded data slice. The storage unit 418 may issue a storage response 508 that includes a write slice response indicating success or failure of executing a write slice request of a corresponding storage request 506. The data loss information 496 includes a rate of data loss due to slice errors (e.g., missing encoded data slice, corrupted encoded data slice, a memory failure). The storage error information 500 includes a data loss rate due to data being written but not stored. For instance, a rate of data written when a storage unit was off line. The rate of rebuilding includes an aggregated rate at which encoded data slices are rebuilt following error detection. The data loss rate includes a rate based on the data loss information 496 and the storage error information 500 indicating how much data is lost per unit of time.

In an example of operation, the rebuilding module 490 receives the data loss information 496 from one or more storage units 418. The rebuilding module 490 issues rebuild requests 498 to storage units 418 when the data loss information 496 indicates at least one slice error. The rebuilding module 490 receives storage error information 500 from the storage module 492 when errors associated with storage of one or more encoded data slices occurs. As a specific example, the storage module 492 issues a set of storage requests 506 to the set of storage units 418 and receives favorable storage responses 508 from all storage units but one storage unit 418. The storage module 492 then generates the storage error information 500 to indicate that a corresponding encoded data slice of the one storage unit 418 is associated with a slice storage error. The rebuilding module 490 generates the rebuild rate 502 based on a rate of rebuilding associated with the rebuild requests 498. The rebuilding module 490 generates the data loss rate 504 based on the data loss information 496 and the storage error information 500. The rebuilding module 490 sends the rebuild rate 502 and data loss rate 504 to the storage unit set 494.

In another example of operation, each storage unit 418 receives the rebuild rate 502 and the data loss rate 504. Each storage unit 418 prioritizes received storage requests 506 and received rebuild requests 498 based on the rebuild rate 502 and the data loss rate 504. As a specific example, the storage unit 418 prioritizes the rebuild requests 498 over the storage requests 506 when the rebuild rate 502 compares unfavorably to the data loss rate 504. For instance, when the rebuild rate 502 is less than the data loss rate 504. As another instance, when the rebuild rate 502 is greater than the data loss rate 504 and a difference between the rebuild rate 502 and the data loss rate 504 is less than a low threshold. As another specific example of the storage unit prioritizing the received storage requests 506 and the received rebuild requests 498, the storage unit 418 prioritizes the storage requests 506 over the rebuild requests 498 when the rebuild rate 502 compares favorably to the data loss rate 504. For instance, when the rebuild rate 502 is greater than the data loss rate 504 by more than a high threshold level.

FIG. 46B is a flowchart illustrating another example of prioritizing rebuilding data. The method begins with step 510 where a processing module (e.g., of a rebuilding module) receives data loss information from a set of storage units. The method continues at step 512 where the processing module issues rebuild requests to one or more storage units of the set of storage units when a slice error is detected based on the data loss information. The method continues at step 514 where the processing module receives storage error information with regards to errors associated with storage of one or more encoded data slices to the set of storage units. The method continues at step 516 where the processing module generates a rebuild rate based on a rate associated with the rebuild requests. The method continues at step 518 where the processing module generates a data loss rate based on the data loss information and the storage error information. The method continues at step 520 where the processing module sends the rebuild rate and the data loss rate to the set of storage units.

The method continues at step 522 where each storage unit of the set of storage units obtains the rebuild rate and the data loss rate. For example, the storage unit receives the rebuild rate in the data loss rate from the rebuilding module. As another example, the storage unit generates at least one of the rebuild rate and the data loss rate. The method continues at step 524 where the storage unit prioritizes rebuild requests over storage requests when the rebuild rate compares unfavorably to the data loss rate. For example, the storage unit updates a priority level indicator to prioritize. As another example, the storage unit reorders a task list placing higher priority tasks ahead of other tasks. The method continues at step 526 where the storage unit prioritizes storage requests over rebuild requests when the rebuild rate compares favorably to the data loss rate.

FIG. 47A is a schematic block diagram of an embodiment of a set of storage units 418 of FIG. 44A, where each storage unit 418 includes the controller 86 of FIG. 3 and the memory 88 of FIG. 3. In an example of operation, the controller 86 receives a data slice 530 and slice name for the data slice and stores the data slice 530 in the memory 88 in accordance with a current format data 532 associated with the slice name. From time to time, the current format data 532 may be updated such that a new current format is to be utilized for subsequent storage of further received data slices in the memory 88 and the current format becomes a previous format data 534. The format includes an internal data storage format. The internal data storage format includes at least one of null revision appender (e.g., appended as data grows), file-based storage (e.g., fixed or variable block sizes stored that are associated with a file name structure), packed storage (e.g., bytes densely filled in), in memory storage (e.g., volatile storage), flash storage (e.g., non-volatile storage), and any other industry standardized or non-standardized data storage formats. The format of previously stored data may be changed from time to time. For example, the format is changed when migrating storage of metadata of data from the file-based storage format to the packed storage format to more efficiently utilize the memory 88. The controller 86 executes the method of FIG. 47C to change the format of the previously stored data.

In another example of operation, the controller 86 receives the data slice 530 for storage and the slice name of the data slice. The controller 86 identifies a slice name range (e.g., a dispersed storage network (DSN) address range) associated with the slice name. As a specific example, the controller 86 accesses a storage information table that includes one or more slice name ranges and identifies the slice name range when the slice name is within the slice name range. The controller 86 identifies a current format and a current memory range for storage of the data slice based on the slice name range. The memory range includes a memory address range within the memory 88 associated with the slice name range when storing data slices associated with the current format. As a specific example, the controller 86 extracts the current format in the current memory range from the storage information table. The controller 86 stores the data slice in an available storage location of memory 88 within the current memory range and in accordance with the current format data 532. As a specific example, the controller 86 sends current format data 532 to the memory 88 to store the data slice at an open storage location of memory 88 using the file-based storage format.

The controller 86 determines to migrate a format of data storage to a new format. For example, the controller 86 detects at least one of a slice error, a storage capacity issue, and a request to migrate formats. Having determined to migrate the format, the controller 86 identifies a slice name range to migrate of the data to migrate (e.g., accessing the storage information table based on a slice name). The controller 86 identifies a current format and current memory range associated with the slice name range to migrate (e.g., accessing the storage information table based on the identified slice name range). The controller 86 establishes the current format in the current memory range associated with a slice name range to migrate as a previous format in a previous memory range. As a specific example, the controller 86 updates the storage information table to equate the previous format and previous memory range to the current format and current memory range respectively.

Having saved the now previous format data 534 and previous memory range, the controller 86 updates the current format of the storage information table with the new format and selects a new memory range based on the previous memory range and available memory of the memory 88. The controller 86 updates the current memory range of the storage information table to include the new memory range. The controller 86 migrates data of the previous memory range by retrieving data of the previous memory range as previous format data 534, converting the data from the previous format to the current format to produce converted data, and storing the converted data in the current memory range. When the migration is complete, the controller 86 releases previous memory range allocations to make the previous memory range available for subsequent reallocation.

FIG. 47B is a diagram illustrating an example of a structure of a storage information table 536 that includes a slice name range field 538, and four other fields associated with the slice name range. The four other fields includes a pair of related fields including a previous format field 540 and a previous memory range field 542. Remaining fields of the four other fields includes another pair of related fields including a current format field 544 and a current memory range field 546. The storage information table 536 may be utilized to track internal data storage formats utilized to store encoded data slices within a memory of a storage unit as discussed with reference to FIG. 47A.

FIG. 47C is a flowchart illustrating an example of migrating data formats. The method begins with step 548 where a processing module (e.g., of a storage unit) receives a data slice for storage. The processing module receives a slice name associated with the data slice. The method continues at step 550 where the processing module identifies a slice name range associated with the data slice. For example, the processing module compares the slice name to one or more slice name ranges of a storage information table to identify the slice name range. The method continues at step 552 where the processing module identifies a current format and a current memory range for storage of the data slice. For example, the processing module extracts the current format and the current memory range from an entry of the storage information table associated with the slice name range. The method continues at step 554 where the processing module stores the data slice in an available storage location of the current memory range in accordance with the current format. For example, the processing module selects a memory device and an address of the memory device associated with the available storage location, converts the data slice to data for storage in accordance with the current format, and stores the converted data at the address of the memory device.

The method continues, when migrating data, at step 556 where the processing module determines to migrate format of data to migrate to a new format. For example, the processing module determines to migrate format based on at least one of receiving a request, accessing registry information, detecting an error, and detecting a storage capacity issue. As a specific example, the processing module detects that the storage unit is about to run out of available storage space utilizing the current format. The method continues at step 558 where the processing module identifies a slice name range(s) to migrate associated with the data to migrate (e.g., slice name range associated with the data to migrate). The method continues at step 560 where the processing module identifies a current format and a current memory range associated with a slice name range to migrate (e.g., extract from the storage information table). The method continues at step 562 where the processing module establishes the current format and the current memory range associated with a slice name range to migrate as a previous format and a previous memory range (e.g., copy from current to previous in the storage information table).

The method continues at step 564 where the processing module updates the current format of the slice name range to migrate as the new format. The method continues at step 568 where the processing module selects a new memory range based on the previous memory range and available memory. For example, the processing module identifies available memory and identifies unassigned memory addresses within the memory that substantially matches a level of memory utilization of the current memory range. The method continues at step 570 where the processing module updates the current memory range of the slice name range to migrate as the new memory range. The method continues at step 572 where the processing module migrates data from the previous memory range to the updated current memory range in accordance with the updated current format. For example, the processing module receives previous format data from a portion of the previous memory range, converts the portion in accordance with the updated current format to produce current format data, and stores the current format data within a corresponding portion of the updated current memory range. When migration is complete, the method continues at step 574 where the processing module releases previous memory range allocations. For example, the processing module indicates that the previous memory range is available for reassignment.

FIGS. 48A-C are diagrams illustrating examples of a series of steps updating a dispersed hierarchical index structure that includes a plurality of levels and a plurality of nodes to facilitate efficient locating of data stored in a dispersed storage network (DSN). One or more processing modules of the DSN function to update the dispersed hierarchical index structure. A top-level includes a root index node (ROOTNODE) and a bottom level includes one or more leaf nodes (LEAFNODE). The dispersed hierarchical index may further include one or more middle levels of index nodes (INDXNODE). Nodes in a higher level above other nodes at a lower level may serve as parent nodes and the other nodes at the lower-level serve as child nodes to the parent nodes. Nodes at a common level serve as sibling nodes to nodes at the common level. Leaf nodes may include a data object and/or may include a DSN address associated with the data object stored as a set of data slices within the DSN. Nodes are encoded using a dispersed storage error coding function to produce a set of index slices for storage in the DSN. The nodes include a DSN address field that points to a storage location within the DSN where associated nodes are stored. For example, the DSN address field includes a DSN address associated with a sibling index node to the right and another DSN address associated with one or more child nodes.

The nodes are further associated with a minimum index key value to enable searching the dispersed hierarchical index structure to identify a leaf node that corresponds to a desired data object. The dispersed hierarchical index may be searched using an index key associated with an attribute of a desired search and comparing the index key to minimum index key values associated with nodes as searching starts with the root node and proceeds in a downward direction within the index structure to identify the leaf node that corresponds to the desired data object. A series of retrievals of sets of encoded index slices from the DSN may be required to recover nodes along a search path from the root node to the leaf node associated with the desired data object. Two or more dispersed hierarchical indexes may include entries within leaf nodes that point to a common data object when two or more attributes of the common data object are associated with two or more index keys utilized when searching the two or more dispersed hierarchical indexes.

The set of index slices of the node may be stored within the DSN at a set of storage units, where each storage unit stores an index slice in a memory of the storage unit in accordance with a data storage format. The data storage format may be changed to a new data storage format within each storage unit requiring conversion of storage of each set of index slices of all the nodes of the dispersed hierarchical index. The DSN may maintain registry information that includes an indication of the data storage format and the new data storage format associated with the sets of index slices. When the registry information indicates that the data storage format is to be converted to the new data storage format, one or more processing modules of the DSN function execute a series of steps to update (e.g., convert) the storage of the dispersed hierarchical index from the data storage format to the new data storage format as illustrated in FIGS. 48A-C.

FIG. 48A illustrates an example of a first step of the series of steps to update the dispersed hierarchical index structure. Subsequent to updating of the registry information, the root node is recovered from the DSN and deletion of the root node is initiated (e.g., issue delete slice requests). A new root node (NEWROOTNODE) is generated using the root node (e.g., copy root node to the new root node). The root node is encoded using the dispersed storage error coding function to produce a set of new root node slices. Storage of the new root node, using the new format, is initiated within the DSN by generating a set of write slice requests that includes the set of new root node slices and sending the new root node slices to a new DSN address associated with the dispersed hierarchical index (e.g., as indicated by the registry information, as maintained in a table). The set of storage units, being updated with the new registry information, utilizes the new format when storing the set of new root node slices. The storage of the new root node and deletion of the root node is completed by issuing commit transaction requests with regards to the storage of the new root node and the deletion of the root node. For example, a first set of commit transaction requests is generated to include a transaction number of the delete root node requests and another set of commit transaction requests is generated to include a transaction number of the write slice requests of the set of new root node slices.

FIG. 48B illustrates an example of a second step of the series of steps to update the dispersed hierarchical index structure. Having created and connected the new root node to the dispersed hierarchical index, for each leaf node, a node split operation is performed which includes generating a new leaf node (NEWLEAFNODE) to include all data of the leaf node and storing the new leaf note (e.g., each storage unit utilizes the new format), updating pointers in parent nodes to point to the new leaf nodes (e.g., and not to the leaf nodes), and updating pointers within sibling leaf nodes to the left to point to the new leaf node and not to the leaf node. Next, the leaf node may be deleted by issuing delete leaf node slice requests to the set of storage units.

FIG. 48C illustrates an example of a third step of the series of steps to update the dispersed hierarchical index structure. Having updated the lowest level of the index structure to include new leaf nodes, each index node of the one or more middle levels of index nodes is replaced with a new index node (NEWINDEXNODE). The replacing includes, for each index node, a node split operation which includes generating the new index node to include all data of the index node and storing the new index node (e.g., each storage unit uses the new format), updating pointers in parent nodes to point to the new index nodes, and updating pointers within sibling index nodes to the left to point to the new index node and not to the index node. Next, the index nodes may be deleted by issuing delete index node slice requests to the set of storage units.

FIG. 48D is a flowchart illustrating an example of migrating nodes of a dispersed hierarchical index to a new data format. The method begins with step 576 where a processing module (e.g., of a distributed storage and task (DST) client module) recovers a root node of a dispersed hierarchical index from a dispersed storage network (DSN). For example, the processing module obtains a DSN address for the root node (e.g., lookup, receive), generates read slice requests based on the DSN address, sends the read slice requests to a set of storage units of the DSN, receives slices from at least a decode threshold number of the storage units, and decodes the received slices using a dispersed storage error coding function to reproduce the root node. The method continues at step 578 where the processing module initiates deletion of the root node. For example, the processing module outputs a set of delete slice requests based on the DSN address of the root node. The method continues at step 580 where the processing module generates a new root node to include the root node (e.g., copy).

The method continues at step 582 where the processing module initiates storage of the new root node in the DSN utilizing a new storage format. For example, the processing module obtains a new DSN address of the new root node, encodes the new root node using the dispersed storage error coding function to produce a set of new root node slices, and outputs the set of new root node slices to the set of storage units for storage. The method continues at step 584 where the processing module completes storage of the new root node and deletion of the root node. For example, the processing module issues at least one set of commit transaction requests that includes a transaction number associated with deletion of the root node and a transaction number associated with initiating storage of the new root node.

For each leaf node of a leaf node level of the dispersed hierarchical index, the method continues at step 586 where the processing module performs a leaf node split operation to replace the leaf node with a new leaf node. For example, the processing module generates the new leaf node to include all data of the leaf node and stores the new leaf node with a new leaf node DSN address, updates pointers in parent nodes to point to the new leaf node and not to the leaf node, updates pointers of sibling leaf nodes to the left to point to the new leaf node and not to the leaf node, and deletes the leaf node.

For each index node of each index node level of the dispersed hierarchical index, the method continues at step 588 where the processing module performs an index node split operation to replace the index node with a new index node. For example, the processing module starts with an index node of a lowest index node level and generates a new index node to include all data of the index node, stores the new index node at a new DSN address in the set of storage units, updates pointers in parent nodes to point to the new index nodes and not to the index nodes, updates pointers of sibling index nodes to the left to point to the new index node and not to the index node, and deletes the index nodes.

FIG. 49A is a schematic block diagram of another embodiment of a distributed computing system that includes the user device 12 of FIG. 1, the DST processing unit 16 of FIG. 1, the user device 14 of FIG. 1, the DST integrity processing unit 20 of FIG. 1, the DSTN module 22 of FIG. 1, the network 24 of FIG. 1, and the DSTN managing unit 18 of FIG. 1. The user device 12 and the DST processing unit 16 includes the DST client module 34 of FIG. 1. The DSTN module 22 includes the plurality of DST execution units 36 of FIG. 1. The DSTN managing unit 18 updates entities of the distributed computing system with regards to registry information 590, where the registry information identifies storage formats utilized by the DST execution units 36 for storage vaults. A storage vault includes an association of one or more of a group of user devices, the group of data objects for storage, a time span of storage, and any other affiliation. The DSTN managing unit 18 updates the entities of the distributed computing system using an updating ordering to facilitate concurrency of data and continuous data access while the DSTN managing unit 18 performs the updating.

In an example of operation, the DSTN managing unit 18 generates new vaults associated with data storage utilizing a new storage format, where the new vaults correspond to old vaults utilizing a previous storage format. The DSTN managing unit 18 evokes the generating of the new vaults based on one or more of receiving a manager input, detecting a storage issue within the DSTN module 22, forecasting a future potential storage issue within the DSTN module, and receiving a request. The DSTN managing unit 18 generates updated registry information 590 with regards to the new vaults indicating an association with the old vaults. The DSTN managing unit 18 first sends the registry information 590 that has been updated to the DST execution units 36 and to the DST integrity processing unit 20 when the corresponding DST execution unit 36 and DST integrity processing unit 20 is associated with a DSN address range assignment that corresponds to the old vaults.

Next, the DSTN managing unit 18 sends the registry information 590 to the user device 12 when the user device 12 is also associated with the DSN address range assignments that correspond to the old vaults. Then, the DSTN managing unit sends the registry information 590 to the DST processing unit 16 when the DS processing unit 16 is also associated with the DSN address range assignments that correspond to the old vaults. Next, the DSTN managing unit 18 suspends operation of the old vaults by issuing further updated registry information 590 to all DSN entities that are associated with the DSN address range of the old vaults, where the further updated registry information 590 indicates that the old vaults have been replaced by the new vaults. Henceforth, each DSN entity utilizes the new vaults and suspends operations with the old vaults.

FIG. 49B is a flowchart illustrating an example of updating a storage format. The method begins with step 592 where a processing module (e.g., of the DSTN managing unit 18 of FIG. 49A) generates new vaults associated with data storage using a new format, where the new vaults correspond to old vaults utilizing a previous format. The method continues at step 594 where the processing module generates registry information with regards to the new vaults and in association with old vaults.

The method continues at step 596 where the processing module outputs the registry information to storage units associated with the old vaults. For example, the processing module identifies the storage units based on a mapping of the old vaults to DSN address range assignments to the storage units. The method continues at step 598 where the processing module outputs the registry information to one or more user devices associated with the old vaults. For example, the processing module identifies embedded devices (e.g., including the user devices) associated with the DSN address range assignments (e.g., based on an access control list where an embedded device is authorized to access the DSN with regards to the DSN address range assignments).

The method continues at step 600 where the processing module outputs the registry information to one or more DS processing units associated with the old vaults. For example, the processing module identifies the DS processing units associated with the DSN address range assignments based on previous registry information. The method continues at step 602 where the processing module suspends operation of the old vaults and activates operation the new vaults. For example, the processing module issues updated registry information that indicates that the old vaults have been replaced by the new vaults such that all entities of the system are to start utilizing the new vaults and suspend operations of the old vaults.

FIG. 50A is a schematic block diagram of another embodiment of a dispersed storage network that includes the storage module 492 of FIG. 46A and the storage unit set 494 of FIG. 46A, where the storage unit set 494 includes a set of storage units 418 of FIG. 44A. The storage module 492 functions to facilitate conversion of data stored in the storage unit set 494 from an old storage format type to a new storage format type. The storage module 492 receives a read request for a data object, where the data object is encoded using a dispersed storage error coding function to produce slices and the slices are stored by the storage units 418 using the old storage format. The storage module identifies a new storage format of a vault associated with the data object. For example, the storage module performs at least one of a lookup, a determination, and a receive operation.

The storage module 492 issues new type read requests 604 to the storage unit set 494, where the new type read requests 604 indicate the new storage format such that a storage unit 418 attempts to recover a corresponding slice by retrieving an associated data file from memory of the storage unit using the new storage format type. The storage unit 418 issues a new type read response 606 to the storage module 492 indicating whether the slice was recoverable using the new storage format. The storage module 492 issues old type read requests 608 to the storage unit set 494 when receiving new type read response 606 that indicates that the slices are unrecoverable using the new storage format. For example, the storage module 492 identifies a field type storage format based on at least one of a lookup, issuing a query, and receiving a format indicator.

The storage module 492 receives old type read responses 610 from the storage unit set 494, where the old type read responses 610 includes recovered slices of the data object. The storage module 492 obtains one or more sets of slices based on the received recovered slices of the data object. For example, the storage module 492 decodes received slices when receiving a full set. As another example, the storage module 492 rebuilds missing slices when missing slices are detected. The storage module 492 issues a new type write requests 612 to the storage unit set, where the new type write requests 612 includes the one or more sets of slices. Alternatively, the storage module 492 issues a migration request to the storage unit set 494 such that each storage unit 418 converts corresponding slices from the old storage format to the new storage format.

When the storage module 492 has received a sufficient number of favorable new type write responses 614 (e.g., a write threshold number per set thus confirming storage), the storage module 492 issues old type delete requests 616 to the storage unit set 494 such that each storage unit 418 deletes the data files associated with the old storage format that were utilized to store the corresponding slices. The storage module 492 indicates that the process has completed when receiving a favorable number of old type delete responses 618 indicating that the data files associated with the old storage format have been deleted.

FIG. 50B is a flowchart illustrating an example of converting a storage format type. The method begins with step 620 where a processing module (e.g., of a storage module) receives a read request for a data object, where the data object is stored in accordance with an old storage format type as slices in a set of storage units. The method continues at step 622 where the processing module identifies a newest storage format type associated with the data object. For example, the processing module identifies a vault by accessing registry information and/or vault information to identify the newest format associated with the vault. The method continues at step 624 where the processing module issues newest type read requests to the storage unit set. Storage units of the storage unit set issue a new type read response to the storage module indicating whether a corresponding slice was recoverable using the newest storage format.

The method continues at step 626 where the processing module issues old type read requests to the storage unit set when newest type read responses indicate that the data object is unrecoverable using the newest type. For example, the processing module receives unfavorable new type read responses, identifies an old storage format type, generates the old type read requests, and sends the old type read requests to the storage unit set. The method continues at step 628 where the processing module decodes recovered slices of the received old type read responses to reproduce a data object. For example, the processing module receives the old type read responses and decodes the slices using the dispersed storage error coding function to reproduce the data object.

The method continues at step 630 where the processing module obtains slices of the data object. For example, the processing module utilizes received slices. As another example, the processing module rebuilds missing slices from other slices of the data object. The method continues at step 632 where the processing module issues new type write requests that includes the slices of the data object to the storage unit set. Alternatively, the processing module issues a migration request to the storage unit set. When receiving a favorable number of new type write responses, the method continues at step 634 where the processing module issues old type delete requests to the storage unit set. For example, the processing module receives new type write responses, indicates favorable when at least a write threshold number of favorable new type write responses have been received for each set of a plurality of sets of slices, and generates old type delete requests.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A non-transitory computer readable storage medium comprises:
   at least one memory section having operational instructions embodied therewith, the operational instructions executable by one or more processing modules of a dispersed storage network (DSN) to cause the one or more processing modules to:
      issue a set of write commands for storing a set of encoded data slices in DSN memory of the DSN, wherein a data segment is dispersed storage error encoded into the set of encoded data slices such that a decode threshold number of encoded data slices is required to recover the data segment, the decode threshold number less than a total number of encoded data slices of the set of encoded data slices;
      determine a first threshold number of favorable write responses, wherein the first threshold number is less than the total number of encoded data slices and a favorable write response indicates that a corresponding encoded date slice of the set of encoded data slices has been stored, at least temporarily, in the DSN memory; and
      when receiving at least the first threshold number of favorable write responses during a first response time period:
         determine a second response time period for receiving an incremental favorable write response; and
         issue a set of write commit commands corresponding to favorable write responses received during the first response time period and the second response time period, wherein a write commit command indicates that a corresponding encoded data slice is to be stored in the DSN memory on a non-temporary basis.

2. The non-transitory computer readable storage medium of claim 1, wherein the first threshold number corresponds to at least the decode threshold number of encoded data slices.

3. The non-transitory computer readable storage medium of claim 2, wherein issuing a set of write commit commands includes issuing, prior to expiration of the second response time period, a sub-set of write commit commands corresponding to favorable write responses received during the first response time period.

4. The non-transitory computer readable storage medium of claim 2, wherein the at least one memory section stores further operational instructions that, when executed by the one or more processing modules to determine a transmission schedule, causes the one or more processing modules to:
   when receiving less than a decode threshold number of favorable write responses during the first response time period, issuing a write failure message to at least one of a requesting entity or a managing unit of the DSN.

5. The non-transitory computer readable storage medium of claim 1, wherein the first threshold number corresponds to less than the decode threshold number of encoded data slices.

6. The non-transitory computer readable storage medium of claim 1, wherein the first threshold number is equal to the decode threshold number of encoded data slices.

7. The non-transitory computer readable storage medium of claim 1, wherein the at least one memory section stores further operational instructions that, when executed by the one or more processing modules to determine a transmission schedule, causes the one or more processing modules to:
   when receiving less than a total number of favorable write responses during the second response time period, issue a write failure message to at least one of a requesting entity or a managing unit of the DSN.

8. The non-transitory computer readable storage medium of claim 1, wherein the at least one memory section stores further operational instructions that, when executed by the one or more processing modules to determine a transmission schedule, causes the one or more processing modules to:
   when receiving at least a decode number of write responses but less than a total number of write responses by the end of the second response time period:
      determine identification information for one or more of the encoded data slices for which a write request was not received; and
      store the identification information in a rebuild queue.

9. The non-transitory computer readable storage medium of claim 1, wherein the at least one memory section stores further operational instructions that, when executed by the one or more processing modules to determine a transmission schedule, causes the one or more processing modules to:
   when receiving less than a total number of write responses during the first response time period, determine cost information associated with waiting for one or more additional write responses, wherein the second response time period is based, at least in part, on the cost information.

10. The non-transitory computer readable storage medium of claim 1, wherein the at least one memory section stores further operational instructions that, when executed by the one or more processing modules to determine a transmission schedule, causes the one or more processing modules to:
    when receiving less than a total number of favorable write responses during the second response time period, determine a third response time period for receiving an incremental favorable write response.

11. A method for execution by one or more processing modules of one or more computing devices of a dispersed storage network (DSN), the DSN including DSN memory, the method comprises:
    issuing a set of write commands for storing a set of encoded data slices in DSN memory of the DSN, wherein a data segment is dispersed storage error encoded into the set of encoded data slices such that a decode threshold number of encoded data slices is required to recover the data segment, the decode threshold number less than a total number of encoded data slices of the set of encoded data slices;
    determining a first threshold number of favorable write responses, wherein the first threshold number is less than the total number of encoded data slices and a favorable write response indicates that a corresponding encoded date slice of the set of encoded data slices has been stored, at least temporarily, in the DSN memory; and
    when receiving at least the first threshold number of favorable write responses during a first response time period:
       determining a second response time period for receiving an incremental favorable write response; and
       issuing a set of write commit commands corresponding to favorable write responses received during the first response time period and the second response time period, wherein a write commit command indicates that a corresponding encoded data slice is to be stored in the DSN memory on a non-temporary basis.

12. The method of claim 11, wherein the first threshold number corresponds to at least the decode threshold number of encoded data slices.

13. The method of claim 11, wherein issuing a set of write commit commands includes issuing, prior to expiration of the second response time period, a sub-set of write commit commands corresponding to favorable write responses received during the first response time period.

14. The method of claim 11, wherein when receiving less than a decode threshold number of favorable write responses during the first response time period, issuing a write failure message to at least one of a requesting entity or a managing unit of the DSN.

15. The method of claim 11, wherein the first threshold number corresponds to less than the decode threshold number of encoded data slices.

16. The method of claim 11, wherein the first threshold number is equal to the decode threshold number of encoded data slices.

17. The method of claim 11, further comprising:
when receiving less than a total number of favorable write responses during the second response time period, issuing a write failure message to at least one of a requesting entity or a managing unit of the DSN.

18. The method of claim 11, further comprising:
when receiving at least a decode number of write responses but less than a total number of write responses by the end of the second response time period:
   determining identification information for one or more of the encoded data slices for which a write request was not received; and
   storing the identification information in a rebuild queue.

19. The method of claim 11, further comprising:
when receiving less than a total number of write responses during the first response time period, determining cost information associated with waiting for one or more additional write responses, wherein the second response time period is based, at least in part, on the cost information.

20. The method of claim 11, further comprising:
when receiving less than a total number of favorable write responses during the second response time period, determining a third response time period for receiving an incremental favorable write response.

* * * * *